US012574952B2

(12) United States Patent
Fan et al.

(10) Patent No.: US 12,574,952 B2
(45) Date of Patent: Mar. 10, 2026

(54) MEASUREMENT AND REPORTING METHOD AND APPARATUS

(71) Applicant: Huawei Technologies Co., Ltd., Shenzhen (CN)

(72) Inventors: Bo Fan, Chengdu (CN); Xi Zhang, Chengdu (CN); Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 438 days.

(21) Appl. No.: 17/738,906

(22) Filed: May 6, 2022

(65) Prior Publication Data

US 2022/0264584 A1 Aug. 18, 2022

Related U.S. Application Data

(63) Continuation of application No. PCT/CN2019/116822, filed on Nov. 8, 2019.

(51) Int. Cl.
*H04W 72/541* (2023.01)
*H04L 5/00* (2006.01)
(Continued)

(52) U.S. Cl.
CPC ......... *H04W 72/541* (2023.01); *H04L 5/0051* (2013.01); *H04W 24/10* (2013.01); *H04W 72/0446* (2013.01); *H04W 72/0453* (2013.01)

(58) Field of Classification Search
None
See application file for complete search history.

(56) References Cited

U.S. PATENT DOCUMENTS

2017/0064588 A1* 3/2017 Chen ................. H04W 36/0058
2018/0063865 A1* 3/2018 Islam ................... H04L 5/0064
(Continued)

FOREIGN PATENT DOCUMENTS

CN 108418667 A 8/2018
CN 110022565 A 7/2019
(Continued)

OTHER PUBLICATIONS

"3rd Generation Partnership Project; Technical Specification Group Radio Access Network; NR; Physical layer procedures for data (Release 15)," 3GPP TS 38.214 V 15.7.0, XP055811648, Total pages 105, 3rd Generation Partnership Project, Valbonne, France (Sep. 2019).
Nokia et al., "Minimum Requirements for CSI-RS based BFD," 3GPP TSG-RAN WG4 Meeting#90bis, Xi'an, China, R4-1903937, Total 4 pages, 3rd Generation Partnership Project, Valbonne, France (Apr. 8-12, 2019).
(Continued)

*Primary Examiner* — Mohammad S Adhami
*Assistant Examiner* — Raul Rivas
(74) *Attorney, Agent, or Firm* — Leydig, Voit & Mayer, Ltd.

(57) ABSTRACT

A measurement and reporting method and apparatus are provided, to resolve a problem that a channel resource and an interference resource conflict with a CORESET resource when SINR measurement is performed. The method includes: receiving measurement configuration information from a network device, where the measurement configuration information is used to configure a channel resource and an interference resource; and when the channel resource and the interference resource meet a preset condition, the channel resource and the interference resource are configured on OFDM symbols other than an OFDM symbol occupied by a CORESET; and performing measurement based on the configured channel resource and interference resource, the CORESET is shunned when the channel resource and the interference resource are configured, to avoid a problem that (Continued)

the channel resource, the interference resource, and the CORESET cannot be correctly received because the channel resource and the interference resource conflict with the CORESET resource.

20 Claims, 21 Drawing Sheets

(51) Int. Cl.

| | | |
|---|---|---|
| *H04W 24/10* | (2009.01) | |
| *H04W 72/0446* | (2023.01) | |
| *H04W 72/0453* | (2023.01) | |

(56) References Cited

U.S. PATENT DOCUMENTS

| | | | | |
|---|---|---|---|---|
| 2019/0089841 | A1 * | 3/2019 | Jeong | H04M 15/66 |
| 2019/0110277 | A1 * | 4/2019 | Bhattad | H04L 5/0053 |
| 2020/0029312 | A1 * | 1/2020 | Falahati | H04W 72/23 |

FOREIGN PATENT DOCUMENTS

| | | | | | |
|---|---|---|---|---|---|
| WO | 2015037883 | A1 | | 3/2015 | |
| WO | WO-2020032621 | A1 * | | 2/2020 | H04B 17/336 |
| WO | WO-2020091576 | A1 * | | 5/2020 | H04B 7/0619 |

OTHER PUBLICATIONS

"Details of CSI framework," 3GPP TSG RAN WG1 NR Ad-Hoc #3, Nagoya, Japan, R1-1716399, pp. 1-6, 3rd Generation Partnership Project, Valbonne, France (Sep. 18-21, 2017).

"3rd Generation Partnership Project; Technical Specification Group Radio Access Network; NR; Physical channels and modulation (Release 15)," 3GPP TS 38.211 V15.0.0, pp. 1-73, 3rd Generation Partnership Project, Valbonne, France (Dec. 2017).

"3rd Generation Partnership Project; Technical Specification Group Radio Access Network; NR; Radio Resource Control (RRC) protocol specification (Release 15)," 3GPP TS 38.331 V15.3.0, pp. 1-445, 3rd Generation Partnership Project, Valbonne, France (Sep. 2018).

"3rd Generation Partnership Project; Technical Specification Group Radio Access Network; NR; Multiplexing and channel coding (Release 15)," 3GPP TS 38.212 V15.0.0, pp. 1-82, 3rd Generation Partnership Project, Valbonne, France (Dec. 2017).

"3rd Generation Partnership Project; Technical Specification Group Radio Access Network; NR; Physical layer procedures for control (Release 15)," 3GPP TS 38.213 V15.0.0, pp. 1-56, 3rd Generation Partnership Project, Valbonne, France (Dec. 2017).

"3rd Generation Partnership Project; Technical Specification Group Radio Access Network; NR; Physical layer procedures for data (Release 15)," 3GPP TS 38.214 V15.0.0, pp. 1-71, 3rd Generation Partnership Project, Valbonne, France (Dec. 2017).

* cited by examiner

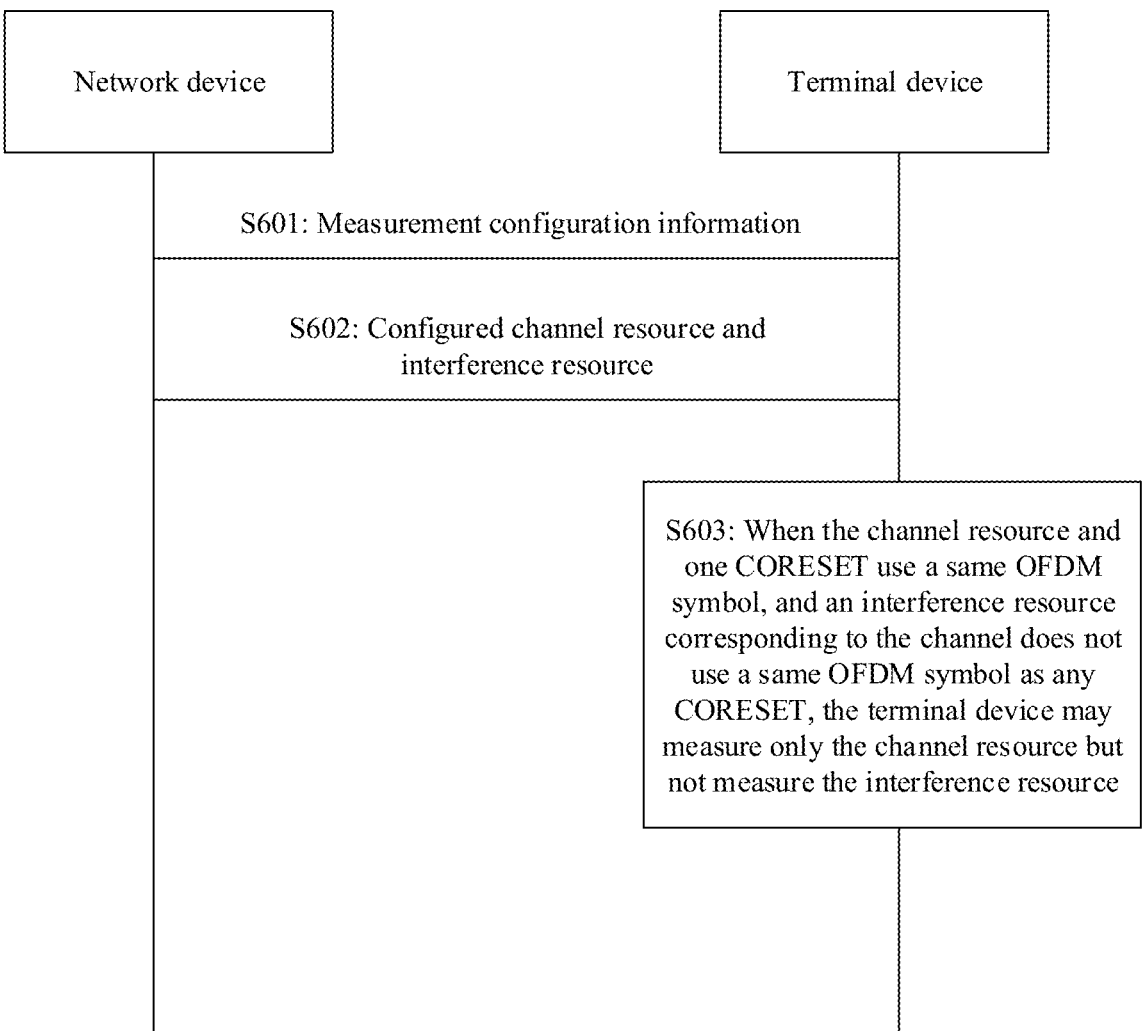

Network device

Terminal device

S601: Measurement configuration information

S602: Configured channel resource and interference resource

S603: When the channel resource and one CORESET use a same OFDM symbol, and an interference resource corresponding to the channel does not use a same OFDM symbol as any CORESET, the terminal device may measure only the channel resource but not measure the interference resource

FIG. 6

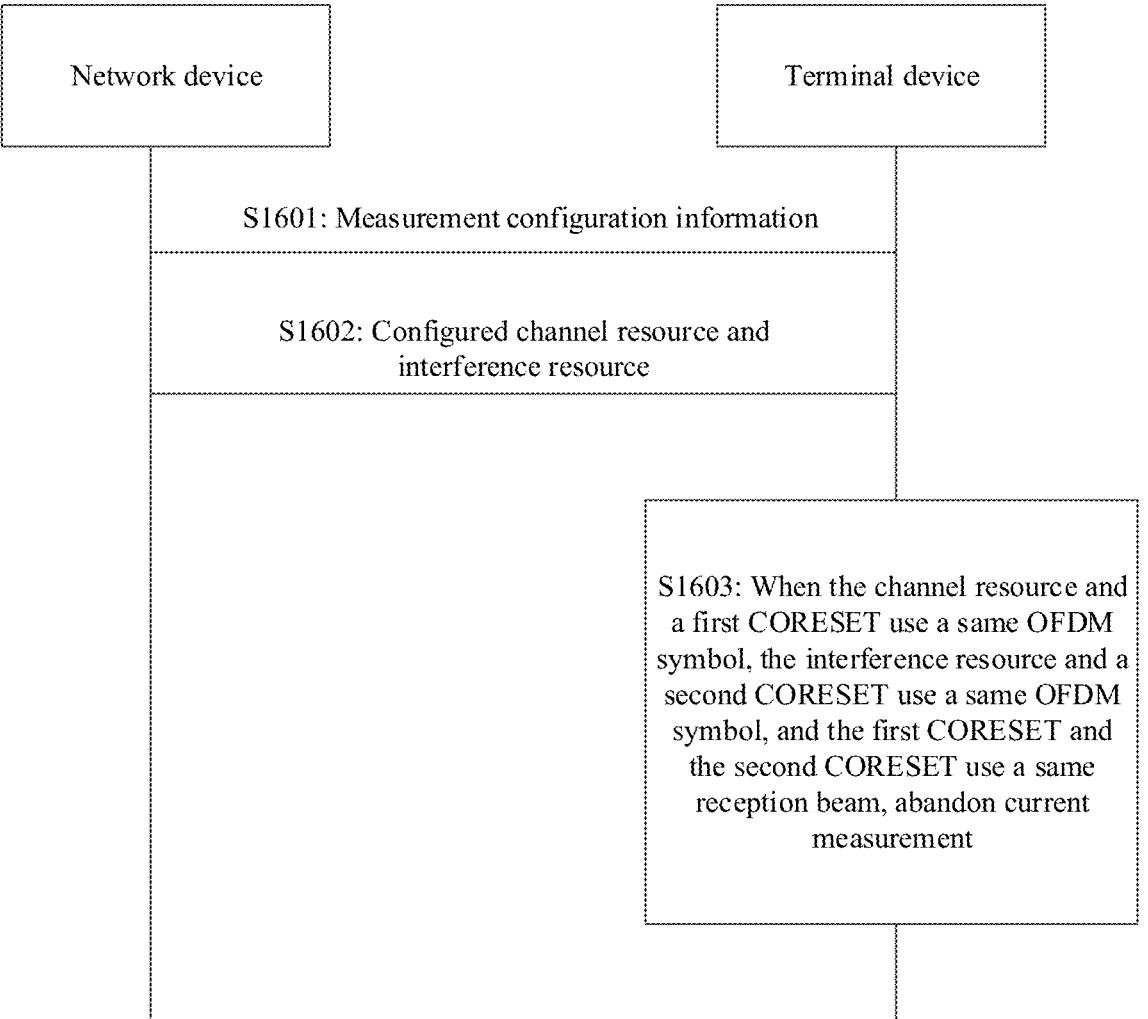

Network device

Terminal device

S1601: Measurement configuration information

S1602: Configured channel resource and interference resource

S1603: When the channel resource and a first CORESET use a same OFDM symbol, the interference resource and a second CORESET use a same OFDM symbol, and the first CORESET and the second CORESET use a same reception beam, abandon current measurement

FIG. 16

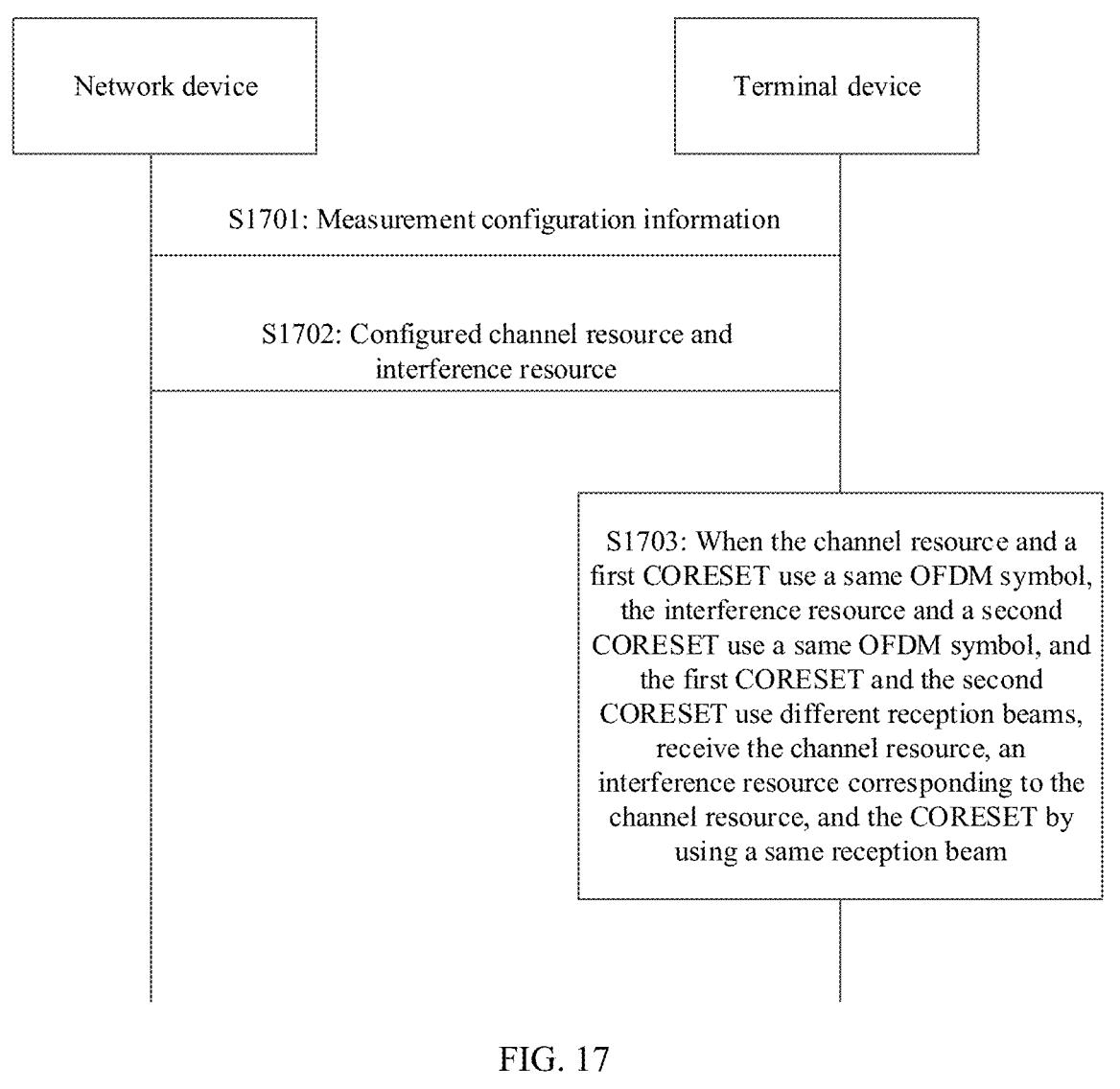

```
┌─────────────────────┐                    ┌─────────────────────┐
│   Network device    │                    │   Terminal device   │
└─────────────────────┘                    └─────────────────────┘
```

S1701: Measurement configuration information

S1702: Configured channel resource and
interference resource

S1703: When the channel resource and a
first CORESET use a same OFDM symbol,
the interference resource and a second
CORESET use a same OFDM symbol, and
the first CORESET and the second
CORESET use different reception beams,
receive the channel resource, an
interference resource corresponding to the
channel resource, and the CORESET by
using a same reception beam

FIG. 17

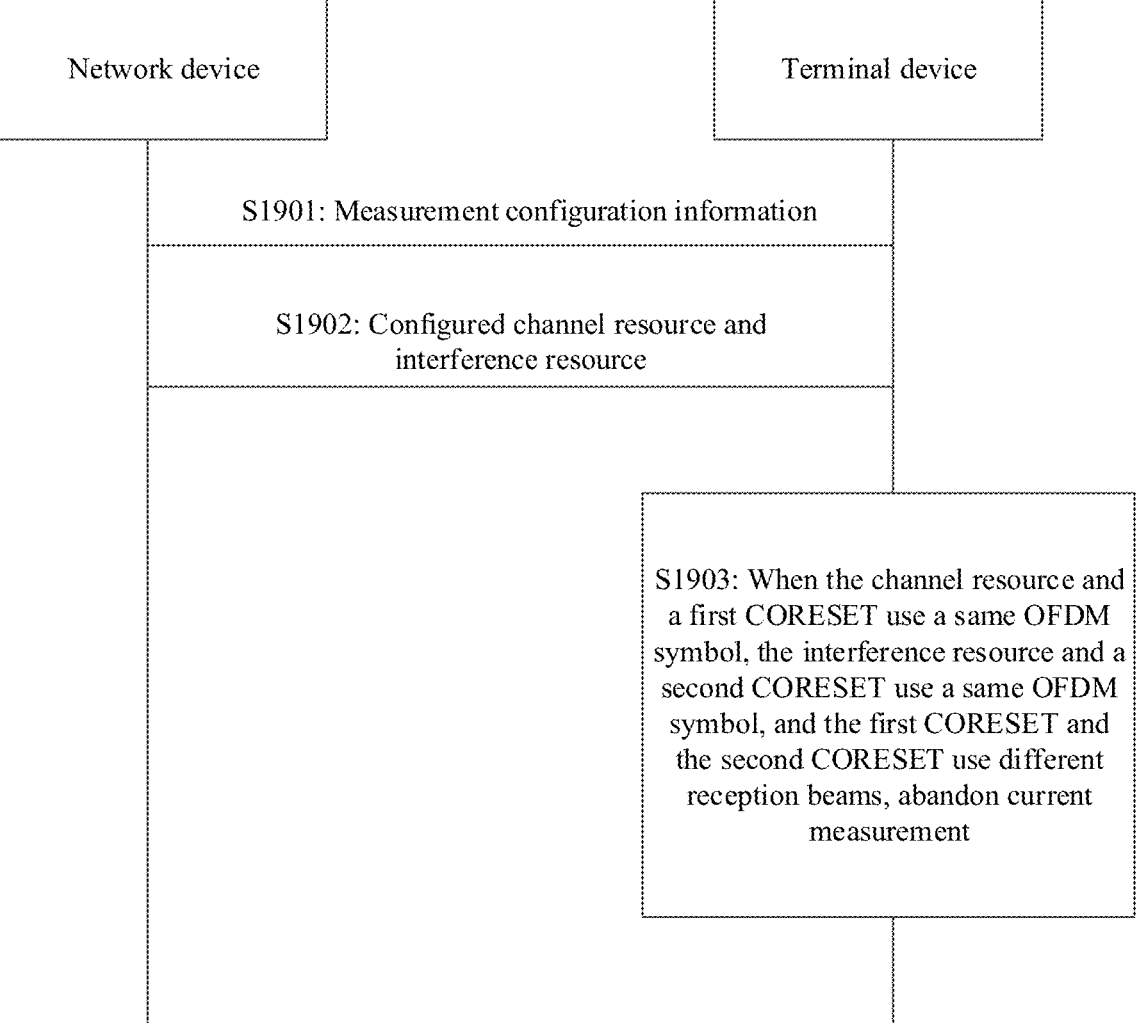

Network device

Terminal device

S1901: Measurement configuration information

S1902: Configured channel resource and interference resource

S1903: When the channel resource and a first CORESET use a same OFDM symbol, the interference resource and a second CORESET use a same OFDM symbol, and the first CORESET and the second CORESET use different reception beams, abandon current measurement

FIG. 19

MEASUREMENT AND REPORTING METHOD AND APPARATUS

CROSS-REFERENCE TO RELATED APPLICATIONS

This application is a continuation of International Application No. PCT/CN2019/116822, filed on Nov. 8, 2019, the disclosure of which is hereby incorporated by reference in its entirety.

TECHNICAL FIELD

Embodiments of this application relate to the field of communications technologies, and in particular, to a measurement and reporting method and apparatus.

BACKGROUND

In a 5th generation (5G) mobile communications system, high frequency based communication may be performed by using an analog beam technology. Weighting processing is performed by using a large-scale antenna array, to concentrate signal energy in a relatively small range to obtain a light beam-like signal (referred to as an analog beam, beam for short), so that a transmission distance is increased. A network device and a terminal device may determine a transmission beam on a network side and a reception beam on a terminal side through beam measurement. During beam measurement, the network device may configure, for the terminal device, a channel resource and an interference resource that are used for beam measurement. The channel resource is used for channel measurement, and the interference resource is used to measure energy of an interfering signal. The network device separately sends reference signals on the configured channel resource and interference resource, so that the terminal device performs beam measurement by measuring the reference signals transmitted on the channel resource and the interference resource, to determine the transmission beam on the network side and the reception beam on the terminal side.

However, in addition to sending the reference signal used for beam measurement to the terminal device, the network device sends a physical downlink control channel (PDCCH) to the terminal device. An overlapping time-frequency resource may exist between the channel resource and interference resource that are used for beam measurement and a control-resource set (CORESET) used to indicate the PDCCH, resulting in a resource conflict.

SUMMARY

This application provides a measurement and reporting method and apparatus, to resolve a problem that a channel resource and an interference resource conflict with a CORESET resource when signal to interference plus noise ratio (SINR) measurement is performed.

According to a first aspect, an embodiment of this application provides a measurement and reporting method. The method may be applied to a terminal device, or a chip or a chipset in the terminal device. The method includes: receiving measurement configuration information from a network device, where the measurement configuration information is used to configure a channel resource and an interference resource; and when the channel resource and the interference resource meet a preset condition, the channel resource and the interference resource are configured on orthogonal frequency division multiplexing (OFDM) symbols other than an OFDM symbol occupied by a CORESET; and performing measurement based on the configured channel resource and interference resource. In this embodiment of this application, the CORESET is shunned when the channel resource and the interference resource are configured, to avoid a problem that the channel resource, the interference resource, and the CORESET cannot be correctly received because the channel resource and the interference resource conflict with the CORESET resource.

In a possible design, the preset condition may be that a repetition parameter of a resource set corresponding to the channel resource is configured as "on". In the foregoing design, when the repetition parameter of the resource set corresponding to the channel resource is configured as "on", the channel resource and the interference resource shun the OFDM symbol occupied by the CORESET, to prevent the channel resource and the interference resource from conflicting with the CORESET resource.

In a possible design, the preset condition may be that a repetition parameter of a resource set corresponding to the interference resource is configured as "on". In the foregoing design, when the repetition parameter of the resource set corresponding to the interference resource is configured as "on", the channel resource and the interference resource shun the OFDM symbol occupied by the CORESET, to prevent the channel resource and the interference resource from conflicting with the CORESET resource.

In a possible design, the preset condition may be that a repetition parameter of either of a resource set corresponding to the channel resource and a resource set corresponding to the interference resource is configured as "on". In the foregoing design, when the repetition parameter of either of the resource set corresponding to the channel resource and the resource set corresponding to the interference resource is configured as "on", the channel resource and the interference resource shun the OFDM symbol occupied by the CORESET, to prevent the channel resource and the interference resource from conflicting with the CORESET resource.

In a possible design, the channel resource may be a channel state information reference signal (CSI-RS) resource or a synchronization signal/physical broadcast channel block (SS/PBCH block).

In a possible design, the interference resource may be the CSI-RS resource, the SSB, or a channel state information interference measurement (CSI-IM) signal.

In a possible design, channel resources may be in a one-to-one correspondence with interference resources.

In a possible design, one channel resource may alternatively correspond to a plurality of interference resources.

In a possible design, a plurality of channel resources may alternatively correspond to one interference resource.

In a possible design, the measurement configuration information may be alternatively used to configure a plurality of channel resources and an interference resource corresponding to each channel resource. When each channel resource and the interference resource corresponding to the channel resource meet the preset condition, the channel resource and the interference resource may be configured on the OFDM symbols other than the OFDM symbol occupied by the CORESET. In the foregoing design, the network device may configure a plurality of groups of resources (namely, channel resources and corresponding interference resources) for the terminal device, so that the terminal device can perform measurement by using the plurality of groups of resources, thereby improving measurement accuracy.

According to a second aspect, an embodiment of this application provides a measurement and reporting method. The method may be applied to a network device, or a chip or a chipset in the network device. The method includes: sending measurement configuration information, where the measurement configuration information is used to configure a channel resource and an interference resource; and when the channel resource and the interference resource meet a preset condition, the channel resource and the interference resource are configured on OFDM symbols other than an OFDM symbol occupied by a CORESET; and sending the configured channel resource and interference resource. In this embodiment of this application, the CORESET is shunned when the channel resource and the interference resource are configured, to avoid a problem that the channel resource, the interference resource, and the CORESET cannot be correctly received because the channel resource and the interference resource conflict with the CORESET resource.

In a possible design, the preset condition may be that a repetition parameter of a resource set corresponding to the channel resource is configured as "on". In the foregoing design, when the repetition parameter of the resource set corresponding to the channel resource is configured as "on", the channel resource and the interference resource shun the OFDM symbol occupied by the CORESET, to prevent the channel resource and the interference resource from conflicting with the CORESET resource.

In a possible design, the preset condition may be that a repetition parameter of a resource set corresponding to the interference resource is configured as "on". In the foregoing design, when the repetition parameter of the resource set corresponding to the interference resource is configured as "on", the channel resource and the interference resource shun the OFDM symbol occupied by the CORESET, to prevent the channel resource and the interference resource from conflicting with the CORESET resource.

In a possible design, the preset condition may be that a repetition parameter of either of a resource set corresponding to the channel resource and a resource set corresponding to the interference resource is configured as "on". In the foregoing design, when the repetition parameter of either of the resource set corresponding to the channel resource and the resource set corresponding to the interference resource is configured as "on", the channel resource and the interference resource shun the OFDM symbol occupied by the CORESET, to prevent the channel resource and the interference resource from conflicting with the CORESET resource.

In a possible design, the channel resource may be a CSI-RS resource or an SS/PBCH block.

In a possible design, the interference resource may be the CSI-RS resource, the SSB, or a CSI-IM resource.

In a possible design, channel resources may be in a one-to-one correspondence with interference resources.

In a possible design, one channel resource may alternatively correspond to a plurality of interference resources.

In a possible design, a plurality of channel resources may alternatively correspond to one interference resource.

In a possible design, the measurement configuration information may be alternatively used to configure a plurality of channel resources and an interference resource corresponding to each channel resource. When each channel resource and the interference resource corresponding to the channel resource meet the preset condition, the channel resource and the interference resource may be configured on the OFDM symbols other than the OFDM symbol occupied by the CORESET. In the foregoing design, the network device may configure a plurality of groups of resources (namely, channel resources and corresponding interference resources) for a terminal device, so that the terminal device can perform measurement by using the plurality of groups of resources, thereby improving measurement accuracy.

According to a third aspect, an embodiment of this application provides a measurement and reporting method. The method may be applied to a terminal device, or a chip or a chipset in the terminal device. The method includes: receiving measurement configuration information from a network device, where the measurement configuration information is used to configure a channel resource and an interference resource; and when the channel resource and the interference resource meet a preset condition, receiving the channel resource, the interference resource, and a CORESET by using a same reception beam. In this embodiment of this application, the terminal device receives the channel resource, the interference resource, and the CORESET by using the same reception beam. The terminal device receives the channel resource and the interference resource by using a same reception beam, so that the terminal device can perform SINR measurement. In addition, the terminal device receives the CORESET by using the same reception beam used for the channel resource and the interference resource, so that the terminal device can receive the channel resource, the interference resource, and the CORESET even if the channel resource and the interference resource include a same OFDM symbol as the CORESET, thereby resolving a problem that the channel resource and the interference resource conflict with the CORESET resource.

In a possible design, that the terminal device receives the channel resource, the interference resource, and a CORESET by using a same reception beam may mean that the terminal device considers that a quasi-colocation relationship of a type D exists between the channel resource, the interference resource, and the CORESET.

In a possible design, that the terminal device receives the channel resource, the interference resource, and a CORESET by using a same reception beam may mean that the terminal device considers that a same transmission configuration indicator (TCI) state is used for the channel resource, the interference resource, and the CORESET.

In a possible design, the preset condition may be that a time-frequency resource occupied by the channel resource and a time-frequency resource occupied by the CORESET include a same OFDM symbol. In the foregoing design, when the channel resource and the CORESET include the same OFDM symbol, the channel resource, the interference resource, and the CORESET are received by using the same reception beam, so that the terminal device can receive the channel resource, the interference resource, and the CORESET.

In a possible design, the preset condition may be that a time-frequency resource occupied by the interference resource and a time-frequency resource occupied by the CORESET include a same OFDM symbol. In the foregoing design, when the interference resource and the CORESET include the same OFDM symbol, the channel resource, the interference resource, and the CORESET are received by using the same reception beam, so that the terminal device can receive the channel resource, the interference resource, and the CORESET.

In a possible design, the preset condition may be that a time-frequency resource occupied by the channel resource and a time-frequency resource occupied by the CORESET include a same OFDM symbol and a time-frequency resource occupied by the interference resource and the time-frequency resource occupied by the CORESET also include a same OFDM symbol. In the foregoing design, the channel resource, the interference resource, and the CORESET are received by using the same reception beam, so that even if the channel resource and the interference resource overlap the CORESET resource, the terminal device can receive the channel resource, the interference resource, and the CORESET, thereby resolving a resource conflict problem.

In a possible design, the preset condition may be that a time-frequency resource occupied by the channel resource and a time-frequency resource occupied by a first CORESET include a same OFDM symbol, a time-frequency resource occupied by the interference resource and a time-frequency resource occupied by a second CORESET include a same OFDM symbol, and the first CORESET and the second CORESET correspond to a same reception beam. The CORESET includes the first CORESET and the second CORESET. In the foregoing design, when the first CORESET and the second CORESET correspond to the same reception beam, the channel resource, the interference resource, the first CORESET, and the second CORESET can be received by using a same reception beam, so that a resource conflict problem can be resolved.

In a possible design, that a time-frequency resource occupied by the channel resource and a time-frequency resource occupied by the CORESET include a same OFDM symbol may mean that the time-frequency resource occupied by the CORESET includes an OFDM symbol occupied by the channel resource.

In a possible design, that a time-frequency resource occupied by the channel resource and a time-frequency resource occupied by the CORESET include a same OFDM symbol may mean that an OFDM symbol occupied by the channel resource is exactly the same as an OFDM symbol occupied by the CORESET.

In a possible design, that a time-frequency resource occupied by the channel resource and a time-frequency resource occupied by the CORESET include a same OFDM symbol may mean that an OFDM symbol occupied by the channel resource is partially the same as an OFDM symbol occupied by the CORESET.

In a possible design, that a time-frequency resource occupied by the interference resource and a time-frequency resource occupied by the CORESET include a same OFDM symbol may mean that the time-frequency resource occupied by the CORESET includes an OFDM symbol occupied by the interference resource.

In a possible design, that a time-frequency resource occupied by the interference resource and a time-frequency resource occupied by the CORESET include a same OFDM symbol may mean that an OFDM symbol occupied by the interference resource is exactly the same as an OFDM symbol occupied by the CORESET.

In a possible design, that a time-frequency resource occupied by the interference resource and a time-frequency resource occupied by the CORESET include a same OFDM symbol may mean that an OFDM symbol occupied by the interference resource is partially the same as an OFDM symbol occupied by the CORESET.

In a possible design, the channel resource may be a CSI-RS resource or an SS/PBCH block.

In a possible design, the interference resource may be the CSI-RS resource, the SSB, or CSI-IM.

In a possible design, channel resources may be in a one-to-one correspondence with interference resources.

In a possible design, one channel resource may alternatively correspond to a plurality of interference resources.

In a possible design, a plurality of channel resources may alternatively correspond to one interference resource.

In a possible design, the measurement configuration information may be alternatively used to configure a plurality of channel resources and an interference resource corresponding to each channel resource. For each channel resource and the corresponding interference resource, when the channel resource and the interference resource meet the preset condition, the channel resource, the interference resource, and the CORESET may be received by using a same reception beam.

According to a fourth aspect, an embodiment of this application provides a measurement and reporting method. The method may be applied to a terminal device, or a chip or a chipset in the terminal device. The method includes: receiving measurement configuration information from a network device, where the measurement configuration information is used to configure a channel resource and an interference resource, and the channel resource and the interference resource are used to measure an SINR; and when the channel resource and the interference resource meet a preset condition, measuring the SINR based on only the channel resource. In this embodiment of this application, when both the channel resource and the interference resource cannot be received, measurement of the interference resource is abandoned, so that a problem that a measurement result is inaccurate because both the channel resource and the interference resource cannot be received can be avoided.

In a possible design, the preset condition may be that a time-frequency resource occupied by the channel resource and a time-frequency resource occupied by a first CORESET include a same OFDM symbol, a time-frequency resource occupied by the interference resource and a time-frequency resource occupied by a second CORESET include a same OFDM symbol, and the first CORESET and the second CORESET correspond to different reception beams. In the foregoing design, when reception beams of the first CORESET and the second CORESET are different, both a resource conflict problem between the channel resource and the first CORESET and a resource conflict problem between the interference resource and the second CORESET cannot be resolved. In this case, measurement of the interference resource is abandoned, so that a problem that a measurement result is inaccurate because both the channel resource and the interference resource cannot be received can be avoided.

In a possible design, the preset condition is that a time-frequency resource occupied by the interference resource and a time-frequency resource occupied by a CORESET include a same OFDM symbol. In the foregoing design, when the interference resource conflicts with the CORESET resource, measurement of the interference resource is abandoned, so that a problem that a measurement result is inaccurate because both the channel resource and the interference resource cannot be received can be avoided.

In a possible design, when the channel resource and the interference resource meet the preset condition, the interference resource is not received. In the foregoing design, reception and measurement of the interference resource are abandoned, so that power consumption of the terminal device can be reduced.

In a possible design, the channel resource may be a CSI-RS resource or an SS/PBCH block.

In a possible design, the interference resource may be the CSI-RS resource, the SSB, or CSI-IM.

In a possible design, channel resources may be in a one-to-one correspondence with interference resources.

In a possible design, one channel resource may alternatively correspond to a plurality of interference resources.

In a possible design, a plurality of channel resources may alternatively correspond to one interference resource.

In a possible design, the measurement configuration information may be alternatively used to configure a plurality of channel resources and an interference resource corresponding to each channel resource. For each channel resource and the corresponding interference resource, when the channel resource and the interference resource meet the preset condition, the SINR may be measured based on only the channel resource.

According to a fifth aspect, an embodiment of this application provides a measurement and reporting method. The method may be applied to a terminal device, or a chip or a chipset in the terminal device. The method includes: receiving measurement configuration information from a network device, where the measurement configuration information is used to configure a channel resource and an interference resource; and when a repetition parameter of a resource set corresponding to the channel resource is configured as "off", and the channel resource and a CORESET correspond to a same reception beam, the channel resource is allowed to be configured on an OFDM symbol occupied by the CORESET; and performing measurement based on the configured channel resource and interference resource. In this embodiment of this application, when the channel resource and the CORESET correspond to the same reception beam, even if the channel resource and the CORESET include a same OFDM symbol, the terminal device can receive the channel resource and the CORESET by using the same reception beam, so that a resource conflict problem can be resolved.

According to a sixth aspect, an embodiment of this application provides a measurement and reporting method. The method may be applied to a terminal device, or a chip or a chipset in the terminal device. The method includes: receiving measurement configuration information from a network device, where the measurement configuration information is used to configure a channel resource and an interference resource; and when SINR measurement or channel quality indicator (CQI) measurement is performed, the channel resource and the interference resource are configured on OFDM symbols other than an OFDM symbol occupied by a CORESET; and performing measurement based on at least one channel resource and an interference resource corresponding to each channel resource that are configured. In this embodiment of this application, the OFDM symbol occupied by the CORESET is shunned when SINR measurement or CQI measurement is performed, so that a problem that the channel resource and the interference resource conflict with the CORESET resource can be avoided.

According to a seventh aspect, an embodiment of this application provides a measurement and reporting method. The method may be applied to a terminal device, or a chip or a chipset in the terminal device. The method includes: receiving measurement configuration information from a network device, where the measurement configuration information is used to configure a channel resource and an interference resource; and when at least one of the following is met, the interference resource is allowed to be configured on an OFDM symbol occupied by a CORESET: the channel resource meets a first condition, and the interference resource meets a second condition; and performing measurement based on the configured channel resource and interference resource. In this embodiment of this application, when a specific condition is met, the interference resource is allowed to be located on the OFDM symbol occupied by the CORESET, so that resource utilization can be improved.

In a possible design, a preset condition is that a repetition parameter of a resource set corresponding to an interference resource corresponding to the channel resource is configured as "off" and the interference resource and the CORESET correspond to a same reception beam. A method for resolving a resource conflict in an R15 protocol is as follows: When the repetition parameter of the resource set to which the channel resource belongs is configured as "off", the channel resource can be configured on the OFDM symbol corresponding to the CORESET, but the channel resource and the CORESET need to be received by using a same reception beam. In the foregoing design, because the interference resource and the CORESET correspond to the same reception beam, according to the R15 protocol, when the channel resource and the CORESET are received by using the same beam, it can be ensured that the channel resource and the interference resource use a same reception beam, so that an SINR can be accurately measured.

In a possible design, a preset condition may be that a repetition parameter of a resource set corresponding to the channel resource is configured as "off" and the channel resource and the CORESET correspond to a same reception beam. In the foregoing design, because the channel resource and the CORESET correspond to the same reception beam, and the channel resource and the interference resource correspond to a same reception beam, the channel resource, the interference resource, and the CORESET may be received by using a same reception beam, so that the channel resource, the interference resource, and the CORESET can be simultaneously received.

According to an eighth aspect, an embodiment of this application provides a measurement and reporting method. The method may be applied to a terminal device, or a chip or a chipset in the terminal device. The method includes: receiving measurement configuration information from a network device, where the measurement configuration information is used to configure a channel resource and an interference resource; and when the channel resource meets a first condition, or when an interference resource corresponding to the channel resource meets a second condition, or when the channel resource meets a first condition and an interference resource corresponding to the channel resource meets a second condition, the interference resource corresponding to the channel resource is configured on an OFDM symbol other than an OFDM symbol occupied by a CORESET; and performing measurement based on at least one channel resource and an interference resource corresponding to each channel resource that are configured. In this embodiment of this application, when a specific condition is met, the OFDM symbol occupied by the CORESET is shunned when the interference resource is configured, so that a conflict between the interference resource and the CORESET resource can be avoided.

In a possible design, the first condition is that a repetition parameter of a resource set corresponding to the interference resource is configured as "off" and the interference resource and the CORESET correspond to different reception beams. Because the interference resource and the CORESET correspond to different reception beams, according to R15, when the channel resource and the CORESET are received by using a same reception beam, the channel resource and the interference resource may correspond to different reception beams. In the foregoing design, the interference resource shuns the OFDM symbol occupied by the CORE-SET, so that when a resource conflict is resolved by using the R15 protocol, it can be ensured that the channel resource and the interference resource use a same reception beam, thereby improving accuracy of measuring an SINR and a CQI.

In a possible design, a repetition parameter of a resource set corresponding to the channel resource is configured as "off" and the channel resource and the CORESET correspond to different reception beams. Because the channel resource and the CORESET correspond to different reception beams, and the channel resource and the interference resource correspond to a same reception beams, the interference resource and the CORESET correspond to different reception beams. In the foregoing design, the OFDM symbol occupied by the CORESET is shunned when the interference resource is configured, so that a conflict between the interference resource and the CORESET resource can be avoided.

According to a ninth aspect, an embodiment of this application provides a measurement and reporting method. The method may be applied to a terminal device, or a chip or a chipset in the terminal device. The method includes: receiving two types of measurement configuration information from a network device, where the measurement configuration information is used to configure a channel resource and an interference resource, and both a channel resource configured by using first measurement configuration information and an interference resource configured by using second measurement configuration information are first resources; and determining measurement and reporting manners of the first measurement configuration information and the second measurement configuration information depending on whether a TCI state of the first resource is the same as a TCI state of a channel resource configured by using the second measurement configuration information.

In a possible design, if a TCI state is configured for the first resource, when the TCI state of the first resource is the same as the TCI state of the channel resource configured by using the second measurement configuration information, the first resource may be received and measured by using the TCI state.

In a possible design, if a TCI state is configured for the first resource, when the TCI state of the first resource is different from the TCI state of the channel resource configured by using the second measurement configuration information, the first resource is measured by using a TCI state configured by the network device. In addition, measurement and reporting corresponding to the second measurement configuration information are abandoned, or a measurement result of the second measurement configuration information is determined by measuring only the channel resource configured by using the second measurement configuration information.

In a possible design, if a TCI state is configured for the first resource, when the TCI state of the first resource is different from the TCI state of the channel resource configured by using the second measurement configuration information, the first resource is measured by using a TCI state of a channel resource associated with the first resource in the second measurement configuration information. In addition, measurement and reporting corresponding to the first measurement configuration information are abandoned, or the first resource is measured by using the TCI state of the channel resource associated with the first resource in the second measurement configuration information, to determine a measurement result of the first measurement configuration information.

In a possible design, if a TCI state is configured for the first resource, when the TCI state of the first resource is different from the TCI state of the channel resource configured by using the second measurement configuration information, measurement configuration information with a higher priority in the first measurement configuration information and the second measurement configuration information is selected for measurement and reporting according to a preset priority rule, and measurement configuration information with a lower priority is abandoned.

In a possible design, if no TCI state is configured for the first resource, the first resource is measured by using a TCI state of a channel resource associated with the first resource in the second measurement configuration information.

According to a tenth aspect, an embodiment of this application provides a measurement and reporting method. The method may be applied to a network device, or a chip or a chipset in the network device. The method includes: sending two types of measurement configuration information, where the measurement configuration information is used to configure a channel resource and an interference resource, and both a channel resource configured by using first measurement configuration information and an interference resource configured by using second measurement configuration information are first resources. If a TCI state is configured for the first resource, a TCI state of a channel resource associated with the first resource in the second measurement configuration information is the same as the TCI state configured for the first resource.

According to an eleventh aspect, an embodiment of this application provides a measurement and reporting method. The method may be applied to a terminal device, or a chip or a chipset in the terminal device. The method includes: receiving measurement configuration information from a network device, where a report quantity in the measurement configuration information is "none", or no report quantity is configured in the measurement configuration information; and measuring and reporting a first measurement quantity.

In a possible design, the first measurement quantity is reference signal received power (RSRP) or an SINR.

In a possible design, if a quantity of associated resource settings configured in the measurement configuration information is greater than 1, the first measurement quantity is the SINR.

In a possible design, if a quantity of associated resource settings configured in the measurement configuration information is equal to 1, the first measurement quantity is the RSRP.

In a possible design, if a quantity of associated resource settings configured in the measurement configuration information is equal to 1, and all frequency domain density of resources in the resource setting is 3 or all quantities of ports of resources in the resource setting are 1, the first measurement quantity is the SINR.

In a possible design, if a quantity of associated resource settings configured in the measurement configuration information is equal to 1, and not all frequency domain density of resources in the resource setting is 3 or not all quantities of ports of resources in the resource setting are 1, the first measurement quantity is the RSRP.

According to a twelfth aspect, an embodiment of this application provides a measurement and reporting method. The method may be applied to a network device, or a chip or a chipset in the network device. The method includes:

sending measurement configuration information, where the measurement configuration information is used to configure one interference resource and a plurality of channel resources, and the interference resource and the plurality of channel resources meet a preset condition.

In a possible design, the preset condition is that a QCL relationship exists between the interference resource and a first channel resource in the plurality of channel resources.

In a possible design, the first channel resource is the 1$^{st}$ channel resource in the plurality of channel resources; or the first channel resource is the last channel resource in the plurality of channel resources.

In a possible design, the first channel resource is a channel resource with a smallest index in the plurality of channel resources.

In a possible design, the first channel resource is a channel resource with a largest index in the plurality of channel resources.

In a possible design, the first channel resource is a channel resource for which a TCI state is configured in the plurality of channel resources.

In a possible design, the first channel resource is the 1$^{st}$ channel resource in channel resources for which TCI states are configured in the plurality of channel resources.

In a possible design, the first channel resource is the last channel resource in channel resources for which TCI states are configured in the plurality of channel resources.

In a possible design, the first channel resource is a channel resource with a largest index in channel resources for which TCI states are configured in the plurality of channel resources.

In a possible design, the first channel resource is a channel resource with a smallest index in channel resources for which TCI states are configured in the plurality of channel resources.

In a possible design, the first channel resource is a channel resource for which QCL information of a type D is configured in the plurality of channel resources.

In a possible design, the first channel resource is the 1$^{st}$ channel resource in channel resources for which QCL information of a type D is configured in the plurality of channel resources.

In a possible design, the first channel resource is the last channel resource in channel resources for which QCL information of a type D is configured in the plurality of channel resources.

In a possible design, the first channel resource is a channel resource with a largest index in channel resources for which QCL information of a type D is configured in the plurality of channel resources.

In a possible design, the first channel resource is a channel resource with a smallest index in channel resources for which QCL information of a type D is configured in the plurality of channel resources.

In a possible design, the preset condition is that a measurement periodicity of the interference resource is 1/N of a periodicity of a channel resource associated with the interference resource, where N is a quantity of channel resources associated with the interference resource.

In a possible design, the preset condition is that a same TCI state is configured for channel resources associated with the interference resource.

In a possible design, the preset condition is that a repetition parameter of a resource set corresponding to a channel resource associated with the interference resource is configured as "off".

In a possible design, the preset condition is that a repetition parameter of a resource set corresponding to a channel resource associated with the interference resource is configured as "off" and a same TCI state is configured for channel resources associated with the interference resource.

In a possible design, the interference resource is CSI-IM.

In a possible design, the measurement configuration information includes one report configuration and three resource configurations, a first resource configuration is used to configure a plurality of channel resources, a second resource configuration is used to configure an interference resource of a type CSI-IM, and a third resource configuration is used to configure an interference resource of a type NZP CSI-RS.

According to a thirteenth aspect, this application provides a measurement and reporting apparatus. The apparatus may be a communications device, or may be a chip or a chipset in the communications device. The communications device may be a terminal device, or may be a base station. The apparatus may include a processing module and a transceiver module. When the apparatus is a communications device, the processing module may be a processor, and the transceiver module may be a transceiver. The apparatus may further include a storage module, and the storage module may be a memory. The storage module is configured to store instructions, and the processing module executes the instructions stored in the storage module, so that the terminal device performs corresponding functions in any one of the first aspect, the third aspect to the ninth aspect, and the eleventh aspect; or the processing module executes the instructions stored in the storage module, so that the base station performs corresponding functions in the second aspect, the tenth aspect, or the twelfth aspect. When the apparatus is a chip or a chipset in a communications device, the processing module may be a processor, and the transceiver module may be an input/output interface, a pin, a circuit, or the like. The processing module executes the instructions stored in the storage module, so that the terminal device performs corresponding functions in any one of the first aspect, the third aspect to the ninth aspect, and the eleventh aspect, or the processing module executes the instructions stored in the storage module, so that the base station performs corresponding functions in the second aspect, the tenth aspect, or the twelfth aspect. The storage module may be a storage module (for example, a register or a cache) in the chip or the chipset, or may be a storage module (for example, a read-only memory or a random access memory) that is in the base station and that is located outside the chip or the chipset.

According to a fourteenth aspect, a measurement and reporting apparatus is provided, including a processor, a communications interface, and a memory. The communications interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the measurement and reporting method in any design of any aspect of the first aspect to the twelfth aspect.

According to a fifteenth aspect, an embodiment of this application provides a communications apparatus. The communications apparatus includes a processor. When the processor executes a computer program or instructions in a memory, the method according to any one of the first aspect, the third aspect to the ninth aspect, and the eleventh aspect is performed.

According to a sixteenth aspect, an embodiment of this application provides a communications apparatus. The communications apparatus includes a processor. When the processor executes a computer program or instructions in a memory, the method according to the second aspect, the tenth aspect, or the twelfth aspect is performed.

According to a seventeenth aspect, an embodiment of this application provides a communications apparatus. The communications apparatus includes a processor and a memory, the memory is configured to store a computer executable computer program or instructions, and the processor is configured to execute the computer executable computer program or the instructions stored in the memory, so that the communications apparatus performs a corresponding method according to any one of the first aspect, the third aspect to the ninth aspect, and the eleventh aspect.

According to an eighteenth aspect, an embodiment of this application provides a communications apparatus. The communications apparatus includes a processor and a memory, the memory is configured to store a computer program or computer-executable instructions, and the processor is configured to execute the computer program or the computer-executable instructions stored in the memory, so that the communications apparatus performs a corresponding method according to the second aspect, the tenth aspect, or the twelfth aspect.

According to a nineteenth aspect, an embodiment of this application provides a communications apparatus. The communications apparatus includes a processor, a memory, and a transceiver, the transceiver is configured to receive a signal or send a signal, the memory is configured to store program code or instructions, and the processor is configured to invoke the program code or the instructions from the memory to perform the method according to any one of the first aspect, the third aspect to the ninth aspect, and the eleventh aspect.

According to a twentieth aspect, an embodiment of this application provides a communications apparatus. The communications apparatus includes a processor, a memory, and a transceiver, the transceiver is configured to receive a signal or send a signal, the memory is configured to store program code or instructions, and the processor is configured to invoke the program code or the instructions from the memory to perform the method according to the second aspect, the tenth aspect, or the twelfth aspect.

According to a twenty-first aspect, an embodiment of this application provides a communications apparatus. The communications apparatus includes a processor and an interface circuit, the interface circuit is configured to: receive computer program code or instructions, and transmit the computer program code or the instructions to the processor, and the processor runs the computer program code or the instructions to perform a corresponding method according to any one of the first aspect, the third aspect to the ninth aspect, and the eleventh aspect.

According to a twenty-second aspect, an embodiment of this application provides a communications apparatus. The communications apparatus includes a processor and an interface circuit, the interface circuit is configured to: receive computer program code or instructions, and transmit the computer program code or the instructions to the processor, and the processor runs the computer program code or the instructions to perform a corresponding method according to the second aspect, the tenth aspect, or the twelfth aspect.

According to a twenty-third aspect, an embodiment of this application provides a computer-readable storage medium.

The computer-readable storage medium is configured to store computer program code or instructions. When the computer program code or the instructions are executed, the method according to any one of the first aspect, the third aspect to the ninth aspect, and the eleventh aspect is implemented.

According to a twenty-fourth aspect, an embodiment of this application provides a computer-readable storage medium. The computer-readable storage medium is configured to store computer program code or instructions. When the computer program code or the instructions are executed, the method according to the second aspect, the tenth aspect, or the twelfth aspect is implemented.

According to a twenty-fifth aspect, an embodiment of this application provides a computer program product including computer program code or instructions. When the computer program code or the instructions are executed, the method according to any one of the first aspect, the third aspect to the ninth aspect, and the eleventh aspect is implemented.

According to a twenty-sixth aspect, an embodiment of this application provides a computer program product including computer program code or instructions. When the computer program code or the instructions are executed, the method according to the second aspect, the tenth aspect, or the twelfth aspect is implemented.

BRIEF DESCRIPTION OF DRAWINGS

FIG. 6 is a schematic flowchart of another type of measurement and reporting according to an embodiment of this application;

FIG. 16 is a schematic flowchart of another type of measurement and reporting according to an embodiment of this application;

FIG. 17 is a schematic flowchart of another type of measurement and reporting according to an embodiment of this application;

FIG. 19 is a schematic flowchart of another type of measurement and reporting according to an embodiment of this application;

DESCRIPTION OF EMBODIMENTS

Figure 1:
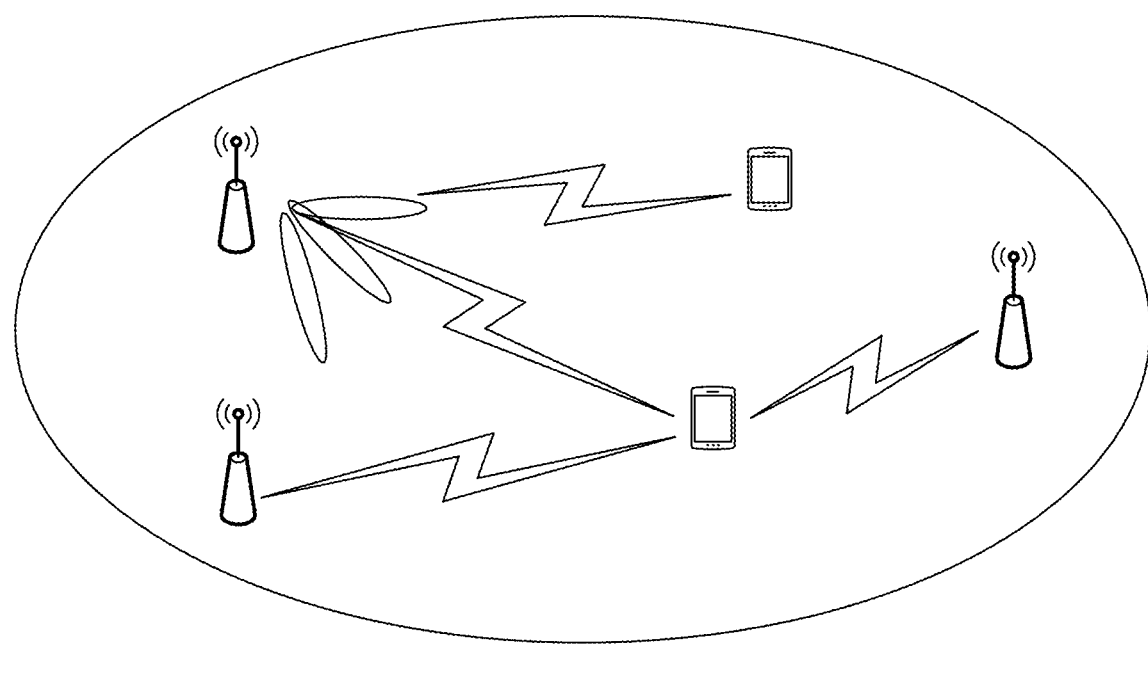
FIG. 1 is a schematic diagram of an architecture of a communications system according to an embodiment of this application.

To facilitate understanding of embodiments of this application, the following describes terms related to embodiments of this application.

1. Beam

In a new radio (NR) protocol, a beam may be embodied as a spatial domain filter, a spatial filter, or a spatial parameter (for example, a spatial reception parameter or a spatial transmission parameter). A beam used to send a signal may be referred to as a transmission beam (Tx beam), or may be referred to as a spatial domain transmission filter, a spatial transmission filter, a spatial domain transmission parameter, or a spatial transmission parameter. A beam used to receive a signal may be referred to as a reception beam (Rx beam), or may be referred to as a spatial domain reception filter, a spatial reception filter, a spatial domain reception parameter, or a spatial reception parameter.

The transmission beam may refer to distribution of signal strength formed in different directions in space after a signal is transmitted by using an antenna, and the reception beam may refer to distribution of signal strength, in different directions in space, of a radio signal received from an antenna.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital or analog beamforming technology, or the like.

The beam usually corresponds to a resource. For example, during beam measurement, a network device measures different beams by using different resources, a terminal device feeds back measured resource quality, and the network device knows quality of a corresponding beam. During data transmission, beam information is also indicated by using a resource corresponding to the beam information. For example, the network device indicates information about a physical downlink shared channel (PDSCH) beam of the terminal device by using a resource in a TCI of downlink control information (DCI).

Optionally, a plurality of beams having same or similar communications features may be considered as one beam. One beam may include one or more antenna ports, and is used to transmit a data channel, a control channel, a sounding signal, and the like. The one or more antenna ports forming the beam may also be considered as one antenna port set.

In downlink beam measurement, the transmission beam is a transmission beam of the network device, and the reception beam may be a reception beam of the terminal device. In uplink beam measurement, the transmission beam is a transmission beam of the terminal device, and the reception beam may be a reception beam of the network device. In beam measurement, one beam may correspond to one resource. In this manner, an index of a resource may be used to identify a beam corresponding to the resource. Alternatively, one beam may correspond to a plurality of resources.

2. Resource

A resource corresponding to a beam may be an uplink signal resource, or may be a downlink signal resource. An uplink signal includes but is not limited to a sounding reference signal (SRS), a demodulation reference signal (DMRS), and the like. A downlink signal includes but is not limited to a CSI-RS, CSI-IM, a cell specific reference signal (CS-RS), UE specific reference signal (US-RS), a DMRS, an SS/PBCH block, and the like. The SS/PBCH block may be referred to as a synchronization signal block (SSB) for short.

A resource may be configured by using radio resource control (RRC) signaling. In a configuration structure, one resource may be one data structure, including a related parameter of an uplink/downlink signal corresponding to the resource, for example, a type of the uplink/downlink signal, a resource element (RE) that carries the uplink/downlink signal, transmit time and a transmit periodicity of the uplink/downlink signal, and a quantity of ports used to send the uplink/downlink signal. A resource of each uplink/downlink signal has an index for identifying the resource of the uplink/downlink signal. It may be understood that the index of the resource may also be referred to as an identifier of the resource. This is not limited in embodiments of this application.

Resources corresponding to a beam may include a channel resource and an interference resource.

2.1. Channel Resource

A channel resource is a resource that is configured by a network device and that is used for channel measurement. The channel resource may be used to measure channel information such as RSRP, a CQI, and an SINR. In uplink beam measurement, the channel resource may be an SRS resource. In downlink beam measurement, the channel resource may be a CSI-RS resource or an SSB. When the CQI and the SINR are measured, an interference resource further needs to be configured.

2.2. Interference Resource

An interference resource is a resource that is configured by a network device and that is used for channel measurement. In uplink beam measurement, the interference resource may be an SRS resource. In downlink beam measurement, the interference resource may be a CSI-RS resource, an SSB, or a CSI-IM resource. When channel information such as a CQI and an SINR is measured, the interference resource is used as an interference source for calculating the CQI and the SINR together with the channel resource. For example, to measure an SINR of a channel resource under interference of an interference resource, energy of the channel resource may be used as a numerator and energy of the interference resource may be used as a denominator to calculate the SINR.

3. Quasi-Colocation (QCL)

Quasi-colocation may also be referred to as quasi co-site or co-location.

Signals corresponding to antenna ports having a QCL relationship may have a same or similar spatial characteristic parameter (or referred to as a parameter), or a spatial characteristic parameter (or referred to as a parameter) of one antenna port may be used to determine a spatial char-acteristic parameter (or referred to as a parameter) of another antenna port that has a QCL relationship with the antenna port, or two antenna ports have a same or similar spatial characteristic parameter (or referred to as a parameter), or a difference between spatial characteristic parameters (or referred to as parameters) of two antenna ports is less than a threshold.

It should be understood that spatial characteristic param-eters of two reference signals or channels that satisfy a QCL relationship are the same (close or similar), so that a spatial characteristic parameter of a target reference signal can be inferred based on a resource index of the source reference signal.

It should be further understood that spatial characteristic parameters of two reference signals or channels that satisfy spatial relation information are the same (close or similar), so that the spatial characteristic parameter of the target reference signal can be inferred based on the resource index of the source reference signal.

The spatial characteristic parameter includes one or more of the following parameters:

an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmission beamforming of a terminal device, reception beamforming of the ter-minal device, spatial channel correlation, transmission beamforming of a network device, reception beam-forming of the network device, an average channel gain, an average channel delay, a delay spread, a Doppler spread, a Doppler shift, a spatial reception parameter (spatial Rx parameters), or the like.

The foregoing angles may be decomposition values at different dimensions or a combination of decomposition values at different dimensions.

Four types of QCL are defined in an existing standard, and the network device may simultaneously configure one or more types of QCL for the terminal device, for example, QCL types A+D, and QCL types C+D:

QCL types A: Doppler shift, Doppler spread, average delay, delay spread;

QCL types B: Doppler shift, Doppler spread;

QCL types C: average delay, Doppler shift; and

QCL types D: spatial Rx parameter.

When the QCL relationship is a QCL relationship of the type D, the QCL relationship may be considered as spatial QCL. When the antenna ports satisfy the spatial QCL relationship, a QCL relationship (which is referred to as a spatial relation) between ports for downlink signals or between ports for uplink signals may be that the two signals have a same AoA or AoD, and is used to indicate that the two signals have a same reception beam or transmission beam. For another example, a QCL relationship between a down-link signal and an uplink signal or between a port for an uplink signal and a port for a downlink signal may be that there is a correspondence between AoAs and AoDs of the two signals, or there is a correspondence between AoDs and AoAs of the two signals. To be specific, beam reciprocity may be used to determine an uplink transmission beam based on a downlink reception beam, or determine a down-link reception beam based on an uplink transmission beam.

Signals transmitted on ports having a spatial QCL rela-tionship may alternatively be understood as signals received or sent by using a same spatial filter. The spatial filter may be at least one of the following: precoding, a weight of an antenna port, a phase deflection of the antenna port, or an amplitude gain of the antenna port.

Signals transmitted on ports having a spatial QCL rela-tionship may alternatively be understood as having corre-sponding beam pair links (BPLs). The corresponding BPLs include at least one of the following: a same downlink BPL, a same uplink BPL, an uplink BPL corresponding to a downlink BPL, or a downlink BPL corresponding to an uplink BPL.

Therefore, the spatial reception parameter (namely, the QCL of the type D) may be understood as a parameter used to indicate direction information of a reception beam.

In an example of this application, correspondences of some parameters may also be used in descriptions of a QCL scenario.

It should be understood that, in a scenario applicable to a QCL assumption in this application, there may alternatively be an association relationship between two reference sig-nals, or may further be an association relationship between transmission objects.

4. Beam Measurement

Beam measurement may be used to measure quality of a beam, for example, measure RSRP or an SINR of the beam. Taking downlink beam measurement as an example, a measurement procedure mainly includes the following four steps.

S1: A network device sends measurement configuration information to a terminal device. The measurement configu-ration information mainly includes two parts: resource con-figuration information and report configuration information. The resource configuration information is used to configure resources. The resources may include a channel resource. When a CQI and an SINR are measured, the resources may further include an interference resource.

S2: The network device sends a downlink signal on a resource element corresponding to a resource configured by using the resource configuration information, so that the terminal device determines quality of each resource (namely, quality of a beam corresponding to the resource) by measuring the downlink signal.

S3: The terminal device measures the downlink signal based on the measurement configuration information.

S4: The terminal device sends a beam measurement report to the network device.

It should be noted that, with continuous development of technologies, the terms in embodiments of this application may change, but all of them shall fall within the protection scope of this application.

5. Repetition Configuration

In configuration signaling, a resource is included in a resource set. A network device may configure a resource set for a terminal device. The resource set includes one or more resources. The network device may configure a repetition parameter for the resource set. A specific value may be configured as "on" or "off". When the specific value is configured as "on", it indicates that resources in the resource set are sent by using a same transmission beam. In this case, the terminal device separately measures the resources by using different reception beams, to implement reception beam scanning and determine an optimal reception beam. When the specific value is configured as "off", it indicates that resources in the resource set are not sent by using a same transmission beam. In this case, the terminal device is not required to measure the resources by using different reception beams.

6. CORESET

A CORESET is a configuration unit in configuration signaling. Each CORESET includes a series of configuration parameters related to a physical downlink control channel (PDCCH), for example, an OFDM symbol occupied by the PDCCH and a reception beam of the PDCCH. A terminal device receives the PDCCH by using the corresponding reception beam on the corresponding OFDM symbol based on the CORESET configuration.

7. TCI State

A TCI is used to indicate QCL information of a signal or a channel. The channel may be a PDCCH/CORESET or a PDSCH. The signal may be a CSI-RS, a DMRS, a tracking reference signal (TRS), or the like. TCI information indicates that a reference signal included in the TCI and the channel or the signal satisfy a QCL relationship, and is mainly used to indicate that during reception of the signal or the channel, information such as a spatial characteristic parameter of the signal or the channel is the same as, similar to, or close to information such as a spatial characteristic parameter of the reference signal included in the TCI.

One or more referenced reference signals and associated QCL types may be configured in one TCI state. The QCL type may further be classified into four categories: A, B, C, and D that are different combinations or selections of {Doppler shift, Doppler spread, average delay, delay spread, spatial Rx parameter}. The TCI state includes QCL information, or the TCI state is used to indicate QCL information.

To make objectives, technical solutions, and advantages of embodiments of this application clearer, the following further describes embodiments of this application in detail with reference to accompanying drawings.

A communication method provided in this application may be applied in various communications systems, for example, an internet of things (IoT), a narrowband internet of things (NB-IoT), a long term evolution (LTE), a 5G communications system, an LTE and 5G hybrid architecture, a 5G NR system, or a new communications system emerging in future communications development. The 5G communications system in this application may include at least one of a non-standalone (NSA) 5G communications system or a standalone (SA) 5G communications system. The communications system may alternatively be a public land mobile network (PLMN) network, a device-to-device (D2D) network, a machine to machine (M2M) network, or another network.

FIG. 1 shows a communications system 100 applicable to an embodiment of this application. The communications system may include one or more network devices and one or more terminal devices. One network device may transmit data or control signaling to one or more terminal devices. Alternatively, a plurality of network devices may simultaneously transmit data or control signaling to one terminal device.

Figure 2A:
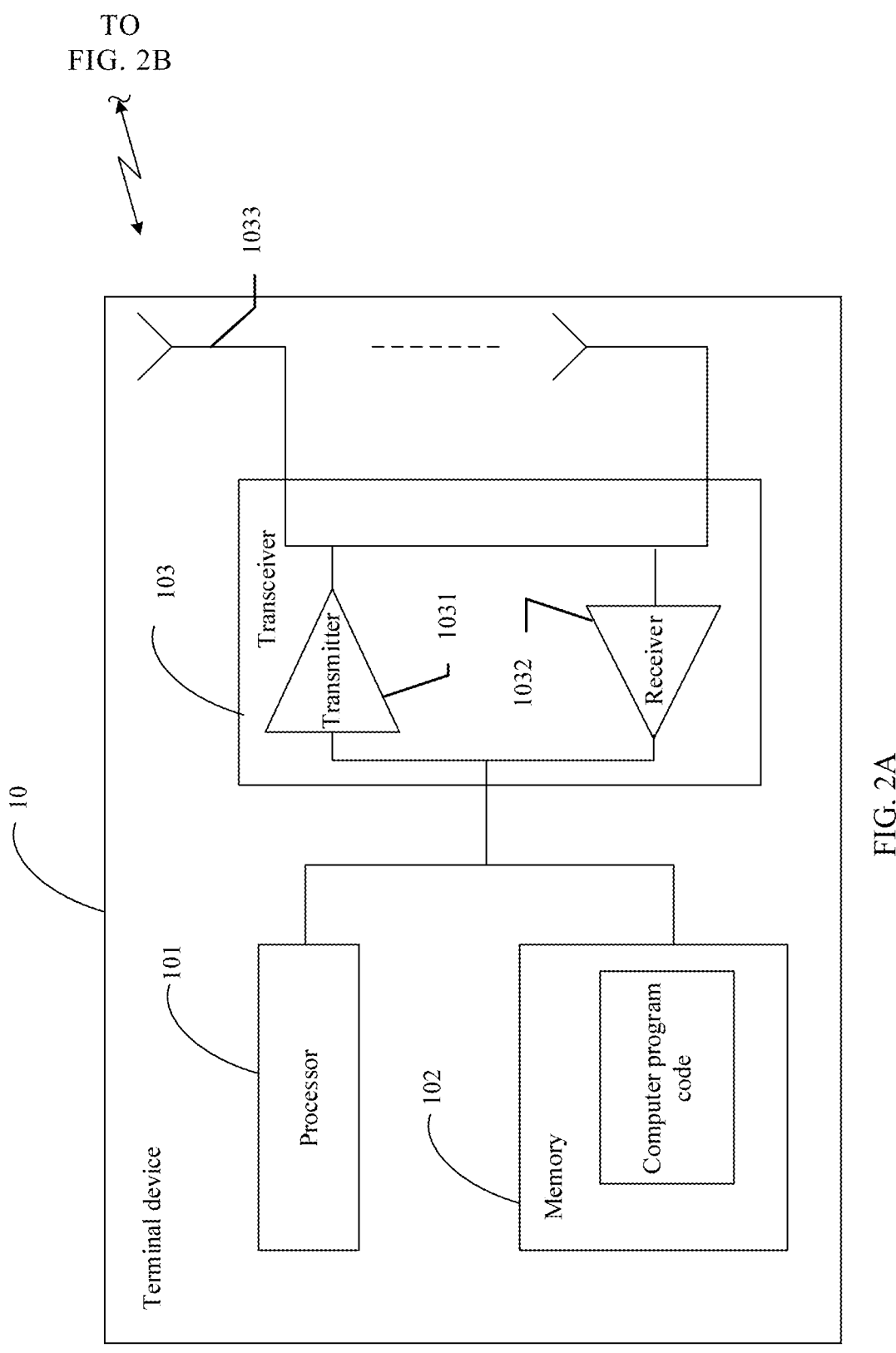
FIG. 2A and FIG. 2B are a schematic diagram of communication between a terminal device and a network device according to an embodiment of this application.
Figure 2B:
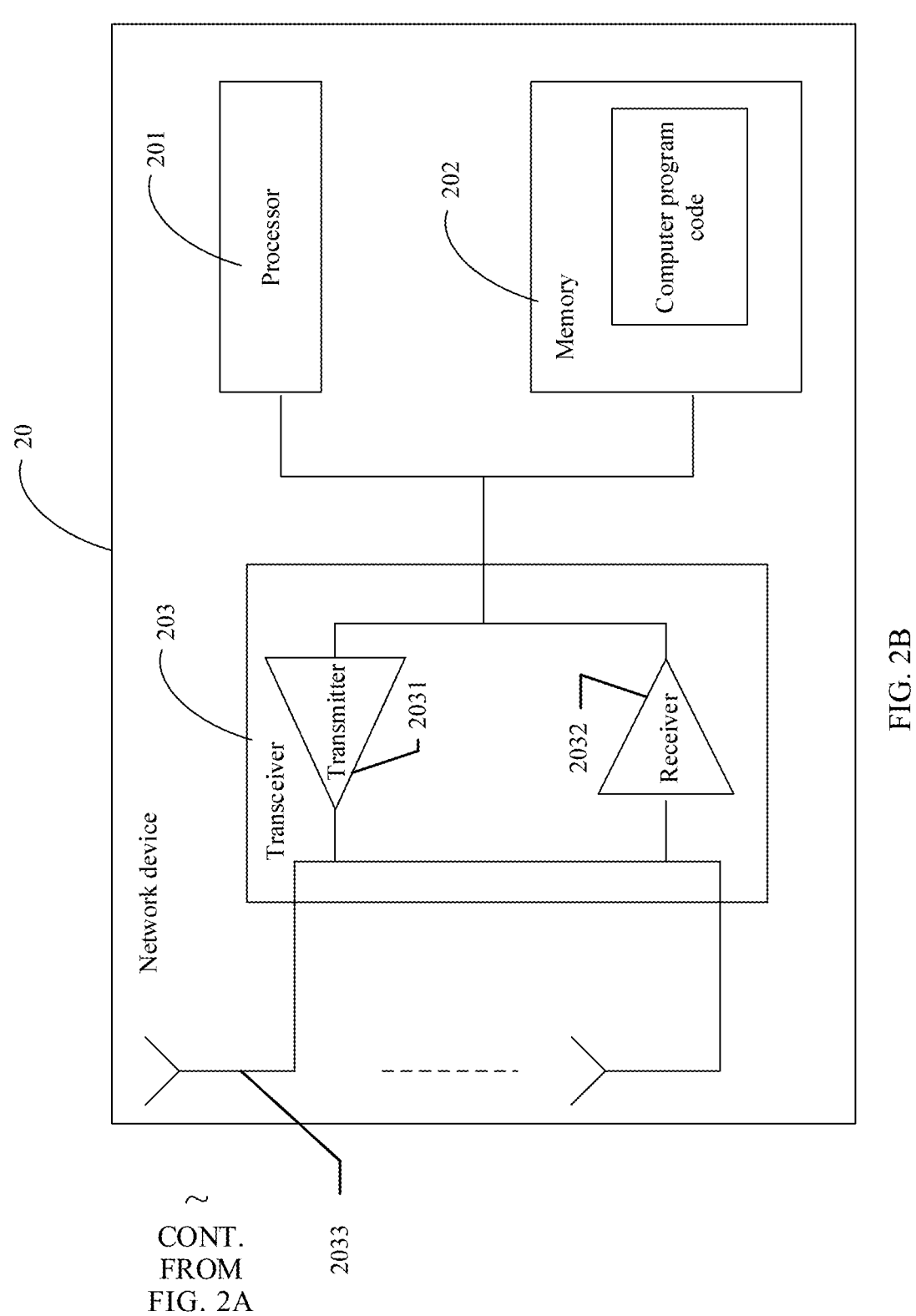

In the communications system shown in FIG. 1, communication between each network device and each terminal device may be alternatively represented in another form. For example, as shown in FIG. 2A and FIG. 2B, a terminal device 10 includes a processor 101, a memory 102, and a transceiver 103, and the transceiver 103 includes a transmitter 1031, a receiver 1032, and an antenna 1033. A network device 20 includes a processor 201, a memory 202, and a transceiver 203, and the transceiver 203 includes a transmitter 2031, a receiver 2032, and an antenna 2033. The receiver 1032 may be configured to receive transmission control information by using the antenna 1033, and the transmitter 1031 may be configured to send transmission feedback information to the network device 20 by using the antenna 1033. The transmitter 2031 may be configured to send the transmission control information to the terminal device 10 by using the antenna 2033, and the receiver 2032 may be configured to receive, by using the antenna 2033, the transmission feedback information sent by the terminal device 10.

The foregoing communications system applicable to this embodiment of this application is only used as an example for description, and the communications system applicable to this embodiment of this application is not limited thereto. For example, the communications system may include another quantity of network devices and another quantity of terminal devices.

The terminal device in embodiments of this application is an entity configured to receive or transmit a signal on a user side. The terminal device may be a device that provides voice and data connectivity for a user, for example, a handheld device or a vehicle-mounted device that has a wireless connection function. The terminal device may alternatively be another processing device connected to a wireless modem. The terminal device may communicate with one or more core networks through a radio access network (RAN). The terminal device may also be referred to as a wireless terminal, a subscriber unit, a subscriber station, a mobile station, a remote station, an access point, a remote terminal, an access terminal, a user terminal, a user agent, a user device, user equipment, or the like. The terminal device may be a mobile terminal, for example, a mobile phone (or referred to as a "cellular" phone), and a computer that has a mobile terminal. For example, the terminal device may be a portable, pocket-sized, handheld, computer built-in, or vehicle-mounted mobile apparatus, which exchanges voice and data with the radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smart watch, a smart band, or a pedometer. However, this is not limited in embodiments of this application. The terminal device in embodiments of this application may alternatively be a terminal device or the like emerging in a future evolved PLMN. This is not limited in embodiments of this application.

In addition, the terminal device in embodiments of this application may alternatively be a terminal device in an IoT system. IoT is an important part of future development of information technologies. A main technical feature of the IoT is thing to network using communications technology, to implement an intelligent network for interconnection between a person and a machine or between things. In embodiments of this application, an IoT technology may implement massive connections, deep coverage, and terminal power saving by using, for example, a narrow band (NB) technology.

In addition, in embodiments of this application, the terminal device may further include a sensor, for example, an intelligent printer, a train detector, or a gas station mainly collecting data (some terminal devices), receiving control information and downlink data from a network device, sending electromagnetic wave, and transmitting uplink data to the network device.

The network device in embodiments of this application is an entity configured to transmit or receive a signal on a network side. The network device in embodiments of this application may be a device in a wireless network, for example, a RAN node that connects a terminal to the wireless network. For example, the network device may be an evolved NodeB (eNB or e-NodeB) in LTE, a new radio controller (NR controller), a gNodeB (gNB) in a 5G system, a centralized unit (CU), a new radio base station, a remote radio module, a micro base station, a relay, a distributed unit (DU), a home eNodeB, a transmission reception point (TRP), a transmission point (TP), or any other wireless access device. This is not limited in embodiments of this application. The network device may cover one or more cells.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

5G uses high-frequency communication, in other words, uses a signal of an ultra-high band (for example, >6 GHz) to transmit data. A main problem of the high-frequency communication is that energy of a signal sharply decreases as a transmission distance increases, resulting in a short transmission distance of the signal. To overcome this problem, an analog beam technology is used in the high-frequency communication, and a large-scale antenna array is used for weighted processing, so that signal energy is concentrated in a small range, to form a signal similar to an optical beam (the signal is referred to as an analog beam, a beam for short), so as to increase a transmission distance.

In a downlink transmission process, the network device may generate different beams pointing to different transmission directions. A specific beam used for transmission is determined by using a downlink beam measurement process. Specifically, the network device may configure a group of channel resources and a group of interference resources for the terminal device by using measurement configuration information. Each channel resource corresponds to one beam, and is used to measure quality, for example, an SINR, of the beam corresponding to the channel resource. Then the terminal device selects resources with largest SINRs, and reports indexes of the resources and the corresponding SINRs to the network device. The interference resource is used to measure an interference status in a process of transmitting a beam corresponding to a channel resource, to calculate an SINR of the channel resource. To measure an SINR of a channel resource under interference of an interference resource, the channel resource and the interference resource need to use a same reception beam. In other words, the terminal device receives measurement signals on the channel resource and the interference resource by using the same reception beam, and calculates the corresponding SINR.

Figure 3:
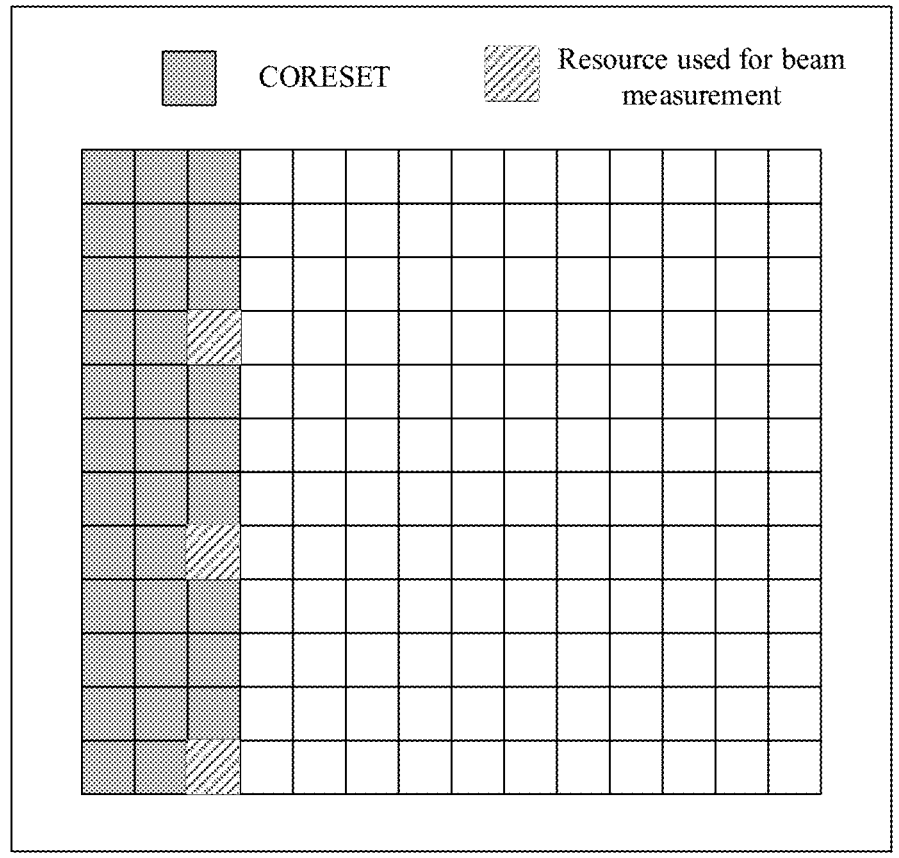
FIG. 3 is a schematic diagram of a resource conflict according to an embodiment of this application.

OFDM symbols corresponding to a resource configured by the network device for beam measurement and a CORESET may be the same or may overlap, for example, as shown in FIG. 3, and therefore a resource conflict occurs.

Based on this, embodiments of this application provide a measurement and reporting method and apparatus, to resolve a problem that a channel resource and an interference resource conflict with a CORESET resource when SINR measurement is performed. The method and the apparatus are based on a same inventive concept. Because problem-resolving principles of the method and the apparatus are similar, apparatus implementation and method implementation may be mutually referenced. Repeated parts are not described.

The method provided in embodiments of this application may be used to measure parameters, for example, an SINR and a CQI, of a beam. For ease of description, the following uses measurement of the SINR of the beam as an example for description. It should be understood that the following merely provides example descriptions, and a measured parameter is not specifically limited. In specific implementation, the SINR may be replaced with another measurement indicator such as the CQI or reference signal received quality (RSRQ). The SINR in this application may also be referred to as an L1-SINR or the like. This is not specifically limited in embodiments of this application.

A resource set in embodiments of this application may be a resource setting or a resource configuration.

A resource conflict in embodiments of this application may mean that there are same OFDM symbols or OFDM symbols overlap. It may be understood that, that there are same OFDM symbols may mean that there are exactly same OFDM symbols or partially same OFDM symbols, in other words, some OFDM symbols overlap. For example, a CSI-RS resource uses one OFDM symbol, and a CORESET uses three OFDM symbols. That a CSI-RS resource and a CORESET have or use a same symbol means that a symbol used by the CSI-RS resource is the same as one of three symbols used by the CORESET.

In this embodiment of this application, that a repetition parameter is configured as "on" may mean that a repetition configuration is "on", and the "on" form may be represented by another form such as "open", "yes", or "1" instead of "on". That a repetition parameter is configured as "off" may mean that a repetition configuration is "off", and the "off" form may be represented by another form such as "close", "no", or "( )" instead of "off".

It may be understood that an OFDM symbol occupied by a CORESET may be specifically an OFDM symbol occupied by search space associated with the CORESET.

A resource (for example, a channel resource or an interference resource) in embodiments of this application may be a non-zero power channel state information reference signal (NZP CSI-RS) resource, a channel state information interference measurement (CSI-IM) resource, a zero power channel state information reference signal (ZP CSI-RS) resource, or an SSB resource.

In embodiments of this application, that a channel resource and a CORESET have a same reception beam may mean that directions of reception beams corresponding to the channel resource and the CORESET are the same, or may mean that a quasi-colocation relationship of a type D exists between the channel resource and the CORESET, or may mean that the channel resource and the CORESET use a same TCI state. Similarly, that an interference resource and a CORESET have a same reception beam may mean that directions of reception beams corresponding to the interference resource and the CORESET are the same, or may mean that a quasi-colocation relationship of a type D exists between the interference resource and the CORESET, or may mean that the interference resource and the CORESET use a same TCI state.

In embodiments of this application, having/using a same TCI state may be understood as having/using a same reception beam or a same QCL assumption (for example, a QCL assumption of a type D), or may mean that indexes of used TCI states are the same or reference signal resources included in QCL-info of a type D in used TCI states are the same, or may mean that a QCL relationship exists, for example, a QCL relationship of a type D exists. Having/using different TCI states may be understood as having different reception beams or different QCL assumptions (for example, QCL assumptions of a type D), or may mean that indexes of used TCI states are different or reference signal resources included in QCL-info of a type D in used TCI states are different, or may mean that a QCL relationship does not exist, for example, a QCL relationship of a type D does not exist.

It should be understood that, in embodiments of this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between associated objects. "At least one of the following" or a similar expression thereof indicates any combination of the following items, and includes any combination of one or more of the following. For example, at least one (piece) of a, b, or c may indicate a, b, c, a and b, a and c, b and c, or a, b, and c, where a, b, and c may be singular or plural.

In addition, it should be understood that in descriptions of this application, words such as "first" and "second" are merely intended for purposes of description, should not be understood as an indication or implication of relative importance, should not be understood as an indication or implication of a sequence, and should not be understood as a number.

The following describes in detail the methods provided in embodiments of this application with reference to the accompanying drawings.

Embodiment 1

Figure 4:
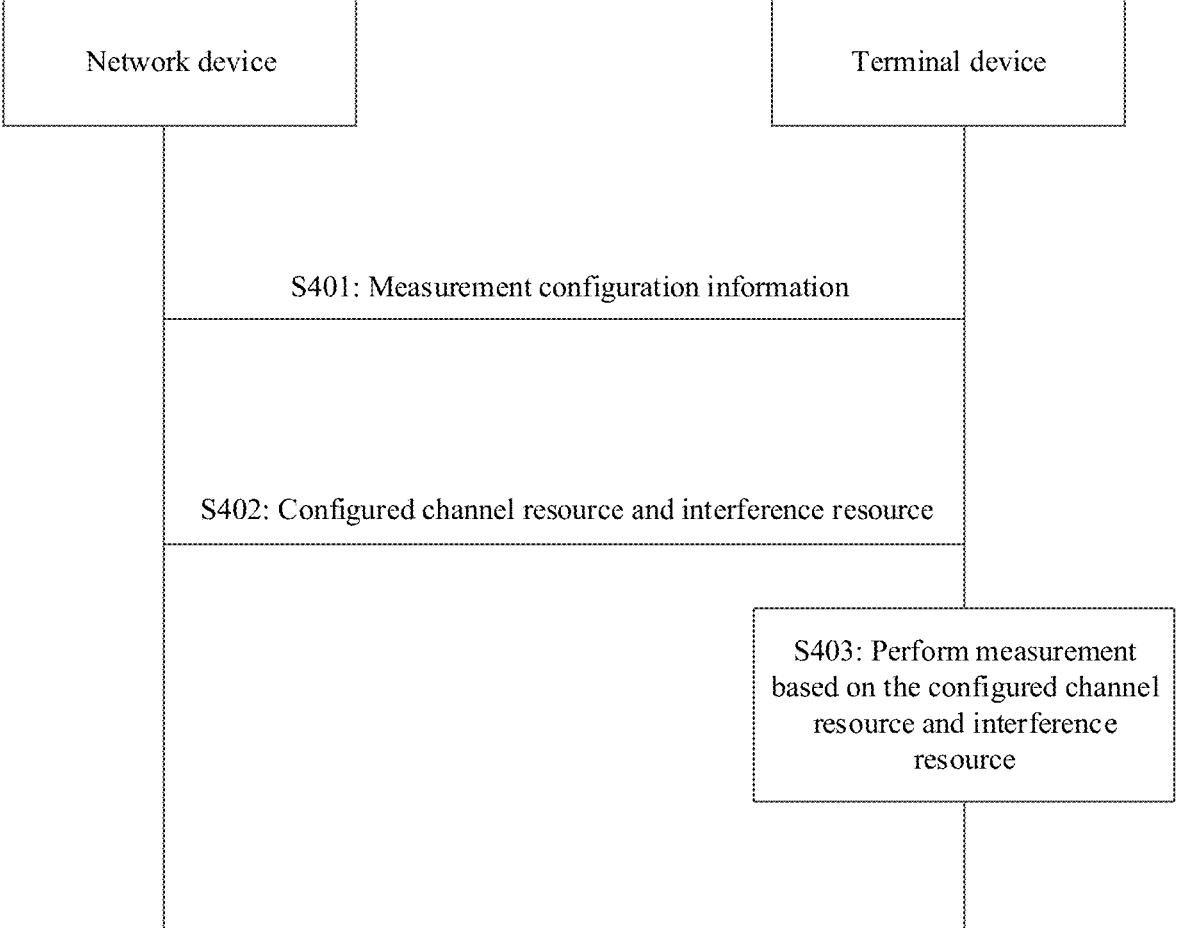
FIG. 4 is a schematic flowchart of measurement and reporting according to an embodiment of this application.

FIG. 4 is a flowchart of a measurement and reporting method according to this application. The method may be applied to a communications device, a chip, a chipset, or the like. The following uses the communications device as an example for description. The method includes the following steps.

S401: A network device sends measurement configuration information, where the measurement configuration information is used to configure a channel resource and an interference resource. Correspondingly, a terminal device receives the measurement configuration information from the network device.

One channel resource may correspond to one interference resource, in other words, channel resources may be in a one-to-one correspondence with interference resources. Alternatively, one channel resource may correspond to a plurality of interference resources, in other words, channel resources may be in a one-to-many correspondence with interference resources. Alternatively, a plurality of channel resources may correspond to one interference resource, in other words, channel resources may be in a many-to-one correspondence with interference resources.

In a possible embodiment, the following Condition 1 may be met when the network device configures the channel resource and the interference resource:

If a repetition parameter of a resource set corresponding to the channel resource is configured as "on", the channel resource and an interference resource associated with the channel resource are configured on OFDM symbols other than an OFDM symbol occupied by a CORESET (or search space associated with the CORESET).

Alternatively, this may be understood as follows: If a repetition parameter of a resource set corresponding to the channel resource is configured as "on", neither the channel resource nor an interference resource associated with the channel resource can be configured on an OFDM symbol occupied by a CORESET (or search space associated with the CORESET).

Alternatively, this may be understood as follows: If a repetition parameter of a resource set corresponding to the channel resource is configured as "on", both the channel resource and an interference resource associated with the channel resource are configured on OFDM symbols not occupied by a CORESET (or search space associated with the CORESET).

Alternatively, this may be understood as follows: If a repetition parameter of a resource set corresponding to the channel resource is configured as "on", a CORESET or search space associated with the CORESET cannot exist on OFDM symbols occupied by the channel resource and an interference resource associated with the channel resource.

Alternatively, this may be understood as follows: If a repetition parameter of a resource set corresponding to the channel resource is configured as "on", a CORESET (search space associated with the CORESET) can be configured only on a symbol other than OFDM symbols occupied by the channel resource and an interference resource associated with the channel resource.

In an example description, the measurement configuration information may include a resource configuration, and may further include a report configuration. The resource configuration may be used to configure a channel resource and an interference resource.

For example, the resource configuration is information related to resource measurement, and may be configured by using a three-level structure (resourceConfig-resourceSet-resource) in a protocol.

The network device may configure one or more resource configurations for the terminal device.

In an implementation, one or more channel resources may be configured by using the resource configuration. In an implementation, one group of channel resources and one or more groups of interference resources may be configured by using the resource configuration. For example, the resource configuration may include one resource setting used for channel measurement and one or more resource settings used for interference measurement. Each resource setting may include one or more resource sets. Each resource set may include one or more resources. Each resource configuration/resource set/resource may include an index of the resource configuration/resource set/resource, and further includes some other parameters such as a resource periodicity and a signal type corresponding to the resource.

The report configuration may be information related to measurement result reporting, and is configured by using reportConfig in the protocol. The network device may configure one or more pieces of reportConfig for the terminal device. Each report configuration may include information related to reporting, for example, a reporting indicator, reporting time, a reporting periodicity, and a reporting format. In addition, the report configuration may further include an index of the resource configuration, and the index is used to indicate a measurement configuration with which a reported result is obtained through measurement.

The channel resource and the interference resource may be specifically a channel resource and an interference resource that are used for SINR measurement.

In an implementation, if a plurality of channel resources are configured by using the resource configuration, each channel resource can meet the foregoing Condition 1.

S402: The network device sends the configured channel resource and interference resource.

S403: The terminal device performs measurement based on the configured channel resource and interference resource.

In an implementation, after performing measurement based on the configured channel resource and interference resource, the terminal device may report a measurement result to the network device.

Embodiment 2

This application provides a flowchart of another measurement and reporting method. The method may be applied to a communications device, a chip, a chipset, or the like. The following uses the communications device as an example for description. A procedure of the method is similar to a procedure of the measurement and reporting method in Embodiment 1. A difference lies in that in Embodiment 1, Condition 1 may be met when a network device configures a channel resource and an interference resource, and in Embodiment 2, the following Condition 2 may be met when a network device configures a channel resource and an interference resource. For details, refer to Embodiment 1. Details are not described herein again.

Condition 2 may be as follows:

If a repetition parameter of a resource set corresponding to the interference resource is configured as "on", the interference resource and a channel resource associated with the interference resource are configured on OFDM symbols other than an OFDM symbol occupied by a CORESET.

Alternatively, this may be understood as follows: If a repetition parameter of a resource set corresponding to the interference resource is configured as "on", neither the interference resource nor a channel resource associated with the interference resource can be configured on an OFDM symbol occupied by a CORESET (or search space associated with the CORESET).

Alternatively, this may be understood as follows: If a repetition parameter of a resource set corresponding to the interference resource is configured as "on", both the interference resource and a channel resource associated with the interference resource are configured on OFDM symbols not occupied by a CORESET (or search space associated with the CORESET).

Alternatively, this may be understood as follows: If a repetition parameter of a resource set corresponding to the interference resource is configured as "on", a CORESET or search space associated with the CORESET cannot exist on OFDM symbols occupied by the interference resource and a channel resource associated with the interference resource.

Alternatively, this may be understood as follows: If a repetition parameter of a resource set corresponding to the interference resource is configured as "on", a CORESET (search space associated with the CORESET) can be configured only on a symbol other than OFDM symbols occupied by the interference resource and a channel resource associated with the interference resource.

Embodiment 3

This application provides a flowchart of another measurement and reporting method. The method may be applied to a communications device, a chip, a chipset, or the like. The following uses the communications device as an example for description. A procedure of the method is similar to a procedure of the measurement and reporting method in Embodiment 1. A difference lies in that in Embodiment 1, Condition 1 may be met when a network device configures a channel resource and an interference resource, and in Embodiment 3, the following Condition 3 may be met when a network device configures a channel resource and an interference resource. For a specific procedure, refer to Embodiment 1. Details are not described herein again.

Condition 3 may be as follows:

If a repetition parameter of either of a resource set corresponding to the channel resource and a resource set corresponding to an interference resource associated with the channel resource is configured as "on", the channel resource and the interference resource associated with the channel resource are configured on OFDM symbols other than an OFDM symbol occupied by a CORESET.

Alternatively, this may be understood as follows: If a repetition parameter of either of a resource set corresponding to the channel resource and a resource set corresponding to an interference resource associated with the channel resource is configured as "on", neither the channel resource nor the interference resource associated with the channel resource can be configured on an OFDM symbol occupied by a CORESET (or search space associated with the CORESET).

Alternatively, this may be understood as follows: If a repetition parameter of either of a resource set corresponding to the channel resource and a resource set corresponding to an interference resource associated with the channel resource is configured as "on", both the channel resource and the interference resource associated with the channel resource are configured on OFDM symbols not occupied by a CORESET (or search space associated with the CORESET).

Alternatively, this may be understood as follows: If a repetition parameter of either of a resource set corresponding to the channel resource and a resource set corresponding to an interference resource associated with the channel resource is configured as "on", a CORESET or search space associated with the CORESET cannot exist on OFDM symbols occupied by the channel resource and the interference resource associated with the channel resource.

Alternatively, this may be understood as follows: If a repetition parameter of either of a resource set corresponding to the channel resource and a resource set corresponding to an interference resource associated with the channel resource is configured as "on", a CORESET (search space associated with the CORESET) can be configured only on a symbol other than OFDM symbols occupied by the channel resource and the interference resource associated with the channel resource.

Embodiment 4

This application provides a flowchart of another measurement and reporting method. The method may be applied to a communications device, a chip, a chipset, or the like. The following uses the communications device as an example for description. A procedure of the method is similar to a procedure of the measurement and reporting method in Embodiment 1. A difference lies in that in Embodiment 1, Condition 1 may be met when a network device configures a channel resource and an interference resource, and in Embodiment 4, the following Condition 4 may be met when a network device configures a channel resource and an interference resource. For a specific procedure, refer to Embodiment 1. Details are not described herein again.

Condition 4 may be as follows:

If both a repetition parameter of a resource set corresponding to the channel resource and a repetition parameter of a resource set corresponding to an interference resource associated with the channel resource are configured as "on", the channel resource and the interference resource associated with the channel resource are configured on OFDM symbols other than an OFDM symbol occupied by a CORESET.

Alternatively, this may be understood as follows: If both a repetition parameter of a resource set corresponding to the channel resource and a repetition parameter of a resource set corresponding to an interference resource associated with the channel resource are configured as "on", neither the channel resource nor the interference resource associated with the channel resource can be configured on an OFDM symbol occupied by a CORESET (or search space associated with the CORESET).

Alternatively, this may be understood as follows: If both a repetition parameter of a resource set corresponding to the channel resource and a repetition parameter of a resource set corresponding to an interference resource associated with the channel resource are configured as "on", both the channel resource and the interference resource associated with the channel resource are configured on OFDM symbols not occupied by a CORESET (or search space associated with the CORESET).

Alternatively, this may be understood as follows: If both a repetition parameter of a resource set corresponding to the channel resource and a repetition parameter of a resource set corresponding to an interference resource associated with the channel resource are configured as "on", a CORESET or search space associated with the CORESET cannot exist on OFDM symbols occupied by the channel resource and the interference resource associated with the channel resource.

Alternatively, this may be understood as follows: If both a repetition parameter of a resource set corresponding to the channel resource and a repetition parameter of a resource set corresponding to an interference resource associated with the channel resource are configured as "on", a CORESET (search space associated with the CORESET) can be configured only on a symbol other than OFDM symbols occupied by the channel resource and the interference resource associated with the channel resource.

Embodiment 5

This application provides a flowchart of another measurement and reporting method. The method may be applied to a communications device, a chip, a chipset, or the like. The following uses the communications device as an example for description. A procedure of the method is similar to a procedure of the measurement and reporting method in Embodiment 1. A difference lies in that in Embodiment 1, Condition 1 may be met when a network device configures a channel resource and an interference resource, and in Embodiment 5, the following Condition 5 may be met when a network device configures a channel resource and an interference resource. For a specific procedure, refer to Embodiment 1. Details are not described herein again.

Condition 5 may be as follows:

If a repetition parameter of a resource set corresponding to the channel resource is configured as "on", the channel resource is configured on an OFDM symbol other than an OFDM symbol occupied by a CORESET.

Alternatively, this may be understood as follows: If a repetition parameter of a resource set corresponding to the channel resource is configured as "on", the channel resource cannot be configured on an OFDM symbol occupied by a CORESET (or search space associated with the CORESET).

Alternatively, this may be understood as follows: If a repetition parameter of a resource set corresponding to the channel resource is configured as "on", the channel resource is configured on an OFDM symbol not occupied by a CORESET (or search space associated with the CORESET).

Alternatively, this may be understood as follows: If a repetition parameter of a resource set corresponding to the channel resource is configured as "on", a CORESET or search space associated with the CORESET cannot exist on an OFDM symbol occupied by the channel resource.

Alternatively, this may be understood as follows: If a repetition parameter of a resource set corresponding to the channel resource is configured as "on", a CORESET (search space associated with the CORESET) can be configured only on a symbol other than an OFDM symbol occupied by the channel resource.

Alternatively, Condition 5 may be as follows:

If a repetition parameter of a resource set corresponding to the channel resource is configured as "on", an interference resource associated with the channel resource is configured on an OFDM symbol other than an OFDM symbol occupied by a CORESET.

Alternatively, this may be understood as follows: If a repetition parameter of a resource set corresponding to the channel resource is configured as "on", an interference resource associated with the channel resource cannot be configured on an OFDM symbol occupied by a CORESET (or search space associated with the CORESET).

Alternatively, this may be understood as follows: If a repetition parameter of a resource set corresponding to the channel resource is configured as "on", an interference resource associated with the channel resource is configured on an OFDM symbol not occupied by a CORESET (or search space associated with the CORESET).

Alternatively, this may be understood as follows: If a repetition parameter of a resource set corresponding to the channel resource is configured as "on", a CORESET or search space associated with the CORESET cannot exist on an OFDM symbol occupied by an interference resource associated with the channel resource.

Alternatively, this may be understood as follows: If a repetition parameter of a resource set corresponding to the channel resource is configured as "on", a CORESET (search space associated with the CORESET) can be configured only on a symbol other than an OFDM symbol occupied by an interference resource associated with the channel resource.

Embodiment 6

This application provides a flowchart of another measurement and reporting method. The method may be applied to a communications device, a chip, a chipset, or the like. The following uses the communications device as an example for description. A procedure of the method is similar to a procedure of the measurement and reporting method in Embodiment 1. A difference lies in that in Embodiment 1, Condition 1 may be met when a network device configures a channel resource and an interference resource, and in Embodiment 6, the following Condition 6 may be met when a network device configures a channel resource and an interference resource. For a specific procedure, refer to Embodiment 1. Details are not described herein again.

Condition 6 may be as follows:

If a repetition parameter of a resource set corresponding to the interference resource is configured as "on", the interference resource is configured on an OFDM symbol other than an OFDM symbol occupied by a CORESET.

Alternatively, this may be understood as follows: If a repetition parameter of a resource set corresponding to the interference resource is configured as "on", the interference resource cannot be configured on an OFDM symbol occupied by a CORESET (or search space associated with the CORESET).

Alternatively, this may be understood as follows: If a repetition parameter of a resource set corresponding to the interference resource is configured as "on", the interference resource is configured on an OFDM symbol not occupied by a CORESET (or search space associated with the CORESET).

Alternatively, this may be understood as follows: If a repetition parameter of a resource set corresponding to the interference resource is configured as "on", a CORESET or search space associated with the CORESET cannot exist on an OFDM symbol occupied by the interference resource.

Alternatively, this may be understood as follows: If a repetition parameter of a resource set corresponding to the interference resource is configured as "on", a CORESET (search space associated with the CORESET) can be configured only on a symbol other than an OFDM symbol occupied by the interference resource.

Alternatively, Condition 6 may be as follows:

If a repetition parameter of a resource set corresponding to the interference resource is configured as "on", a channel resource corresponding to the interference resource is configured on an OFDM symbol other than an OFDM symbol occupied by a CORESET.

Alternatively, this may be understood as follows: If a repetition parameter of a resource set corresponding to the interference resource is configured as "on", a channel resource corresponding to the interference resource cannot be configured on an OFDM symbol occupied by a CORESET (or search space associated with the CORESET).

Alternatively, this may be understood as follows: If a repetition parameter of a resource set corresponding to the interference resource is configured as "on", a channel resource corresponding to the interference resource is configured on an OFDM symbol not occupied by a CORESET (or search space associated with the CORESET).

Alternatively, this may be understood as follows: If a repetition parameter of a resource set corresponding to the interference resource is configured as "on", a CORESET or search space associated with the CORESET cannot exist on an OFDM symbol occupied by a channel resource corresponding to the interference resource.

Alternatively, this may be understood as follows: If a repetition parameter of a resource set corresponding to the interference resource is configured as "on", a CORESET (search space associated with the CORESET) can be configured only on a symbol other than an OFDM symbol occupied by a channel resource corresponding to the interference resource.

Embodiment 7

This application provides a flowchart of another measurement and reporting method. The method may be applied to a communications device, a chip, a chipset, or the like. The following uses the communications device as an example for description. A procedure of the method is similar to a procedure of the measurement and reporting method in Embodiment 1. A difference lies in that in Embodiment 1, Condition 1 may be met when a network device configures a channel resource and an interference resource, and in Embodiment 7, the following Condition 7 may be met when a network device configures a channel resource and an interference resource. For a specific procedure, refer to Embodiment 1. Details are not described herein again.

Condition 7 may be as follows:

When SINR measurement or CQI measurement is performed, the channel resource and an interference resource associated with the channel resource are configured on OFDM symbols other than an OFDM symbol occupied by a CORESET. Alternatively, this may be understood as follows: When SINR measurement or CQI measurement is performed, neither the channel resource nor an interference resource associated with the channel resource can be configured on an OFDM symbol occupied by a CORESET (or search space associated with the CORESET). Alternatively, this may be understood as follows: When SINR measurement or CQI measurement is performed, the channel resource and an interference resource associated with the channel resource are configured on OFDM symbols not occupied by a CORESET (or search space associated with the CORESET).

Alternatively, Condition 7 may be as follows:

When SINR measurement or CQI measurement is performed, the channel resource is configured on an OFDM symbol other than an OFDM symbol occupied by a CORESET. Alternatively, this may be understood as follows: When SINR measurement or CQI measurement is performed, the channel resource cannot be configured on an OFDM symbol occupied by a CORESET (or search space associated with the CORESET). Alternatively, this may be understood as follows: When SINR measurement or CQI measurement is performed, the channel resource is configured on an OFDM symbol not occupied by a CORESET (or search space associated with the CORESET).

Alternatively, Condition 7 may be as follows:

When SINR measurement or CQI measurement is performed, the interference resource is configured on an OFDM symbol other than an OFDM symbol occupied by a CORESET. Alternatively, this may be understood as follows: When SINR measurement or CQI measurement is performed, the interference resource cannot be configured on an OFDM symbol occupied by a CORESET (or search space associated with the CORESET). Alternatively, this may be understood as follows: When SINR measurement or CQI measurement is performed, the interference resource is configured on an OFDM symbol not occupied by a CORESET (or search space associated with the CORESET).

Alternatively, Condition 7 may be as follows:

When SINR measurement or CQI measurement is performed, the channel resource and an interference resource corresponding to the channel resource cannot respectively use same symbols as two CORESETs. Alternatively, this may be understood as follows: Only one of the channel resource and an interference resource corresponding to the channel resource can use a same symbol as one CORESET, or the channel resource and an interference resource corresponding to the channel resource use a same symbol as a same CORESET.

In other words, when SINR measurement or CQI measurement is performed, if the channel resource and a first CORESET have a same symbol, the interference resource corresponding to the channel resource can be configured only on an OFDM symbol other than a second CORESET. The second CORESET may be any CORESET that has a different TCI state from the first CORESET, or may be understood as any CORESET that has a different QCL relationship (for example, a different QCL relationship of a type D) from the first CORESET.

Alternatively, this may be understood as follows: When SINR measurement or CQI measurement is performed, if the channel resource and a first CORESET have a same symbol, the interference resource corresponding to the channel resource can be configured only on the following resources: an OFDM symbol occupied by the first CORESET, an OFDM symbol occupied by a CORESET having a same TCI state as the first CORESET, and an OFDM symbol other than all CORESETs.

Alternatively, when SINR measurement or CQI measurement is performed, if the interference resource and a third CORESET have a same symbol, a channel resource corresponding to the interference resource can be configured only on a symbol other than a fourth CORESET. The fourth CORESET may be any CORESET that has a different TCI state from the third CORESET, or may be understood as any CORESET that has a different QCL relationship (for example, a different QCL relationship of a type D) from the third CORESET.

Alternatively, this may be understood as follows: When SINR measurement or CQI measurement is performed, if the interference resource and a third CORESET have a same symbol, a channel resource corresponding to the interference resource can be configured only on the following resources: an OFDM symbol occupied by the third CORESET, an OFDM symbol occupied by a CORESET having a same TCI state as the third CORESET, and an OFDM symbol other than all CORESETs.

Alternatively, Condition 7 may be as follows:

When SINR measurement or CQI measurement is performed, the channel resource and an interference resource corresponding to the channel resource cannot respectively have same symbols as two CORESETs, in other words, the channel resource and the interference resource corresponding to the channel resource use a same symbol as a maximum of one CORESET.

In other words, when SINR measurement or CQI measurement is performed, the interference resource and a channel resource corresponding to the interference resource cannot respectively have same symbols as two CORESETs, in other words, the interference resource and the channel resource corresponding to the interference resource use a same symbol as a maximum of one CORESET.

In an example description, if a channel resource and a CORESET have a same symbol, an interference resource corresponding to the channel resource can be configured only on a symbol other than any other CORESET.

Alternatively, this may be understood as follows: When SINR measurement or CQI measurement is performed, if a channel resource and a first CORESET have a same symbol, an interference resource corresponding to the channel resource can be configured only on the following resources: an OFDM symbol occupied by the first CORESET and an OFDM symbol other than all CORESETs.

In another example description, if an interference resource and a CORESET have a same symbol, a channel resource corresponding to the interference resource can be configured only on a symbol other than any other CORESET.

Alternatively, this may be understood as follows: When SINR measurement or CQI measurement is performed, if an interference resource and a third CORESET have a same symbol, a channel resource corresponding to the interference resource can be configured only on the following resources: an OFDM symbol occupied by the third CORESET and an OFDM symbol other than all CORESETs.

In Embodiment 1 to Embodiment 7, when a repetition parameter of a resource set corresponding to a channel resource and/or a repetition parameter of a resource set corresponding to an interference resource are or is configured as "on", a CORESET cannot be configured on an OFDM symbol of the channel resource and/or an OFDM symbol of the interference resource, or the channel resource and/or the interference resource cannot be configured on an OFDM symbol on which the CORESET is located. A condition limitation may be further added. To be specific, when a repetition parameter of a resource set corresponding to a channel resource and/or a repetition parameter of a resource set corresponding to an interference resource are or is configured as "on", and a TCI state of the channel resource and/or a TCI state of the interference resource are or is different from a TCI state of a CORESET, the CORESET cannot be configured on an OFDM symbol of the channel resource and/or an OFDM symbol of the interference resource, or the channel resource and/or the interference resource cannot be configured on an OFDM symbol on which the CORESET is located. In other words, even if the repetition parameter of the resource set corresponding to the channel resource and/or the repetition parameter of the resource set corresponding to the interference resource are or is configured as "on", the channel resource/interference resource and the CORESET can be configured on a same symbol provided that the TCI state of the channel resource/ interference resource is the same as the TCI state of the CORESET. The further added condition limitation may be applied to any one of Embodiment 1 to Embodiment 7, and details are not described herein one by one.

Embodiment 8

This application provides a flowchart of another measurement and reporting method. The method may be applied to a communications device, a chip, a chipset, or the like. The following uses the communications device as an example for description. A procedure of the method is similar to a procedure of the measurement and reporting method in Embodiment 1. A difference lies in that in Embodiment 1, Condition 1 may be met when a network device configures a channel resource and an interference resource, and in Embodiment 8, the following Condition 8 may be met when a network device configures a channel resource and an interference resource. For a specific procedure, refer to Embodiment 1. Details are not described herein again.

Condition 8 may be as follows:

When a repetition parameter of a resource set corresponding to the channel resource is configured as "off", if the channel resource and a CORESET use a same reception beam, the channel resource and the CORESET can use a same OFDM symbol, which may also mean that the channel resource and the CORESET can be configured on a same OFDM symbol. On the contrary, the channel resource and the CORESET cannot be configured on a same OFDM symbol. To be specific, the channel resource cannot be configured on an OFDM symbol on which the CORESET is located, in other words, the channel resource can be configured only on an OFDM symbol other than the CORESET. Alternatively, the CORESET cannot be configured on an OFDM symbol on which the channel resource is located, in other words, the CORESET can be configured only on an OFDM symbol other than the channel resource.

Alternatively, Condition 8 may be as follows:

When a repetition parameter of a resource set corresponding to the interference resource is configured as "off", if the interference resource and a CORESET use a same reception beam, the interference resource and the CORESET can use a same OFDM symbol, which may also mean that the interference resource and the CORESET can be configured on a same OFDM symbol. On the contrary, the interference resource and the CORESET cannot be configured on a same OFDM symbol. To be specific, the interference resource cannot be configured on an OFDM symbol on which the CORESET is located, in other words, the interference resource can be configured only on an OFDM symbol other than the CORESET. Alternatively, the CORESET cannot be configured on an OFDM symbol on which the interference resource is located, in other words, the CORESET can be configured only on an OFDM symbol other than the interference resource.

Alternatively, Condition 8 may be as follows:

When a repetition parameter of a resource set corresponding to the channel resource is configured as "off" and/or a repetition parameter of a resource set corresponding to an interference resource associated with the channel resource is configured as "off", if the channel resource and a CORESET use a same reception beam, the interference resource corresponding to the channel resource and the CORESET can use a same OFDM symbol, which may also mean that the interference resource corresponding to the channel resource and the CORESET can be configured on a same OFDM symbol. On the contrary, the interference resource corresponding to the channel resource and the CORESET cannot be configured on a same OFDM symbol. To be specific, the interference resource corresponding to the channel resource cannot be configured on an OFDM symbol on which the CORESET is located, in other words, the interference resource corresponding to the channel resource can be configured only on an OFDM symbol other than the CORESET. Alternatively, the CORESET cannot be configured on an OFDM symbol on which the interference resource corresponding to the channel resource is located, in other words, the CORESET can be configured only on an OFDM symbol other than the interference resource corresponding to the channel resource.

Alternatively, Condition 8 may be as follows:

When a repetition parameter of a resource set corresponding to the channel resource is configured as "off" and/or a repetition parameter of a resource set corresponding to an interference resource associated with the channel resource is configured as "off", if the channel resource and a CORESET use a same reception beam, the channel resource, the interference resource associated with the channel resource, and the CORESET can use a same OFDM symbol, which may also mean that the channel resource and the interference resource associated with the channel resource can be configured on a same OFDM symbol as the CORESET. On the contrary, the channel resource and the interference resource associated with the channel resource cannot be configured on a same OFDM symbol as the CORESET. To be specific, the channel resource and the interference resource associated with the channel resource cannot be configured on an OFDM symbol on which the CORESET is located, in other words, the channel resource and the interference resource associated with the channel resource can be configured only on an OFDM symbol other than the CORESET. Alternatively, the CORESET cannot be configured on OFDM symbols on which the channel resource and the interference resource associated with the channel resource are located, in other words, the CORESET can be configured only on an OFDM symbol other than the channel resource and the interference resource associated with the channel resource.

Alternatively, Condition 8 may be as follows:

When a repetition parameter of a resource set corresponding to the interference resource is configured as "off" and/or a repetition parameter of a resource set corresponding to a channel resource associated with the interference resource is configured as "off", if the interference resource and a CORESET use a same reception beam, the channel resource associated with the interference resource and the CORESET can use a same OFDM symbol, which may also mean that the channel resource associated with the interference resource and the CORESET can be configured on a same OFDM symbol. On the contrary, the channel resource associated with the interference resource and the CORESET cannot be configured on a same OFDM symbol. To be specific, the channel resource associated with the interference resource cannot be configured on an OFDM symbol on which the CORESET is located, in other words, the channel resource associated with the interference resource can be configured only on an OFDM symbol other than the CORESET. Alternatively, the CORESET cannot be configured on an OFDM symbol on which the channel resource corresponding to the interference resource is located, in other words, the CORESET can be configured only on an OFDM symbol other than the channel resource corresponding to the interference resource.

Alternatively, Condition 8 may be as follows:

When a repetition parameter of a resource set corresponding to the interference resource is configured as "off" and/or a repetition parameter of a resource set corresponding to a channel resource associated with the interference resource is configured as "off", if the interference resource and a CORESET use a same reception beam, the interference resource, the channel resource associated with the interference resource, and the CORESET can use a same OFDM symbol, which may also mean that the interference resource and the channel resource associated with the interference resource can be configured on a same OFDM symbol as the CORESET. On the contrary, the interference resource and the channel resource associated with the interference resource cannot be configured on a same OFDM symbol as the CORESET. To be specific, the interference resource and the channel resource associated with the interference resource cannot be configured on an OFDM symbol on which the CORESET is located, in other words, the interference resource and the channel resource associated with the interference resource can be configured only on an OFDM symbol other than the CORESET. Alternatively, the CORESET cannot be configured on OFDM symbols on which the interference resource and the channel resource associated with the interference resource are located, in other words, the CORESET can be configured only on an OFDM symbol other than the interference resource and the channel resource associated with the interference resource.

Alternatively, Condition 8 may be as follows:

When both a repetition parameter of a resource set corresponding to the channel resource and a repetition parameter of a resource set corresponding to the interference resource are configured as "off", if two CORESETs have a same reception beam or TCI state, the channel resource and an interference resource corresponding to the channel resource can respectively use same symbols as the two CORESETs. On the contrary, the channel resource and the interference resource corresponding to the channel resource cannot respectively use same symbols as the two CORE-SETs. In other words, if two CORESETs do not have a same reception beam, the channel resource and the interference resource corresponding to the channel resource cannot respectively have same symbols as the two CORESETs. In other words, the channel resource and the interference resource corresponding to the channel resource use a same symbol as a maximum of one of the two CORESETs.

In other words, when both the repetition parameter of the resource set corresponding to the channel resource and the repetition parameter of the resource set corresponding to the interference resource are configured as "off", if the channel resource and a first CORESET have a same symbol, the interference resource corresponding to the channel resource can be configured only on a symbol other than a second CORESET. The second CORESET may be any CORESET that has a different TCI state from the first CORESET, or may be understood as any CORESET that has a different QCL relationship (for example, a different QCL relationship of a type D) from the first CORESET.

Alternatively, this may be understood as follows: When both the repetition parameter of the resource set corresponding to the channel resource and the repetition parameter of the resource set corresponding to the interference resource are configured as "off", if the channel resource and a first CORESET have a same symbol, the interference resource corresponding to the channel resource can be configured only on the following resources: an OFDM symbol occupied by the first CORESET, an OFDM symbol occupied by a CORESET that has a same TCI state as the first CORESET, and an OFDM symbol other than all CORESETs.

Alternatively, when both the repetition parameter of the resource set corresponding to the channel resource and the repetition parameter of the resource set corresponding to the interference resource are configured as "off", if the interference resource and a third CORESET have a same symbol, a channel resource corresponding to the interference resource can be configured only on a symbol other than a fourth CORESET. The fourth CORESET may be any CORESET that has a different TCI state from the third CORESET, or may be understood as any CORESET that has a different QCL relationship (for example, a different QCL relationship of a type D) from the third CORESET.

Alternatively, this may be understood as follows: When both the repetition parameter of the resource set corresponding to the channel resource and the repetition parameter of the resource set corresponding to the interference resource are configured as "off", if the interference resource and a third CORESET have a same symbol, a channel resource corresponding to the interference resource can be configured only on the following resources: an OFDM symbol occupied by the third CORESET, an OFDM symbol occupied by a CORESET that has a same TCI state as the third CORESET, and an OFDM symbol other than all CORESETs.

Alternatively, Condition 8 may be as follows:

When both a repetition parameter of a resource set corresponding to the channel resource and a repetition parameter of a resource set corresponding to the interference resource are configured as "off", if two CORESETs have a same reception beam or TCI state, and the channel resource and/or an interference resource corresponding to the channel resource have or has a same TCI state as the two CORE-SETs, the channel resource and the interference resource corresponding to the channel resource can respectively use same symbols as the two CORESETs. On the contrary, the channel resource and the interference resource corresponding to the channel resource cannot respectively use same symbols as the two CORESETs. In other words, if two CORESETs do not have a same reception beam, or the channel resource and/or the interference resource corresponding to the channel resource have or has a different TCI state from the two CORESETs, the channel resource and the interference resource corresponding to the channel resource cannot respectively have same symbols as the two CORE-SETs. In other words, the channel resource and the interference resource corresponding to the channel resource use a same symbol as a maximum of one of the two CORESETs.

In other words, when both the repetition parameter of the resource set corresponding to the channel resource and the repetition parameter of the resource set corresponding to the interference resource are configured as "off", if the channel resource and a first CORESET have a same symbol, the interference resource corresponding to the channel resource can be configured only on a symbol other than a second CORESET. The second CORESET may be any CORESET that has a different TCI state from the first CORESET, or may be understood as any CORESET that has a different QCL relationship (for example, a different QCL relationship of a type D) from the first CORESET.

Alternatively, this may be understood as follows: When both the repetition parameter of the resource set corresponding to the channel resource and the repetition parameter of the resource set corresponding to the interference resource are configured as "off", if the channel resource and a first CORESET have a same symbol, the interference resource corresponding to the channel resource can be configured only on the following resources: an OFDM symbol occupied by the first CORESET, an OFDM symbol occupied by a CORESET that has a same TCI state as the first CORESET, and an OFDM symbol other than all CORESETs.

Alternatively, when both the repetition parameter of the resource set corresponding to the channel resource and the repetition parameter of the resource set corresponding to the interference resource are configured as "off", if the interference resource and a third CORESET have a same symbol, a channel resource corresponding to the interference resource can be configured only on a symbol other than a fourth CORESET. The fourth CORESET may be any CORESET that has a different TCI state from the third CORESET, or may be understood as any CORESET that has a different QCL relationship (for example, a different QCL relationship of a type D) from the third CORESET.

Alternatively, this may be understood as follows: When both the repetition parameter of the resource set corresponding to the channel resource and the repetition parameter of the resource set corresponding to the interference resource are configured as "off", if the interference resource and a third CORESET have a same symbol, a channel resource corresponding to the interference resource can be configured only on the following resources: an OFDM symbol occupied by the third CORESET, an OFDM symbol occupied by a CORESET that has a same TCI state as the third CORESET, and an OFDM symbol other than all CORESETs.

Alternatively, Condition 8 may be as follows:

When both a repetition parameter of a resource set corresponding to the channel resource and a repetition parameter of a resource set corresponding to the interference resource are configured as "off", the channel resource and an interference resource corresponding to the channel resource cannot respectively have same symbols as two CORESETs, in other words, the channel resource and the interference resource corresponding to the channel resource use a same symbol as a maximum of one CORESET.

In other words, when both the repetition parameter of the resource set corresponding to the channel resource and the repetition parameter of the resource set corresponding to the interference resource are configured as "off", the interference resource and a channel resource corresponding to the interference resource cannot respectively have same symbols as two CORESETs, in other words, the interference resource and the channel resource corresponding to the interference resource use a same symbol as a maximum of one CORESET.

In an example description, if a channel resource and a CORESET have a same symbol, an interference resource corresponding to the channel resource can be configured only on a symbol other than any other CORESET.

Alternatively, this may be understood as follows: When both a repetition parameter of a resource set corresponding to the channel resource and a repetition parameter of a resource set corresponding to the interference resource are configured as "off", if the channel resource and a first CORESET have a same symbol, an interference resource corresponding to the channel resource can be configured only on the following resources: an OFDM symbol occupied by the first CORESET and an OFDM symbol other than all CORESETs.

In another example description, if an interference resource and a CORESET have a same symbol, a channel resource corresponding to the interference resource can be configured only on a symbol other than any other CORESET.

Alternatively, this may be understood as follows: When both a repetition parameter of a resource set corresponding to the channel resource and a repetition parameter of a resource set corresponding to the interference resource are configured as "off", if the interference resource and a third CORESET have a same symbol, a channel resource corresponding to the interference resource can be configured only on the following resources: an OFDM symbol occupied by the third CORESET and an OFDM symbol other than all CORESETs.

Alternatively, Condition 8 may be as follows:

If two CORESETs have a same reception beam or TCI state, the channel resource and an interference resource corresponding to the channel resource can respectively use same symbols as the two CORESETs. On the contrary, the channel resource and the interference resource corresponding to the channel resource cannot respectively use same symbols as the two CORESETs. In other words, if two CORESETs do not have a same reception beam, the channel resource and the interference resource corresponding to the channel resource cannot respectively have same symbols as the two CORESETs. In other words, the channel resource and the interference resource corresponding to the channel resource use a same symbol as a maximum of one of the two CORESETs.

In other words, if the channel resource and a first CORESET have a same symbol, the interference resource corresponding to the channel resource can be configured only on a symbol other than a second CORESET. The second CORESET may be any CORESET that has a different TCI state from the first CORESET, or may be understood as any CORESET that has a different QCL relationship (for example, a different QCL relationship of a type D) from the first CORESET.

Alternatively, this may be understood as follows: If the channel resource and a first CORESET have a same symbol, the interference resource corresponding to the channel resource can be configured only on the following resources: an OFDM symbol occupied by the first CORESET, an OFDM symbol occupied by a CORESET having a same TCI state as the first CORESET, and an OFDM symbol other than all CORESETs.

Alternatively, if the interference resource and a third CORESET have a same symbol, a channel resource corresponding to the interference resource can be configured only on a symbol other than a fourth CORESET. The fourth CORESET may be any CORESET that has a different TCI state from the third CORESET, or may be understood as any CORESET that has a different QCL relationship (for example, a different QCL relationship of a type D) from the third CORESET.

Alternatively, this may be understood as follows: If the interference resource and a third CORESET have a same symbol, a channel resource corresponding to the interference resource can be configured only on the following resources: an OFDM symbol occupied by the third CORESET, an OFDM symbol occupied by a CORESET having a same TCI state as the third CORESET, and an OFDM symbol other than all CORESETs.

Alternatively, Condition 8 may be as follows:

If two CORESETs have a same reception beam or TCI state, and the channel resource and/or an interference resource corresponding to the channel resource have a same TCI state as the two CORESETs, the channel resource and the interference resource corresponding to the channel resource can respectively use same symbols as the two CORESETs. On the contrary, the channel resource and the interference resource corresponding to the channel resource cannot respectively use same symbols as the two CORESETs. In other words, if two CORESETs do not have a same reception beam, or the channel resource and/or the interference resource corresponding to the channel resource have or has a different TCI state from the two CORESETs, the channel resource and the interference resource corresponding to the channel resource cannot respectively have same symbols as the two CORESETs. In other words, the channel resource and the interference resource corresponding to the channel resource use a same symbol as a maximum of one of the two CORESETs.

In other words, if the channel resource and a first CORESET have a same symbol, the interference resource corresponding to the channel resource can be configured only on a symbol other than a second CORESET. The second CORESET may be any CORESET that has a different TCI state from the first CORESET, or may be understood as any CORESET that has a different QCL relationship (for example, a different QCL relationship of a type D) from the first CORESET.

Alternatively, this may be understood as follows: If the channel resource and a first CORESET have a same symbol, the interference resource corresponding to the channel resource can be configured only on the following resources:

an OFDM symbol occupied by the first CORESET, an OFDM symbol occupied by a CORESET having a same TCI state as the first CORESET, and an OFDM symbol other than all CORESETs.

Alternatively, if the interference resource and a third CORESET have a same symbol, a channel resource corresponding to the interference resource can be configured only on a symbol other than a fourth CORESET. The fourth CORESET may be any CORESET that has a different TCI state from the third CORESET, or may be understood as any CORESET that has a different QCL relationship (for example, a different QCL relationship of a type D) from the third CORESET.

Alternatively, this may be understood as follows: If the interference resource and a third CORESET have a same symbol, a channel resource corresponding to the interference resource can be configured only on the following resources: an OFDM symbol occupied by the third CORESET, an OFDM symbol occupied by a CORESET having a same TCI state as the third CORESET, and an OFDM symbol other than all CORESETs.

Alternatively, Condition 8 may be as follows: A channel resource and an interference resource associated with the channel resource cannot respectively have same symbols as two CORESETs, in other words, the channel resource and the interference resource associated with the channel resource use a same symbol as a maximum of one CORESET.

In other words, if a channel resource and a CORESET have a same symbol, an interference resource corresponding to the channel resource can be configured only on a symbol other than any other CORESET.

Alternatively, this may be understood as follows: When both a repetition parameter of a resource set corresponding to the channel resource and a repetition parameter of a resource set corresponding to the interference resource are configured as "off", if the channel resource and a first CORESET have a same symbol, an interference resource corresponding to the channel resource can be configured only on the following resources: an OFDM symbol occupied by the first CORESET and an OFDM symbol other than all CORESETs.

Alternatively, if an interference resource and a CORESET have a same symbol, a channel resource corresponding to the interference resource can be configured only on a symbol other than any other CORESET.

Alternatively, this may be understood as follows: When both a repetition parameter of a resource set corresponding to the channel resource and a repetition parameter of a resource set corresponding to the interference resource are configured as "off", if the interference resource and a third CORESET have a same symbol, a channel resource corresponding to the interference resource can be configured only on the following resources: an OFDM symbol occupied by the third CORESET and an OFDM symbol other than all CORESETs.

In any one of Embodiment 1 to Embodiment 8, the CORESET may also be replaced with a PDCCH or a PDSCH. For example, if a repetition parameter of a resource set corresponding to the channel resource and/or a repetition parameter of a resource set corresponding to the interference resource are or is configured as "on", a PDCCH cannot be transmitted on OFDM symbols occupied by the channel resource and an interference resource associated with the channel resource, in other words, the terminal device does not receive the PDCCH on these symbols. Alternatively, a channel resource and/or an interference resource for which a repetition parameter of a corresponding resource set is configured as "on" cannot be configured on a symbol on which a PDCCH is sent. For another example, if a repetition parameter of a resource set corresponding to the channel resource is configured as "on", a PDSCH cannot be transmitted on OFDM symbols occupied by the channel resource and an interference resource associated with the channel resource, in other words, the terminal device does not receive the PDSCH on these symbols. Alternatively, a channel resource and/or an interference resource for which a repetition parameter of a corresponding resource set is configured as "on" cannot be configured on a symbol on which a PDSCH is sent.

In any one of Embodiment 1 to Embodiment 8, the CORESET may also be replaced with a TRS, a CSI-RS used for RSRP measurement, a CSI-RS used for CQI measurement, or an SSB. For example, if a repetition parameter of a resource set corresponding to the channel resource and/or a repetition parameter of a resource set corresponding to the interference resource are or is configured as "on", a TRS cannot be transmitted on OFDM symbols occupied by the channel resource and an interference resource associated with the channel resource, in other words, the terminal device does not receive the TRS on these symbols. Alternatively, a channel resource and/or an interference resource for which a repetition parameter of a corresponding resource set is configured as "on" cannot be configured on a symbol on which a TRS is sent. For another example, if a repetition parameter of a resource set corresponding to the channel resource and/or a repetition parameter of a resource set corresponding to the interference resource are or is configured as "on", a CSI-RS used for RSRP measurement cannot be transmitted on OFDM symbols occupied by the channel resource and an interference resource associated with the channel resource, in other words, the terminal device does not receive, on these symbols, the CSI-RS used for RSRP measurement. Alternatively, a channel resource and/or an interference resource for which a repetition parameter of a corresponding resource set is configured as "on" cannot be configured on a symbol on which a CSI-RS used for RSRP measurement is sent. For another example, if a repetition parameter of a resource set corresponding to the channel resource and/or a repetition parameter of a resource set corresponding to the interference resource are or is configured as "on", a CSI-RS used for CQI measurement cannot be transmitted on OFDM symbols occupied by the channel resource and an interference resource associated with the channel resource, in other words, the terminal device does not receive, on these symbols, the CSI-RS used for CQI measurement. Alternatively, a channel resource and/or an interference resource for which a repetition parameter of a corresponding resource set is configured as "on" cannot be configured on a symbol on which a CSI-RS used for CQI measurement is sent. Alternatively, if a repetition parameter of a resource set corresponding to the channel resource and/or a repetition parameter of a resource set corresponding to the interference resource are or is configured as "on", an SSB cannot be transmitted on OFDM symbols occupied by the channel resource and an interference resource associated with the channel resource, in other words, the terminal device does not receive the SSB on these symbols. Alternatively, a channel resource and/or an interference resource for which a repetition parameter of a corresponding resource set is configured as "on" cannot be configured on a symbol on which an SSB is sent.

In any one of Embodiment 1 to Embodiment 8, the CORESET may also be replaced with a physical uplink control channel (PUCCH), a physical uplink shared channel (PUSCH), or an SRS. For example, taking Embodiment 1 as an example, if a repetition parameter of a resource set corresponding to the channel resource and/or a repetition parameter of a resource set corresponding to the interference resource are or is configured as "on", a PUCCH cannot be transmitted on OFDM symbols occupied by the channel resource and an interference resource associated with the channel resource, in other words, the terminal device does not send the PUCCH on these symbols. Alternatively, a channel resource and/or an interference resource for which a repetition parameter of a corresponding resource set is configured as "on" cannot be configured on a symbol on which a PUCCH is sent. For another example, if a repetition parameter of a resource set corresponding to the channel resource and/or a repetition parameter of a resource set corresponding to the interference resource are or is configured as "on", a PUSCH cannot be transmitted on OFDM symbols occupied by the channel resource and an interference resource associated with the channel resource, in other words, the terminal device does not send the PUSCH on these symbols. Alternatively, a channel resource and/or an interference resource for which a repetition parameter of a corresponding resource set is configured as "on" cannot be configured on a symbol on which a PUSCH is sent. For another example, if a repetition parameter of a resource set corresponding to the channel resource and/or a repetition parameter of a resource set corresponding to the interference resource are or is configured as "on", an SRS cannot be transmitted on OFDM symbols occupied by the channel resource and an interference resource associated with the channel resource, in other words, the terminal device does not send the SRS on these symbols. Alternatively, a channel resource and/or an interference resource for which a repetition parameter of a corresponding resource set is configured as "on" cannot be configured on a symbol on which an SRS is sent.

In any one of Embodiment 1 to Embodiment 8, a conflict mechanism of a CSI-RS and a CORESET/a PDCCH/a PDSCH/a PUCCH/a PUSCH/an SRS may be further described in the following form: In L1-SINR measurement, if a QCL relationship (for example, a QCL relationship of a type D) exists between a channel resource and a CORESET/PDCCH/PDSCH, a repetition parameter of a resource set in which the channel resource is located is not configured as "on", and a scaling factor N is 1, there is no scheduling limitation on an OFDM symbol on which an interference resource associated with the channel resource is located. For example, the CORESET/PDCCH/PDSCH can be transmitted on the OFDM symbol on which the interference resource associated with the channel resource is located. Otherwise, on an OFDM symbol on which an interference resource associated with the channel resource is located, the terminal does not send a PUCCH/a PUSCH/an SRS, and the terminal device does not receive a PDCCH/PDSCH/another downlink signal (including a TRS, a CSI-RS used for CQI calculation, and the like).

Alternatively, in L1-SINR measurement, if a QCL relationship (for example, a QCL relationship of a type D) exists between a channel resource and a CORESET/PDCCH/ PDSCH, a repetition parameter of a resource set in which the channel resource is located is not configured as "on", and a scaling factor N is 1, there is no scheduling limitation on OFDM symbols on which the channel resource and an interference resource associated with the channel resource are located. For example, the CORESET/PDCCH/PDSCH can be transmitted on the OFDM symbols on which the channel resource and the interference resource associated with the channel resource are located. Otherwise, on OFDM symbols on which the channel resource and an interference resource associated with the channel resource are located, the terminal device does not send a PUCCH/a PUSCH/an SRS, and the terminal device does not receive a PDCCH/ PDSCH/another downlink signal (including a TRS, a CSI-RS used for CQI calculation, and the like).

Alternatively, in L1-SINR measurement, if a QCL relationship (for example, a QCL relationship of a type D) exists between a channel resource and/or an interference resource corresponding to the channel resource and a CORESET/ PDCCH/PDSCH, a repetition parameter of a resource set in which the channel resource is located and/or a repetition parameter of a resource set in which the interference resource associated with the channel resource is located are or is not configured as "on", and a scaling factor N of the channel resource and/or a scaling factor N of the interference resource associated with the channel resource are or is 1, there is no scheduling limitation on an OFDM symbol on which the channel resource is located and/or an OFDM symbol on which the interference resource associated with the channel resource is located. For example, the CORE-SET/PDCCH/PDSCH can be transmitted on the OFDM symbol on which the channel resource is located and/or the OFDM symbol on which the interference resource associated with the channel resource is located. Otherwise, on an OFDM symbol on which the channel resource is located and/or an OFDM symbol on which the interference resource associated with the channel resource is located, the terminal device does not send a PUCCH/a PUSCH/an SRS, and the terminal device does not receive a PDCCH/PDSCH/another downlink signal (including a TRS, a CSI-RS used for CQI calculation, and the like).

Optionally, when receiving a PDCCH/PDSCH, the terminal performs rate matching at a level of a symbol/resource block group (RBG)/precoding resource group (PRG)/sub-band/resource block (PRB or VRB)/RE.

The channel resource may be an NZP CSI-RS resource or an SSB. The interference resource may be an NZP CSI-RS resource or a CSI-IM resource.

The scaling factor is predefined in a protocol and is related to a type of a resource. For example, N is 1 for a periodic/ semi-persistent CSI-RS for which a repetition parameter of a resource set in which the CSI-RS is located is configured as "off". N is 1 for an aperiodic CSI-RS. N is 8 for an SSB. In addition, if an association relationship between a channel resource and an interference resource is one-to-M (M>1) mapping, a value of N of the interference resource is equal to M times a value of N of the channel resource. For example, if the value that is of N of the channel resource and that is determined according to the foregoing method is 1, the value of N of the interference resource is M.

In the foregoing method, when the channel resource and/or the interference resource conflict or conflicts with a CORESET/PDCCH/PDSCH, the CORESET/PDCCH/ PDSCH is not configured/transmitted on an OFDM symbol of the channel resource and/or an OFDM symbol of the interference resource, or the channel resource and/or the interference resource are or is not configured/transmitted on an OFDM symbol of the CORESET/PDCCH/PDSCH, which may be replaced with the following expression: When the CORESET/PDCCH/PDSCH is transmitted, rate matching needs to be performed based on the channel resource and the interference resource, to shun the channel resource and/or the interference resource.

Embodiment 9

Figure 5:
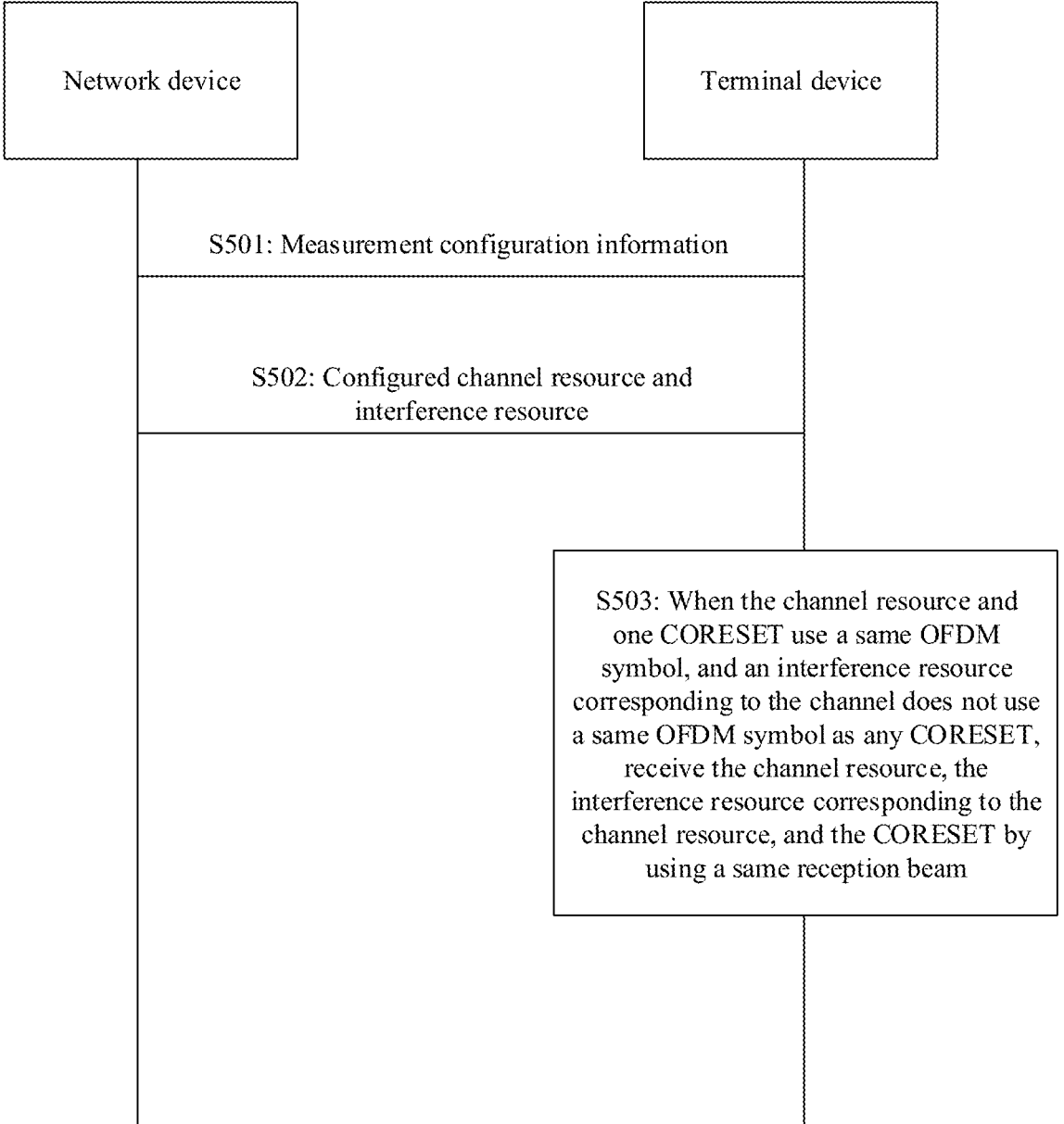
FIG. 5 is a schematic flowchart of another type of measurement and reporting according to an embodiment of this application.

FIG. 5 is a flowchart of another measurement and reporting method according to this application. The method may be applied to a communications device, a chip, a chipset, or the like. The following uses the communications device as an example for description. The method includes the following steps.

S501: A network device sends measurement configuration information, where the measurement configuration information is used to configure a channel resource and an interference resource. Correspondingly, a terminal device receives the measurement configuration information from the network device.

In an example description, the measurement configuration information may include a resource configuration, and may further include a report configuration. The resource configuration may be used to configure a channel resource and an interference resource.

For example, the resource configuration is information related to resource measurement, and may be configured by using a three-level structure (resourceConfig-resourceSet-resource) in a protocol.

The network device may configure one or more resource configurations for the terminal device.

In an implementation, one or more channel resources may be configured by using the resource configuration, and one or more groups of interference resources may be configured for one group of channel resources by using the resource configuration. For example, the resource configuration may include one or more resource settings used for channel measurement and one or more resource settings used for interference measurement. Each resource setting may include one or more resource sets. Each resource set may include one or more resources. Each resource configuration/resource set/resource may include an index of the resource configuration/resource set/resource, and further includes some other parameters such as a resource periodicity and a signal type corresponding to the resource.

The report configuration may be information related to measurement result reporting, and is configured by using reportConfig in the protocol. The network device may configure one or more pieces of reportConfig for the terminal device. Each report configuration may include information related to reporting, for example, a reporting indicator, reporting time, a reporting periodicity, and a reporting format. In addition, the report configuration may further include an index of the resource configuration, and the index is used to indicate a measurement configuration with which a reported result is obtained through measurement.

The channel resource and the interference resource may be specifically a channel resource and an interference resource that are used for SINR measurement.

S503: When the channel resource and one CORESET use a same OFDM symbol, and an interference resource corresponding to the channel resource does not use a same OFDM symbol as any CORESET, the terminal device receives the channel resource, the interference resource corresponding to the channel resource, and the CORESET by using a same reception beam. Alternatively, this may be understood as follows: The terminal device considers that a quasi-colocation relationship of a type D exists between the channel resource, the interference resource, and the CORESET. Alternatively, this may be understood as follows: The terminal device considers that the channel resource and the interference resource use a same TCI state as the CORESET.

Alternatively, when the channel resource and one CORESET use a same OFDM symbol, the terminal device receives the channel resource, an interference resource corresponding to the channel resource, and the CORESET by using a same reception beam. Alternatively, this may be understood as follows: The terminal device considers that a quasi-colocation relationship of a type D exists between the channel resource, the interference resource, and the CORESET. Alternatively, this may be understood as follows: The terminal device considers that the channel resource and the interference resource use a same TCI state as the CORESET.

In an implementation, the terminal device may receive the channel resource and the interference resource by using a reception beam of the CORESET.

In another implementation, the terminal device may alternatively receive the CORESET by using a reception beam of the channel resource and the interference resource.

In an implementation, the terminal device may perform measurement based on the channel resource and the interference resource after receiving the channel resource and the interference resource. Further, the terminal device may report a measurement result to the network device.

For example, when a plurality of channel resources and interference resources corresponding to the channel resources are configured by using the measurement configuration information, the terminal device may receive, by using the method described in step S503, each channel resource and an interference resource corresponding to the channel resource.

Embodiment 10

FIG. 6 is a flowchart of another measurement and reporting method according to this application. The method may be applied to a communications device, a chip, a chipset, or the like. The following uses the communications device as an example for description. The method includes the following steps.

For details of steps S601 and S602, refer to the foregoing steps S501 and S502. Details are not described herein again.

S603: When the channel resource and one CORESET use a same OFDM symbol, and an interference resource corresponding to the channel resource does not use a same OFDM symbol as any CORESET, the terminal device may measure only the channel resource but not measure the interference resource. Alternatively, when the channel resource and one CORESET use a same OFDM symbol, the terminal device may measure only the channel resource but not measure the interference resource. Alternatively, this may be understood as follows: The terminal device determines an SINR by measuring only the channel resource.

For example, the terminal device may calculate the SINR by using, as interfering energy, energy other than the channel resource on an RE occupied by the channel resource. The terminal device may not measure the interference resource. In other words, the terminal device may measure the SINR by using only the channel resource.

For another example, the terminal device may not measure the interference resource, and the terminal device may measure RSRP, RSPQ, and the like by using only the channel resource.

In an implementation, the terminal device may receive the channel resource and the CORESET by using a same reception beam. Alternatively, this may be understood as follows: The terminal device considers that a quasi-colocation relationship of a type D exists between the channel resource and the CORESET. Alternatively, this may be understood as follows: The terminal device considers that the channel resource and the CORESET use a same TCI state.

In an implementation, the terminal device may receive the channel resource by using a reception beam of the CORE-SET.

In another implementation, the terminal device may alternatively receive the CORESET by using a reception beam of the channel resource.

In a possible implementation, before performing step S603, the terminal device may determine that a preset condition is met. For example, the preset condition may be that a type of the channel resource is an NZP CSI-RS, and density of the CSI-RS is 3. Alternatively, the preset condition may be that a type of the channel resource is an NZP CSI-RS, density of the CSI-RS is 3, and a quantity of ports is 1.

In an implementation, the terminal device performs measurement based on the channel resource. Further, the terminal device may report a measurement result to the network device.

For example, when a plurality of channel resources and interference resources corresponding to the channel resources are configured by using the measurement configuration information, the terminal device may receive, by using the method described in step S603, each channel resource and an interference resource corresponding to the channel resource.

Embodiment 11

Figure 7:
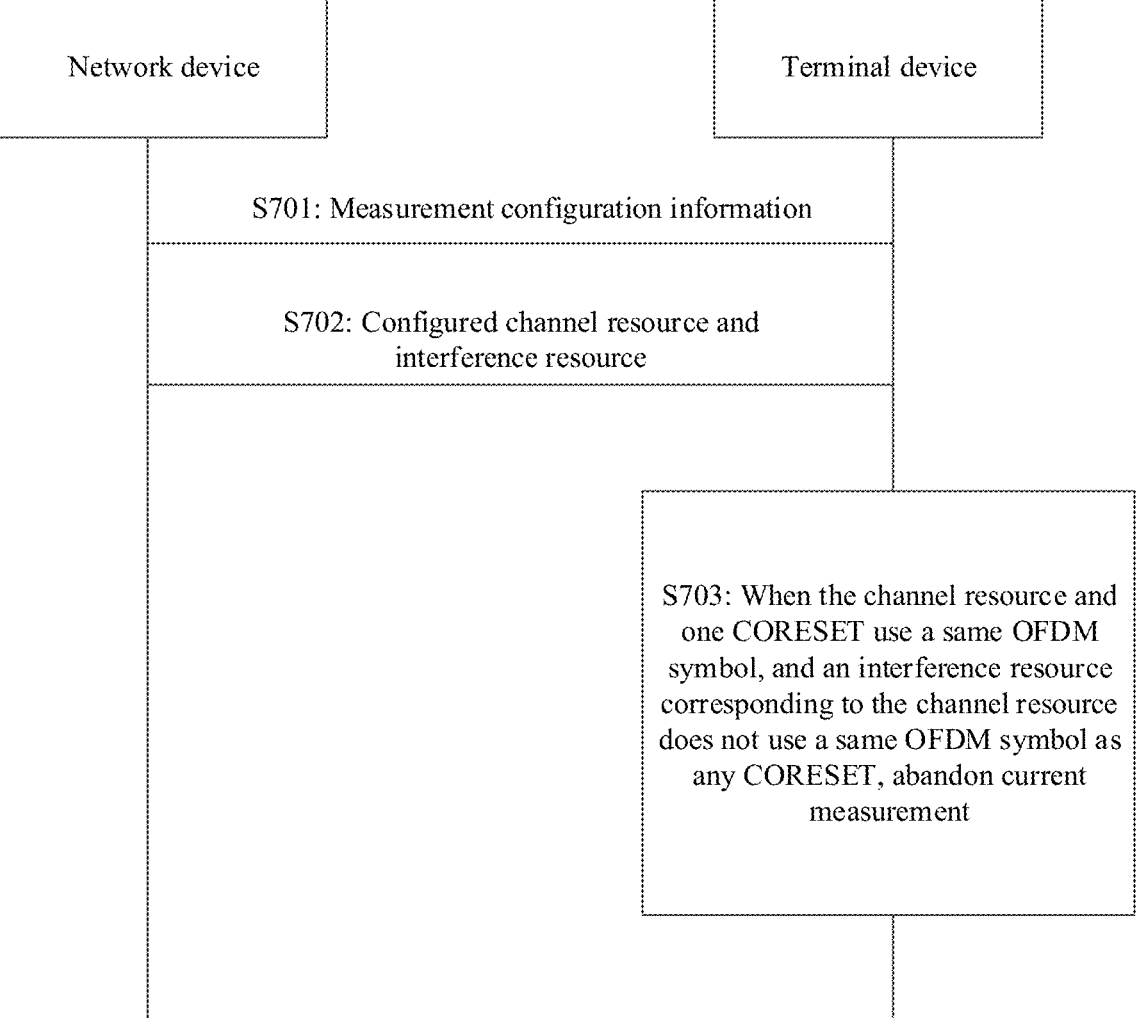
FIG. 7 is a schematic flowchart of another type of measurement and reporting according to an embodiment of this application.

FIG. 7 is a flowchart of another measurement and reporting method according to this application. The method may be applied to a communications device, a chip, a chipset, or the like. The following uses the communications device as an example for description. The method includes the following steps.

For details of steps S701 and S702, refer to the foregoing steps S501 and S502. Details are not described herein again.

S703: When the channel resource and one CORESET use a same OFDM symbol, and an interference resource corresponding to the channel resource does not use a same OFDM symbol as any CORESET, the terminal device may abandon current measurement, in other words, may not measure the channel resource or the interference resource. Alternatively, when the channel resource and one CORESET use a same OFDM symbol, the terminal device may abandon current measurement, in other words, may not measure the channel resource or the interference resource.

For example, when a plurality of channel resources and interference resources corresponding to the channel resources are configured by using the measurement configuration information, the terminal device may receive, by using the method described in step S703, each channel resource and an interference resource corresponding to the channel resource.

Embodiment 12

Figure 8:
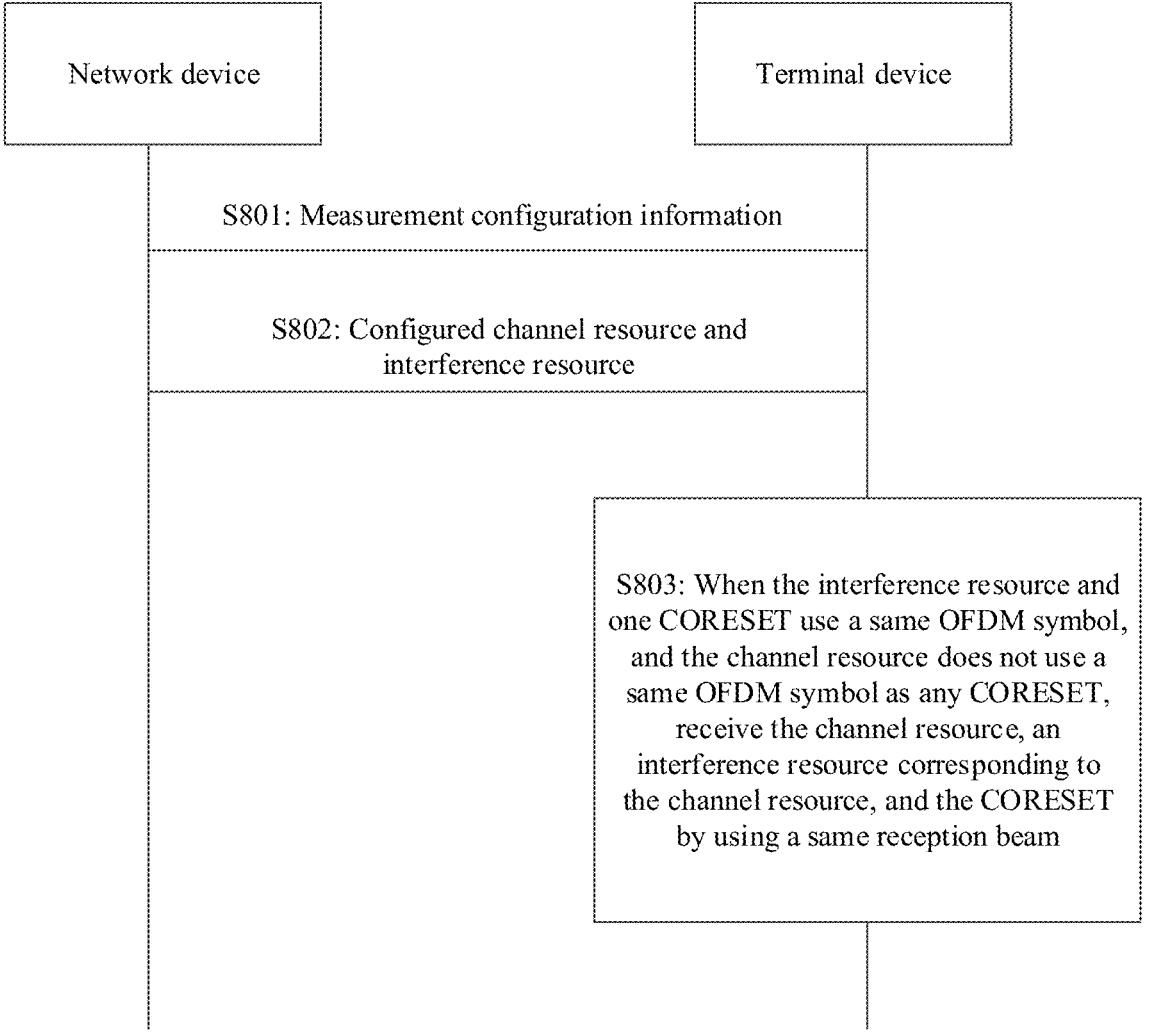
FIG. 8 is a schematic flowchart of another type of measurement and reporting according to an embodiment of this application.

FIG. 8 is a flowchart of another measurement and reporting method according to this application. The method may be applied to a communications device, a chip, a chipset, or the like. The following uses the communications device as an example for description. The method includes the following steps.

For details of steps S801 and S802, refer to the foregoing steps S501 and S502. Details are not described herein again.

S803: When the interference resource and one CORESET use a same OFDM symbol, and a channel resource corresponding to the interference resource does not use a same OFDM symbol as any CORESET, the terminal device receives the interference resource, the channel resource corresponding to the interference resource, and the CORE-SET by using a same reception beam. Alternatively, this may be understood as follows: The terminal device considers that a quasi-colocation relationship of a type D exists between the channel resource, the interference resource, and the CORESET. Alternatively, this may be understood as follows: The terminal device considers that the channel resource and the interference resource use a same TCI state as the CORESET.

Alternatively, when the interference resource and one CORESET use a same OFDM symbol, the terminal device receives the interference resource, a channel resource corresponding to the interference resource, and the CORESET by using a same reception beam. Alternatively, this may be understood as follows: The terminal device considers that a quasi-colocation relationship of a type D exists between the channel resource, the interference resource, and the CORE-SET. Alternatively, this may be understood as follows: The terminal device considers that the channel resource and the interference resource use a same TCI state as the CORESET.

In an implementation, the terminal device may receive the channel resource and the interference resource by using a reception beam of the CORESET.

In another implementation, the terminal device may alternatively receive the CORESET by using a reception beam of the channel resource and the interference resource.

In an implementation, the terminal device may perform measurement based on the channel resource and the interference resource after receiving the channel resource and the interference resource. Further, the terminal device may report a measurement result to the network device.

For example, when a plurality of channel resources and interference resources corresponding to the channel resources are configured by using the measurement configuration information, the terminal device may receive, by using the method described in step S803, each channel resource and an interference resource corresponding to the channel resource.

Embodiment 13

Figure 9:
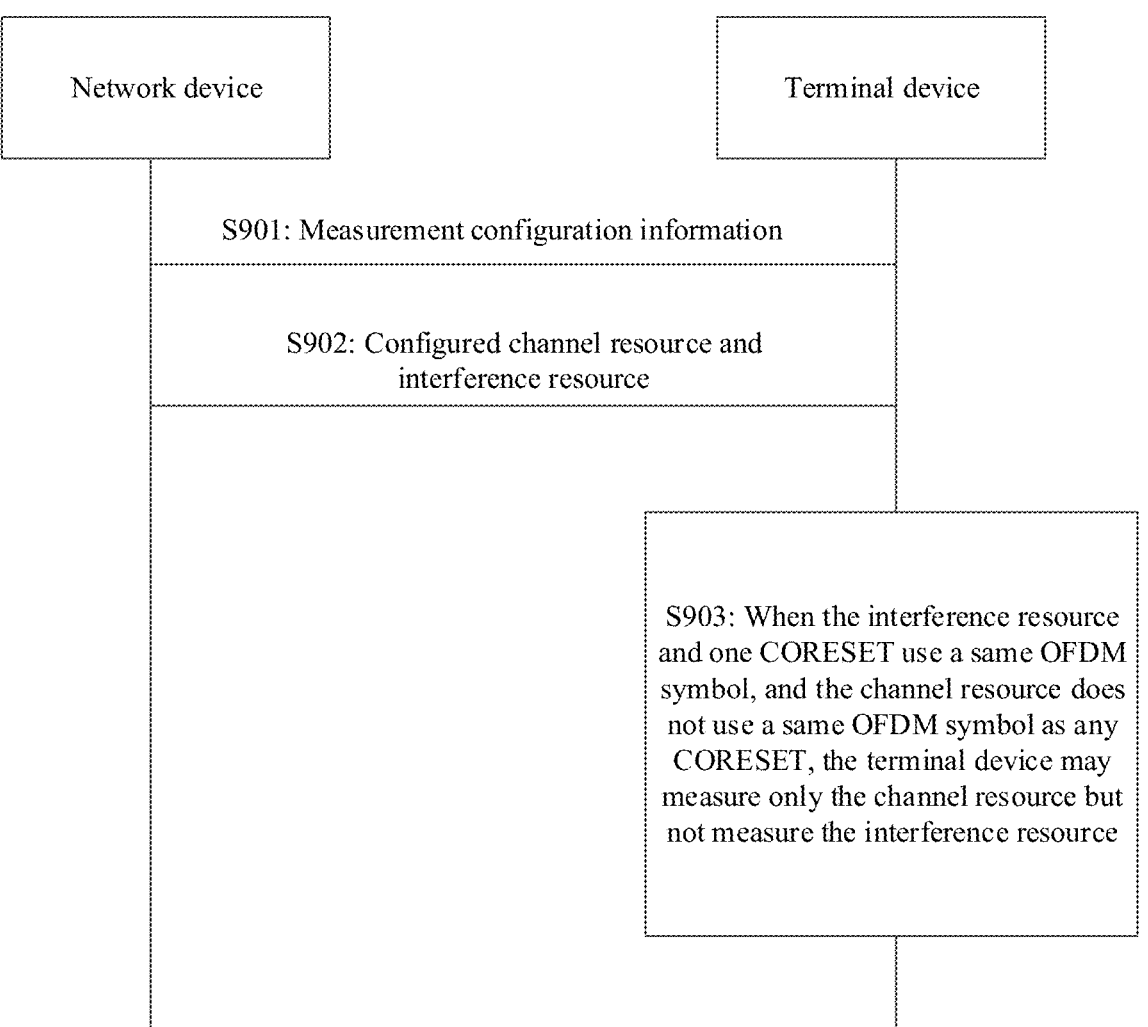
FIG. 9 is a schematic flowchart of another type of measurement and reporting according to an embodiment of this application.

FIG. 9 is a flowchart of another measurement and reporting method according to this application. The method may be applied to a communications device, a chip, a chipset, or the like. The following uses the communications device as an example for description. The method includes the following steps.

For details of steps S901 and S902, refer to the foregoing steps S501 and S502. Details are not described herein again.

S903: When the interference resource and one CORESET use a same OFDM symbol, and a channel resource corresponding to the interference resource does not use a same OFDM symbol as any CORESET, the terminal device may measure only the channel resource but not measure the interference resource. Alternatively, when the interference resource and one CORESET use a same OFDM symbol, the terminal device may measure only a channel resource corresponding to the interference resource but not measure the interference resource. Alternatively, this may be understood as follows: The terminal device determines an SINR by using only a channel resource corresponding to the interference resource.

For example, the terminal device may calculate the SINR by using, as interfering energy, energy other than the channel resource on an RE occupied by the channel resource. The terminal device may not measure the interference resource. In other words, the terminal device may measure the SINR by using only the channel resource.

For another example, the terminal device may not measure the interference resource, and the terminal device may measure RSRP, RSPQ, and the like by using only the channel resource.

In an implementation, the terminal device may receive the channel resource and the CORESET by using a same reception beam. Alternatively, this may be understood as follows: The terminal device considers that a quasi-colocation relationship of a type D exists between the channel resource and the CORESET. Alternatively, this may be understood as follows: The terminal device considers that the channel resource and the CORESET use a same TCI state.

In an implementation, the terminal device may receive the channel resource by using a reception beam of the CORESET.

In another implementation, the terminal device may alternatively receive the CORESET by using a reception beam of the channel resource.

In a possible implementation, before performing step S903, the terminal device may determine that a preset condition is met. For example, the preset condition may be that a type of the channel resource is an NZP CSI-RS, and density of the CSI-RS is 3. Alternatively, the preset condition may be that a type of the channel resource is an NZP CSI-RS, density of the CSI-RS is 3, and a quantity of ports is 1.

In an implementation, the terminal device performs measurement based on the channel resource. Further, the terminal device may report a measurement result to the network device.

For example, when a plurality of channel resources and interference resources corresponding to the channel resources are configured by using the measurement configuration information, the terminal device may receive, by using the method described in step S903, each channel resource and an interference resource corresponding to the channel resource.

Embodiment 14

Figure 10:
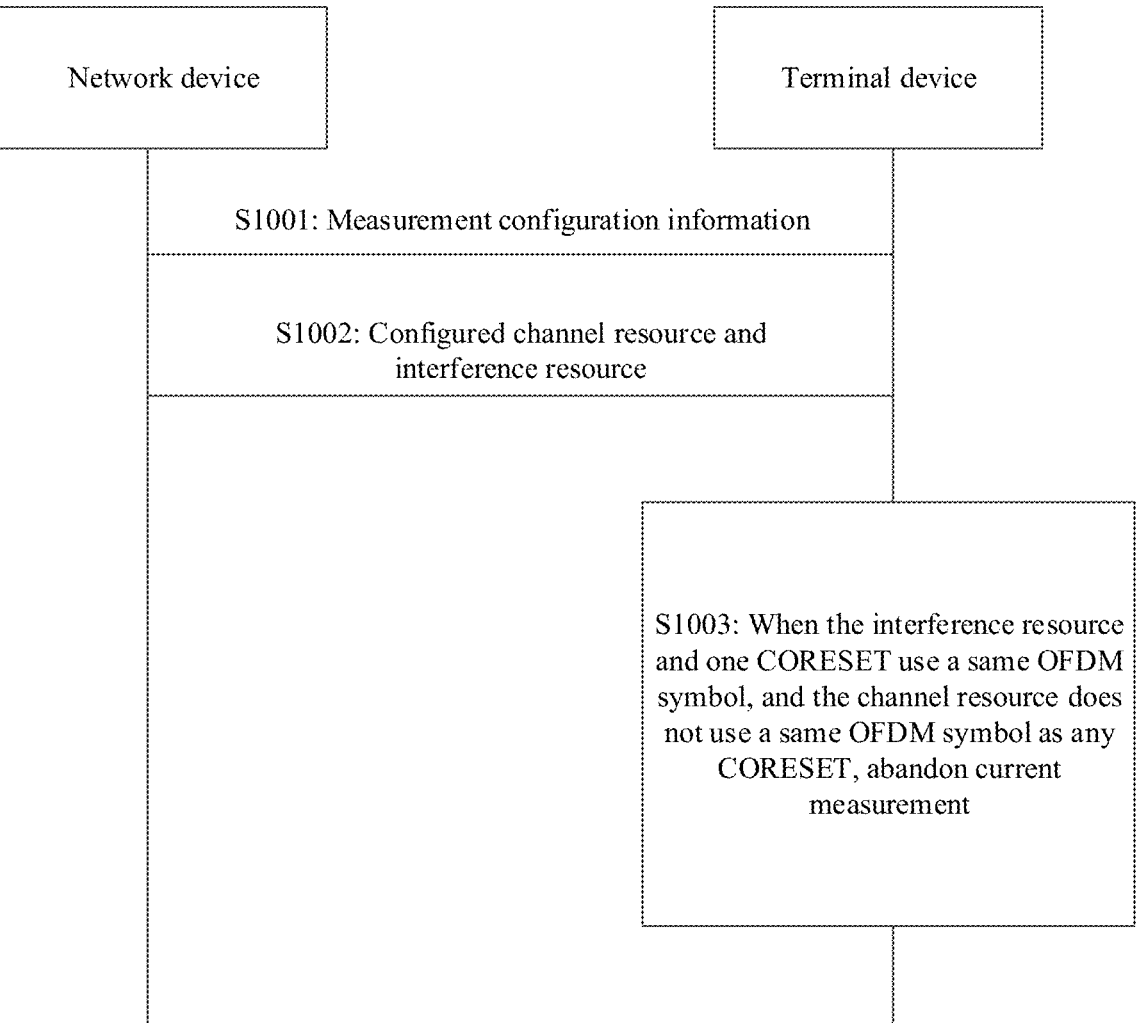
FIG. 10 is a schematic flowchart of another type of measurement and reporting according to an embodiment of this application.

FIG. 10 is a flowchart of another measurement and reporting method according to this application. The method may be applied to a communications device, a chip, a chipset, or the like. The following uses the communications device as an example for description. The method includes the following steps.

For details of steps S1001 and S1002, refer to the foregoing steps S501 and S502. Details are not described herein again.

S1003: When the interference resource and one CORESET use a same OFDM symbol, and a channel resource corresponding to the interference resource does not use a same OFDM symbol as any CORESET, the terminal device may abandon current measurement, in other words, may not measure the channel resource or the interference resource. When the interference resource and one CORESET use a same OFDM symbol, the terminal device may abandon current measurement, in other words, may not measure the channel resource or the interference resource.

For example, when a plurality of channel resources and interference resources corresponding to the channel resources are configured by using the measurement configuration information, the terminal device may receive, by using the method described in step S1003, each channel resource and an interference resource corresponding to the channel resource.

Embodiment 15

Figure 11:
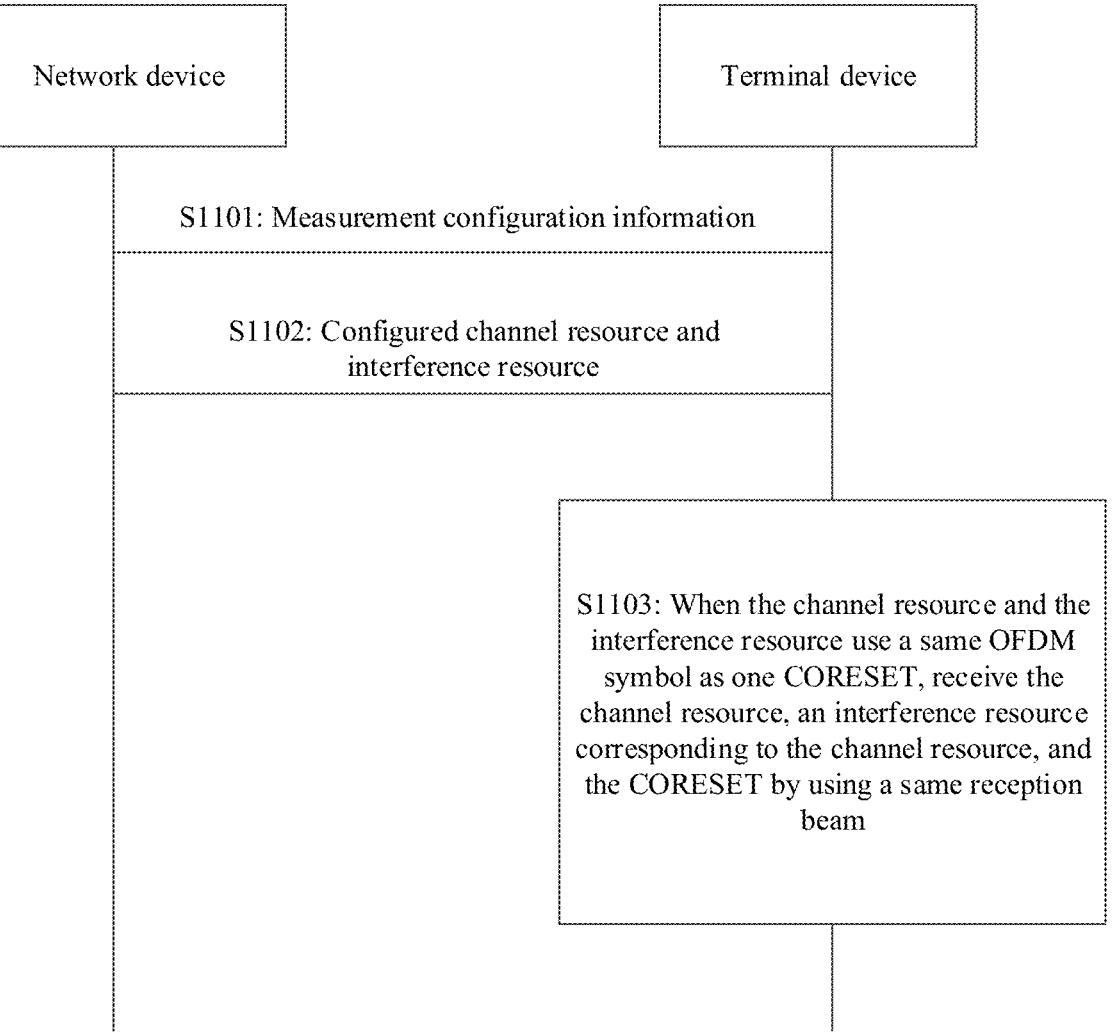
FIG. 11 is a schematic flowchart of another type of measurement and reporting according to an embodiment of this application.

FIG. 11 is a flowchart of another measurement and reporting method according to this application. The method may be applied to a communications device, a chip, a chipset, or the like. The following uses the communications device as an example for description. The method includes the following steps.

For details of steps S1101 and S1102, refer to the foregoing steps S501 and S502. Details are not described herein again.

S1103: When the channel resource and the interference resource use a same OFDM symbol as one CORESET, the terminal device receives the channel resource, an interference resource corresponding to the channel resource, and the CORESET by using a same reception beam. Alternatively, this may be understood as follows: The terminal device considers that a quasi-colocation relationship of a type D exists between the channel resource, the interference resource, and the CORESET. Alternatively, this may be understood as follows: The terminal device considers that the channel resource and the interference resource use a same TCI state as the CORESET.

In an implementation, the terminal device may receive the channel resource and the interference resource by using a reception beam of the CORESET.

In another implementation, the terminal device may alternatively receive the CORESET by using a reception beam of the channel resource and the interference resource.

In an implementation, the terminal device may perform measurement based on the channel resource and the interference resource after receiving the channel resource and the interference resource. Further, the terminal device may report a measurement result to the network device.

For example, when a plurality of channel resources and interference resources corresponding to the channel resources are configured by using the measurement configuration information, the terminal device may receive, by using the method described in step S1103, each channel resource and an interference resource corresponding to the channel resource.

Embodiment 16

Figure 12:
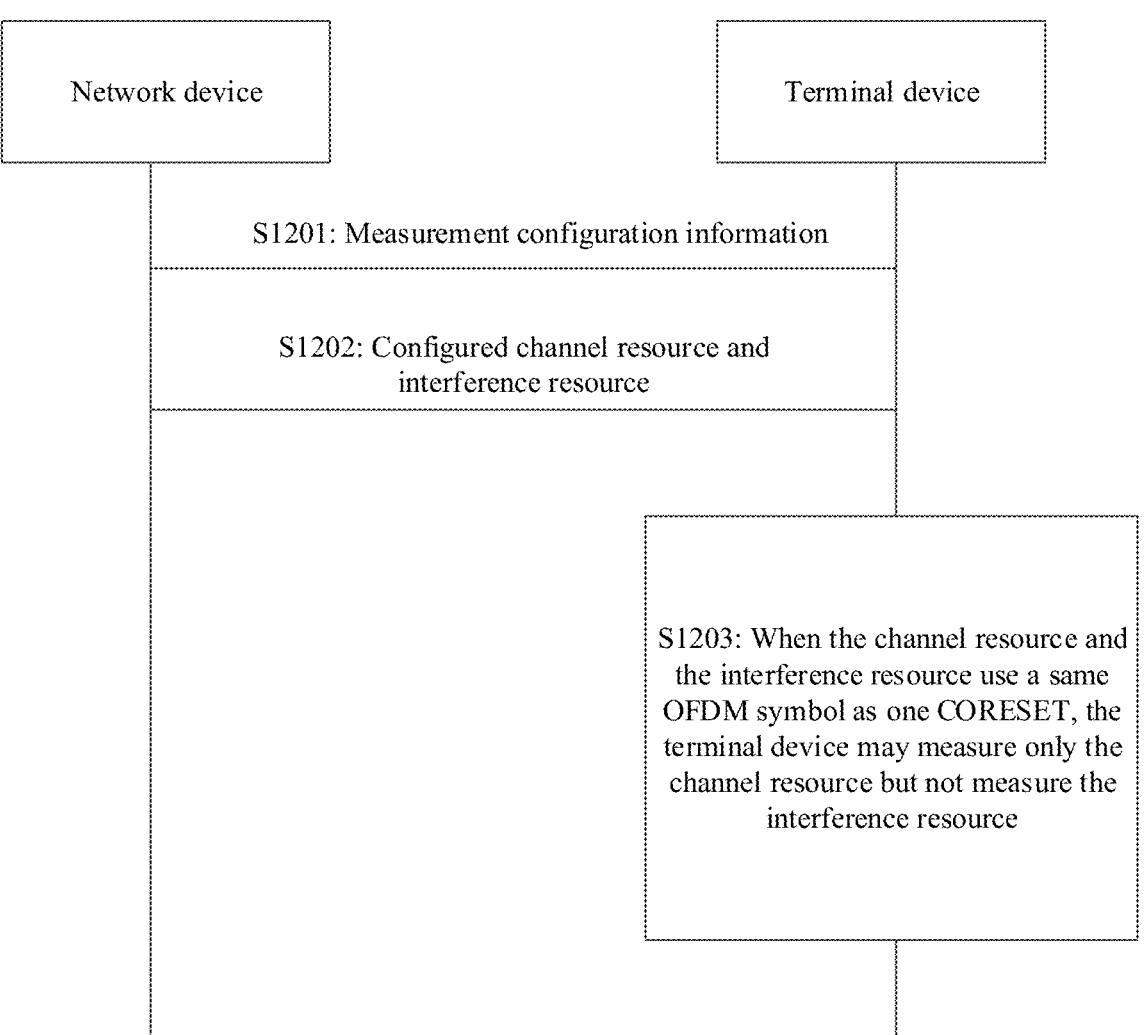
FIG. 12 is a schematic flowchart of another type of measurement and reporting according to an embodiment of this application.

FIG. 12 is a flowchart of another measurement and reporting method according to this application. The method may be applied to a communications device, a chip, a chipset, or the like. The following uses the communications device as an example for description. The method includes the following steps.

For details of steps S1201 and S1202, refer to the foregoing steps S501 and S502. Details are not described herein again.

S1203: When the channel resource and the interference resource use a same OFDM symbol as one CORESET, the terminal device may measure only the channel resource but not measure the interference resource. Alternatively, this may be understood as follows: The terminal device determines an SINR by measuring only the channel resource.

For example, the terminal device may calculate the SINR by using, as interfering energy, energy other than the channel resource on an RE occupied by the channel resource. The terminal device may not measure the interference resource. In other words, the terminal device may measure the SINR by using only the channel resource.

For another example, the terminal device may not measure the interference resource, and the terminal device may measure RSRP, RSPQ, and the like by using only the channel resource.

In an implementation, the terminal device may receive the channel resource and the CORESET by using a same reception beam. Alternatively, this may be understood as follows: The terminal device considers that a quasi-colocation relationship of a type D exists between the channel resource and the CORESET. Alternatively, this may be understood as follows: The terminal device considers that the channel resource and the CORESET use a same TCI state.

In an implementation, the terminal device may receive the channel resource by using a reception beam of the CORESET.

In another implementation, the terminal device may alternatively receive the CORESET by using a reception beam of the channel resource.

In a possible implementation, before performing step S1203, the terminal device may determine that a preset condition is met. For example, the preset condition may be that a type of the channel resource is an NZP CSI-RS, and density of the CSI-RS is 3. Alternatively, the preset condition may be that a type of the channel resource is an NZP CSI-RS, density of the CSI-RS is 3, and a quantity of ports is 1.

In an implementation, the terminal device performs measurement based on the channel resource. Further, the terminal device may report a measurement result to the network device.

For example, when a plurality of channel resources and interference resources corresponding to the channel resources are configured by using the measurement configuration information, the terminal device may receive, by using the method described in step S1203, each channel resource and an interference resource corresponding to the channel resource.

Embodiment 17

Figure 13:
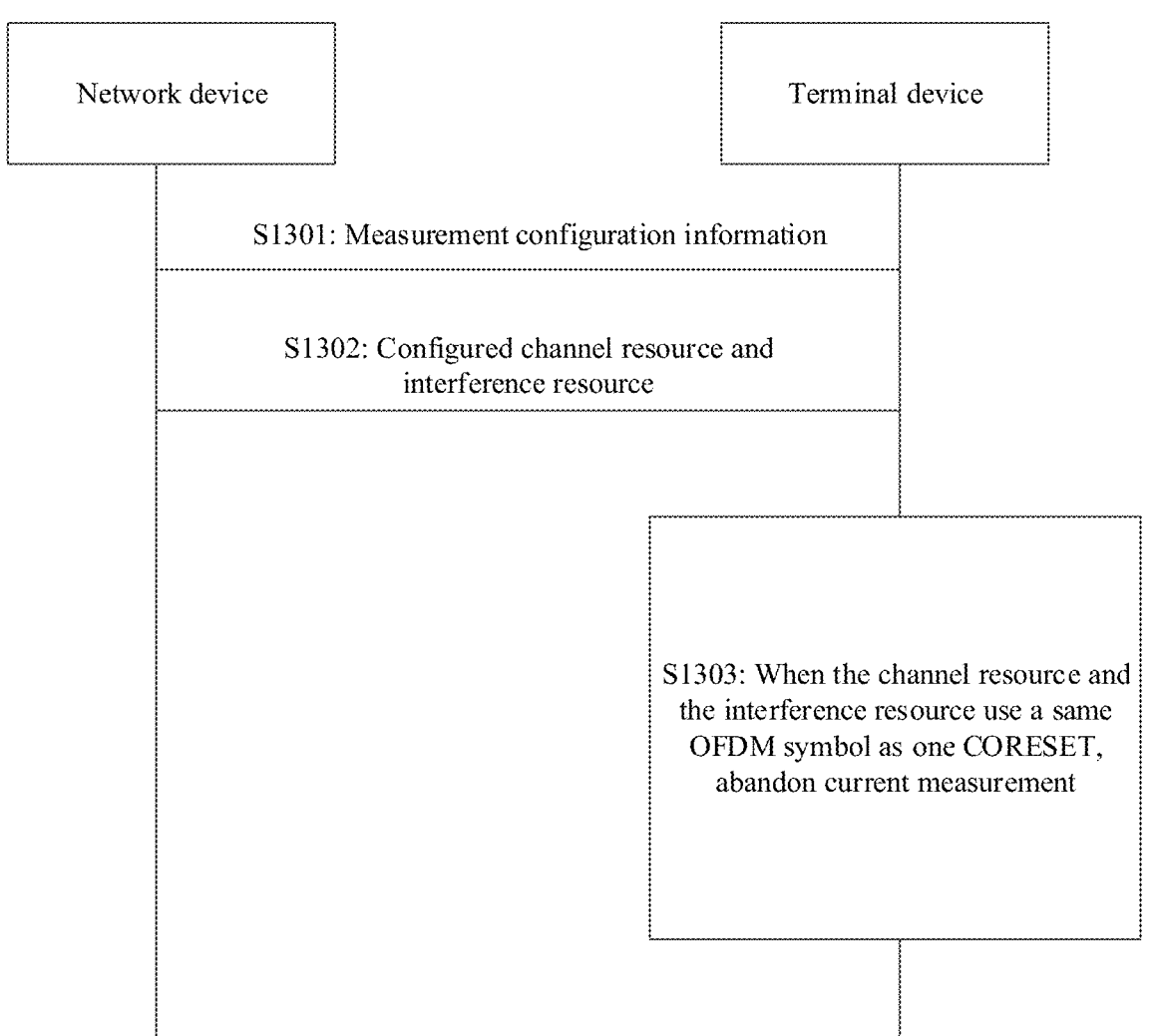
FIG. 13 is a schematic flowchart of another type of measurement and reporting according to an embodiment of this application.

FIG. 13 is a flowchart of another measurement and reporting method according to this application. The method may be applied to a communications device, a chip, a chipset, or the like. The following uses the communications device as an example for description. The method includes the following steps.

For details of steps S1301 to S1302, refer to the foregoing steps S501 to S502. Details are not described herein again.

S1303: When the channel resource and the interference resource use a same OFDM symbol as one CORESET, the terminal device may abandon current measurement, in other words, may not measure the channel resource or the interference resource.

For example, when a plurality of channel resources and interference resources corresponding to the channel resources are configured by using the measurement configuration information, the terminal device may receive, by using the method described in step S1303, each channel resource and an interference resource corresponding to the channel resource.

Embodiment 18

Figure 14:
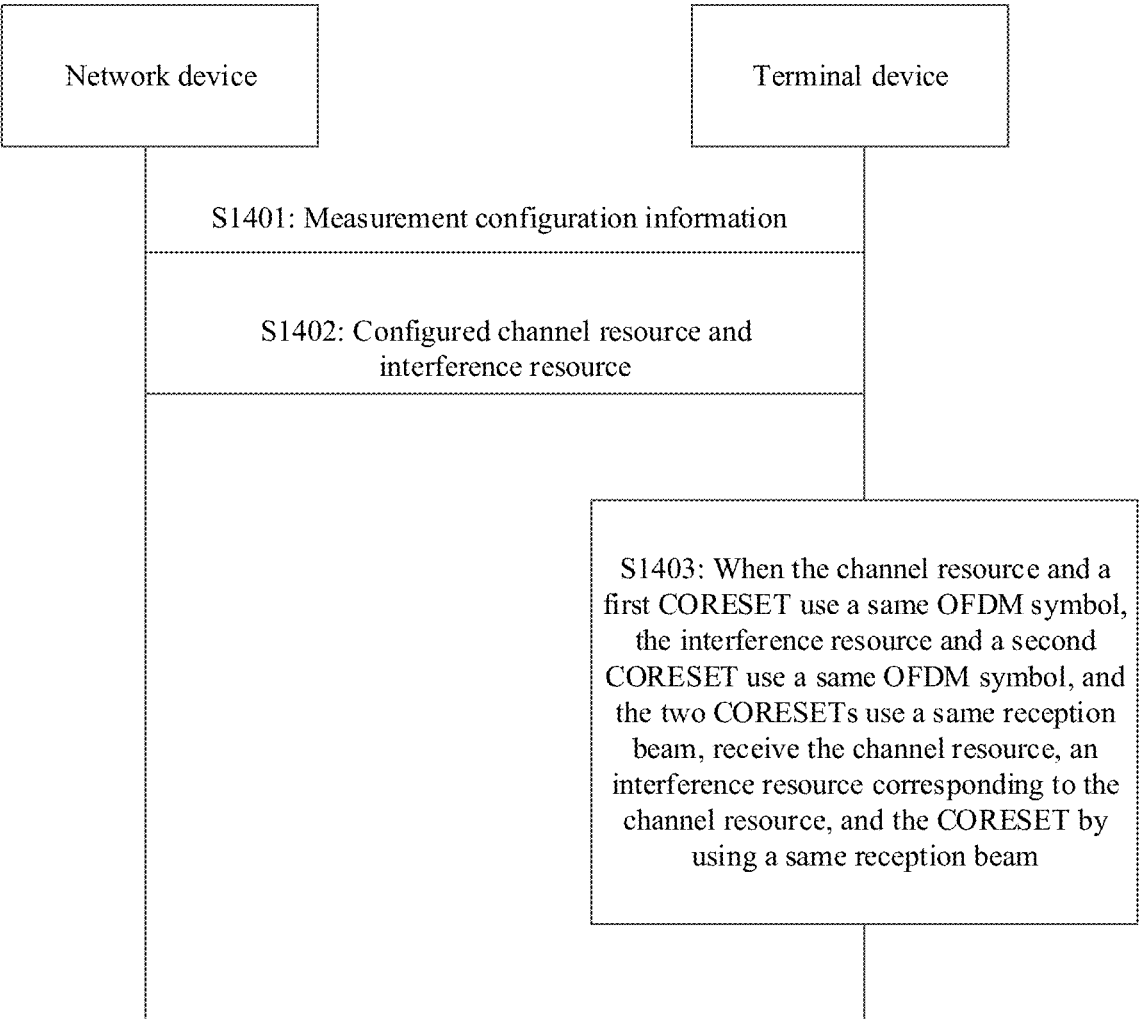
FIG. 14 is a schematic flowchart of another type of measurement and reporting according to an embodiment of this application.

FIG. 14 is a flowchart of another measurement and reporting method according to this application. The method may be applied to a communications device, a chip, a chipset, or the like. The following uses the communications device as an example for description. The method includes the following steps.

For details of steps S1401 and S1402, refer to the foregoing steps S501 and S502. Details are not described herein again.

S1403: When the channel resource and a CORESET (referred to as a first CORESET below) use a same OFDM symbol, the interference resource and another CORESET (referred to as a second CORESET below) use a same OFDM symbol, and the two CORESETs use a same reception beam, the terminal device receives the channel resource, an interference resource corresponding to the channel resource, the first CORESET, and the second CORESET by using a same reception beam. Alternatively, this may be understood as follows: The terminal device considers that a quasi-colocation relationship of a type D exists between the channel resource, the interference resource, the first CORESET, and the second CORESET. Alternatively, this may be understood as follows: The terminal device considers that the channel resource and the interference resource use a same TCI state as the first CORESET and the second CORESET.

In an implementation, the terminal device may receive the channel resource and the interference resource by using a reception beam of the first CORESET and the second CORESET.

In another implementation, the terminal device may alternatively receive the first CORESET and the second CORESET by using a reception beam of the channel resource and the interference resource.

In an implementation, the terminal device may perform measurement based on the channel resource and the interference resource after receiving the channel resource and the interference resource. Further, the terminal device may report a measurement result to the network device.

For example, when a plurality of channel resources and interference resources corresponding to the channel resources are configured by using the measurement configuration information, the terminal device may receive, by using the method described in step S1403, each channel resource and an interference resource corresponding to the channel resource.

Embodiment 19

Figure 15:
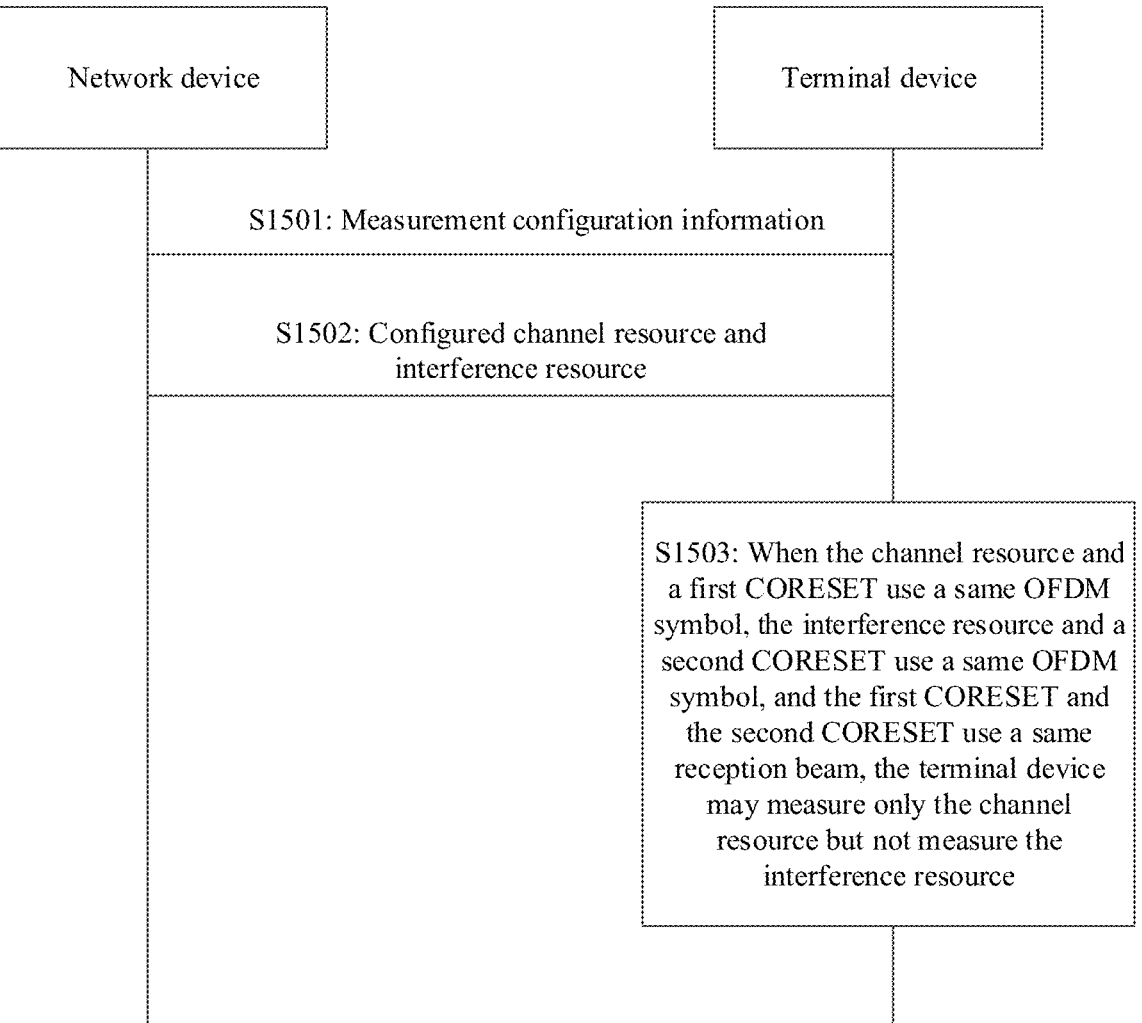
FIG. 15 is a schematic flowchart of another type of measurement and reporting according to an embodiment of this application.

FIG. 15 is a flowchart of another measurement and reporting method according to this application. The method may be applied to a communications device, a chip, a chipset, or the like. The following uses the communications device as an example for description. The method includes the following steps.

For details of steps S1501 and S1502, refer to the foregoing steps S501 and S502. Details are not described herein again.

S1503: When the channel resource and a first CORESET use a same OFDM symbol, the interference resource and a second CORESET use a same OFDM symbol, and the first CORESET and the second CORESET use a same reception beam, the terminal device may measure only the channel resource but not measure the interference resource. Alternatively, this may be understood as follows: The terminal device determines an SINR by using only the channel resource.

For example, the terminal device may calculate the SINR by using, as interfering energy, energy other than the channel resource on an RE occupied by the channel resource. The terminal device may not measure the interference resource. In other words, the terminal device may measure the SINR by using only the channel resource.

For another example, the terminal device may not measure the interference resource, and the terminal device may measure RSRP, RSPQ, and the like by using only the channel resource.

In an implementation, the terminal device may receive the channel resource and the first CORESET by using a same reception beam. Alternatively, this may be understood as follows: The terminal device considers that a quasi-colocation relationship of a type D exists between the channel resource and the first CORESET. Alternatively, this may be understood as follows: The terminal device considers that the channel resource and the first CORESET use a same TCI state.

In an implementation, the terminal device may receive the channel resource by using a reception beam of the first CORESET.

In another implementation, the terminal device may alternatively receive the first CORESET by using a reception beam of the channel resource.

In a possible implementation, before performing step S1503, the terminal device may determine that a preset condition is met. For example, the preset condition may be that a type of the channel resource is an NZP CSI-RS, and density of the CSI-RS is 3. Alternatively, the preset condition may be that a type of the channel resource is an NZP CSI-RS, density of the CSI-RS is 3, and a quantity of ports is 1.

In an implementation, the terminal device performs measurement based on the channel resource. Further, the terminal device may report a measurement result to the network device.

For example, when a plurality of channel resources and interference resources corresponding to the channel resources are configured by using the measurement configuration information, the terminal device may receive, by using the method described in step S1503, each channel resource and an interference resource corresponding to the channel resource.

Embodiment 20

FIG. 16 is a flowchart of another measurement and reporting method according to this application. The method may be applied to a communications device, a chip, a chipset, or the like. The following uses the communications device as an example for description. The method includes the following steps.

For details of steps S1601 and S1602, refer to the foregoing steps S501 and S502. Details are not described herein again.

S1603: When the channel resource and a first CORESET use a same OFDM symbol, the interference resource and a second CORESET use a same OFDM symbol, and the first CORESET and the second CORESET use a same reception beam, the terminal device may abandon current measurement, in other words, may not measure the channel resource or the interference resource.

For example, when a plurality of channel resources and interference resources corresponding to the channel resources are configured by using the measurement configuration information, the terminal device may receive, by using the method described in step S1603, each channel resource and an interference resource corresponding to the channel resource.

Embodiment 21

FIG. 17 is a flowchart of another measurement and reporting method according to this application. The method may be applied to a communications device, a chip, a chipset, or the like. The following uses the communications device as an example for description. The method includes the following steps.

For details of steps S1701 and S1702, refer to the foregoing steps S501 and S502. Details are not described herein again.

S1703: When the channel resource and a first CORESET use a same OFDM symbol, the interference resource and a second CORESET use a same OFDM symbol, and the first CORESET and the second CORESET use different reception beams or a QCL relationship (for example, a QCL relationship of a type D) does not exist between the first CORESET and the second CORESET, the terminal device receives the channel resource, an interference resource corresponding to the channel resource, the first CORESET, and the second CORESET by using a same reception beam. Alternatively, this may be understood as follows: The terminal device considers that a quasi-colocation relationship of a type D exists between the channel resource, the interference resource, the first CORESET, and the second CORESET. Alternatively, this may be understood as follows: The terminal device considers that the channel resource and the interference resource use a same TCI state as the first CORESET and the second CORESET.

In an implementation, the terminal device may receive the channel resource and the interference resource by using a reception beam of the CORESET.

In another implementation, the terminal device may alternatively receive the CORESET by using a reception beam of the channel resource and the interference resource.

In an implementation, the terminal device may perform measurement based on the channel resource and the interference resource after receiving the channel resource and the interference resource. Further, the terminal device may report a measurement result to the network device.

For example, when a plurality of channel resources and interference resources corresponding to the channel resources are configured by using the measurement configuration information, the terminal device may receive, by using the method described in step S1703, each channel resource and an interference resource corresponding to the channel resource.

Embodiment 22

Figure 18:
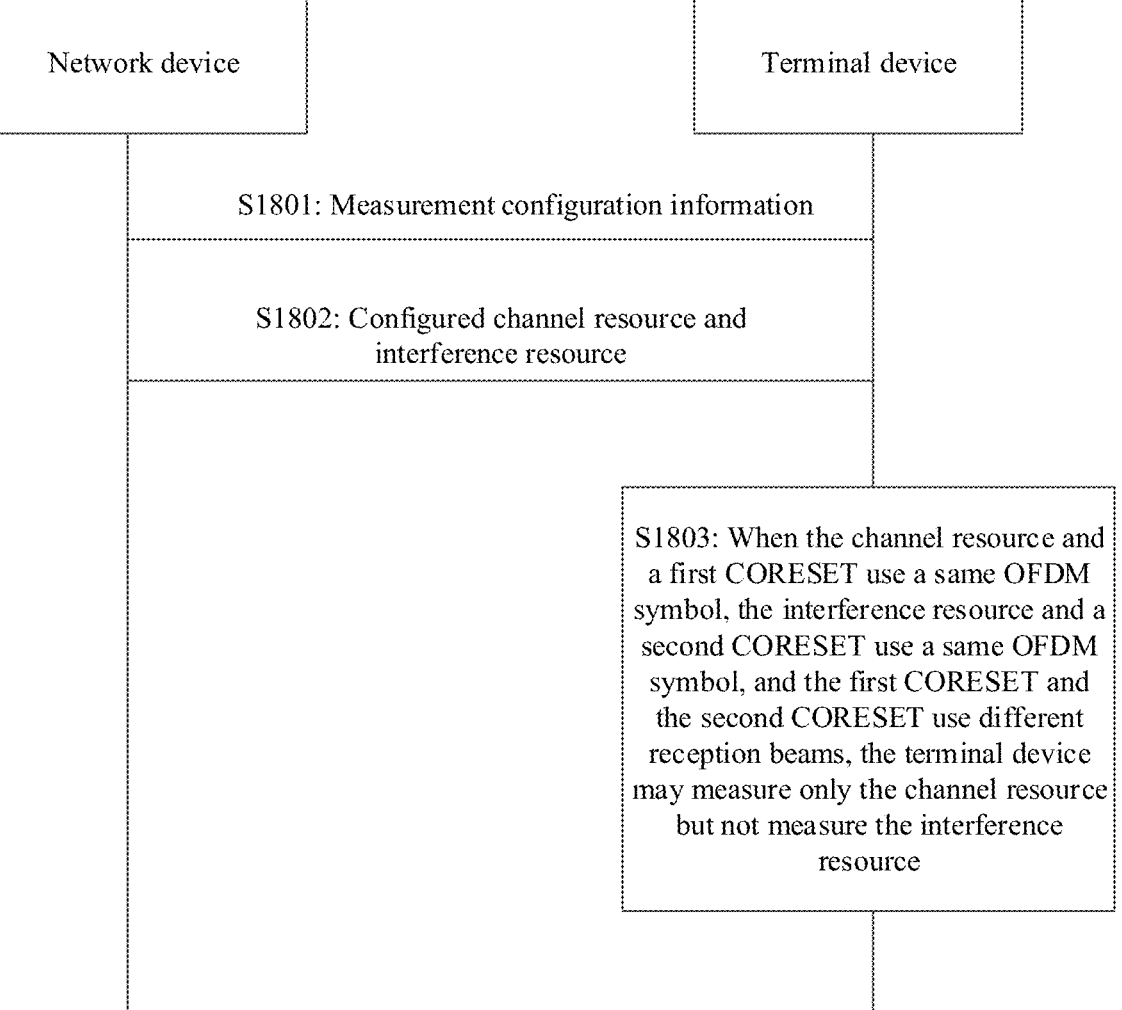
FIG. 18 is a schematic flowchart of another type of measurement and reporting according to an embodiment of this application.

FIG. 18 is a flowchart of another measurement and reporting method according to this application. The method may be applied to a communications device, a chip, a chipset, or the like. The following uses the communications device as an example for description. The method includes the following steps.

For details of steps S1801 and S1802, refer to the foregoing steps S501 and S502. Details are not described herein again.

S1803: When the channel resource and a first CORESET use a same OFDM symbol, the interference resource and a second CORESET use a same OFDM symbol, and the first CORESET and the second CORESET use different reception beams or a QCL relationship (for example, a QCL relationship of a type D) does not exist between the first CORESET and the second CORESET, the terminal device may measure only the channel resource but not measure the interference resource. Alternatively, this may be understood as follows: The terminal device determines an SINR by using only the channel resource.

For example, the terminal device may calculate the SINR by using, as interfering energy, energy other than the channel resource on an RE occupied by the channel resource. The terminal device may not measure the interference resource. In other words, the terminal device may measure the SINR by using only the channel resource.

For another example, the terminal device may not measure the interference resource, and the terminal device may measure RSRP, RSPQ, and the like by using only the channel resource.

In an implementation, the terminal device may receive the channel resource and the first CORESET by using a same reception beam. Alternatively, this may be understood as follows: The terminal device considers that a quasi-colocation relationship of a type D exists between the channel resource and the first CORESET. Alternatively, this may be understood as follows: The terminal device considers that the channel resource and the first CORESET use a same TCI state.

In an implementation, the terminal device may receive the channel resource by using a reception beam of the first CORESET.

In another implementation, the terminal device may alternatively receive the first CORESET by using a reception beam of the channel resource.

In a possible implementation, before performing step S1803, the terminal device may determine that a preset condition is met. For example, the preset condition may be that a type of the channel resource is an NZP CSI-RS, and density of the CSI-RS is 3. Alternatively, the preset condition may be that a type of the channel resource is an NZP CSI-RS, density of the CSI-RS is 3, and a quantity of ports is 1.

In an implementation, the terminal device performs measurement based on the channel resource. Further, the terminal device may report a measurement result to the network device.

For example, when a plurality of channel resources and interference resources corresponding to the channel resources are configured by using the measurement configuration information, the terminal device may receive, by using the method described in step S1803, each channel resource and an interference resource corresponding to the channel resource.

Embodiment 23

FIG. 19 is a flowchart of another measurement and reporting method according to this application. The method may be applied to a communications device, a chip, a chipset, or the like. The following uses the communications device as an example for description. The method includes the following steps.

For details of steps S1901 and S1902, refer to the foregoing steps S501 and S502. Details are not described herein again.

S1903: When the channel resource and a first CORESET use a same OFDM symbol, the interference resource and a second CORESET use a same OFDM symbol, and the first CORESET and the second CORESET use different reception beams, the terminal device may abandon current measurement, in other words, may not measure the channel resource or the interference resource.

For example, when a plurality of channel resources and interference resources corresponding to the channel resources are configured by using the measurement configuration information, the terminal device may receive, by using the method described in step S1903, each channel resource and an interference resource corresponding to the channel resource.

In any one of Embodiment 9 to Embodiment 23, the CORESET may also be replaced with a PDCCH or a PDSCH. For example, taking Embodiment 9 as an example, if the channel resource and a PDSCH use a same symbol, and an interference resource corresponding to the channel resource does not use a same OFDM symbol as any PDSCH, the terminal device may assume that a quasi-colocation relationship of a type D exists between the PDSCH and the channel resource. Alternatively, this may be understood as follows: The terminal device needs to receive the PDSCH by using a reception beam of the channel resource. Alternatively, this may be understood as follows: The terminal device needs to receive the channel resource by using a reception beam of the PDSCH.

In any one of Embodiment 9 to Embodiment 23, the CORESET may also be replaced with a TRS, a CSI-RS used for RSRP measurement, a CSI-RS used for CQI measurement, or an SSB. For example, taking Embodiment 9 as an example, if the channel resource and a TRS use a same symbol, and an interference resource corresponding to the channel resource does not use a same OFDM symbol as any TRS, the terminal device may assume that a quasi-colocation relationship of a type D exists between the TRS and the channel resource. Alternatively, this may be understood as follows: The terminal device needs to receive the TRS by using a reception beam of the channel resource. Alternatively, this may be understood as follows: The terminal device needs to receive the channel resource by using a reception beam of the TRS. For another example, taking Embodiment 9 as an example, if the channel resource and a CSI-RS resource used for RSRP measurement use a same symbol, and an interference resource corresponding to the channel resource does not use a same OFDM symbol as the CSI-RS resource used for RSRP measurement, the terminal device may assume that a quasi-colocation relationship of a type D exists between the CSI-RS resource used for RSRP measurement and the channel resource. Alternatively, this may be understood as follows: The terminal device needs to receive, by using a reception beam of the channel resource, the CSI-RS resource used for RSRP measurement. Alternatively, this may be understood as follows: The terminal device needs to receive the channel resource by using a reception beam of the CSI-RS resource used for RSRP measurement. For another example, taking Embodiment 9 as an example, if the channel resource and a CSI-RS resource used for CQI measurement use a same symbol, and an interference resource corresponding to the channel resource does not use a same OFDM symbol as the CSI-RS resource used for CQI measurement, the terminal device may assume that a quasi-colocation relationship of a type D exists between the CSI-RS resource used for CQI measurement and the channel resource. Alternatively, this may be understood as follows: The terminal device needs to receive, by using a reception beam of the channel resource, the CSI-RS resource used for CQI measurement. Alternatively, this may be understood as follows: The terminal device needs to receive the channel resource by using a reception beam of the CSI-RS resource used for CQI measurement. For another example, taking Embodiment 9 as an example, if the channel resource and an SSB use a same symbol, and an interference resource corresponding to the channel resource does not use a same OFDM symbol as the SSB, the terminal device may assume that a quasi-colocation relationship of a type D exists between the SSB and the channel resource. Alternatively, this may be understood as follows: The terminal device needs to receive the SSB by using a reception beam of the channel resource. Alternatively, this may be understood as follows: The terminal device needs to receive the channel resource by using a reception beam of the SSB.

The method in this application may also be applied to an inter-cell scenario. In other words, the CORESET/PDCCH/PDSCH/PUCCH/PUSCH/SRS/TRS/CSI-RS and the channel resource and/or the interference resource used for SINR measurement may belong to a same cell or different cells. Regardless of whether the CORESET/PDCCH/PDSCH/PUCCH/PUSCH/SRS/TRS/CSI-RS and the channel resource and/or the interference resource used for SINR measurement belong to a same cell or different cells, if subcarrier spacings corresponding to the channel resource and/or the interference resource and the CORESET/PDCCH/PDSCH/PUCCH/PUSCH/SRS/TRS/CSI-RS are different, having a same OFDM symbol may be specifically that OFDM symbols overlap in terms of time. For example, when a subcarrier spacing of the channel resource is two times a subcarrier spacing of the CORESET, in other words, when a symbol length of the channel resource is half of a symbol length of the CORESET, symbols 0 and 1 of the channel resource overlap a symbol 0 of the CORESET, symbols 2 and 3 of the channel resource overlap a symbol 1 of the CORESET, and the like.

When SINR measurement is performed, a channel resource and a corresponding interference resource need to be configured, and an SINR is measured by using the channel resource and the interference resource. A QCL relationship (for example, a QCL relationship of a type D) exists between the interference resource and a corresponding channel resource. In other words, the interference resource is received by using a reception beam, a TCI state, or a QCL assumption of the channel resource. The network device may configure, for the terminal device, different measurement and report configurations for separately measuring and reporting RSRP and the SINR. For example, a piece of reportConfig 1 may be configured, and the reportConfig 1 is associated with a corresponding channel resource used to measure the RSRP. Another piece of reportConfig 2 may be further configured, and the reportConfig 2 is associated with a corresponding channel resource and interference resource used to measure the SINR. One CSI-RS resource may serve as both a channel resource in the reportConfig 1 and an interference resource in the reportConfig 2. In this case, if the network device configures, for the CSI-RS resource, a TCI state used to indicate a reception beam of the CSI-RS resource, and the TCI state may be different from a TCI state of the channel resource associated with the CSI-RS resource in the reportConfig 2, the terminal device may not be able to complete measurement of both the RSRP and the SINR. The following methods are used to resolve this problem.

Method 1

When one CSI-RS resource is configured as both a channel resource in the reportConfig 1 and an interference resource (the interference resource is associated with a channel resource) in the reportConfig 2, report quantities corresponding to the reportConfig 1 and the reportConfig 2 may be one or a combination of a plurality of RSRP, an SINR, a CQI, RSRQ, a signal to interference ratio (SIR), an SNR, a received signal strength indication (RSSI), a precoding matrix indicator (PMI), a rank indicator (RI), a layer indicator (LI), and a CSI-RS resource indicator (CRI).

If a TCI state is configured for the CSI-RS resource, and the TCI state configured for the CSI-RS resource is the same as a TCI state of the channel resource associated with the CSI-RS resource in the reportConfig 2, the CSI-RS resource is received and measured by using the TCI state.

If a TCI state is configured for the CSI-RS resource, and the TCI state configured for the CSI-RS resource is different from a TCI state of the channel resource associated with the CSI-RS resource in the reportConfig 2, the terminal device may use any one of the following methods:

Method a: The terminal device performs measurement by using a TCI state configured by the network device. In this case, measurement corresponding to the reportConfig 1 is normally performed, and measurement corresponding to the reportConfig 2 cannot be normally performed. Therefore, measurement and reporting corresponding to the reportConfig 2 are abandoned, in other words, a measurement result of the reportConfig 2 is not reported. Alternatively, a measurement result may be determined by measuring only the channel resource associated with the CSI-RS resource in the reportConfig 2. For example, when the reportConfig 2 is used to measure and report an SINR, an SINR measurement result may be determined by measuring only the channel resource associated with the CSI-RS resource in the reportConfig 2. For example, a capability other than a channel resource capability on an RE corresponding to the channel resource is used as interference to determine an SINR/RSRQ/a CQI of the channel resource.

Method b: The terminal device performs measurement by using the TCI state of the channel resource associated with the CSI-RS resource in the reportConfig 2. In this case, measurement corresponding to the reportConfig 2 is normally performed, and measurement corresponding to the reportConfig 1 cannot be normally performed. Therefore, measurement and reporting corresponding to the reportConfig 1 are abandoned, in other words, a measurement result of the reportConfig 1 is not reported. Alternatively, the terminal device may measure the CSI-RS resource by using the TCI state of the channel resource associated with the CSI-RS resource in the reportConfig 2, to determine a measurement result of the reportConfig 1.

Method c: The terminal device selects, according to a reporting priority rule, reportConfig with a higher priority for measurement and reporting, and abandons reportConfig with a lower priority. Specifically, the following priority rule may be used.

For each piece of reportConfig, a priority coefficient may meet the following formula, where a lower priority coefficient indicates a higher priority:

$$\text{Pri}(y,k,c,s) = 2 \cdot N_{cells} \cdot M_s \cdot y + N_{cells} \cdot M_s \cdot k + M_s \cdot c + s, \text{ where}$$

y is related to a type of reportConfig: y is 0 for aperiodic reportConfig; y is 1 for semi-persistent reportConfig reported by using a PUSCH; y is 2 for semi-persistent reportConfig reported by using a PUCCH; and y is 3 for periodic reportConfig;

k is related to a report quantity of the reportConfig, where if the report quantity includes RSRP or an SINR, k is 0; or otherwise, k is 1;

c is an index of a cell corresponding to the reportConfig, and $N_{cells}$ is a value of an RRC parameter maxNrof-ServingCells; and s is an index of the reportConfig, and $M_s$ is a value of an RRC parameter maxNrofCSI-ReportConfigurations.

Method 2

When one CSI-RS resource is configured as both a channel resource in the reportConfig 1 and an interference resource (the interference resource is associated with a channel resource) in the reportConfig 2, report quantities corresponding to the reportConfig 1 and the reportConfig 2 may be one or a combination of a plurality of RSRP, an SINR, a CQI, RSRQ, an SIR, an SNR, an RSSI, a PMI, an RI, an LI, and a CRI. If a TCI state is configured for the CSI-RS resource, the TCI state needs to be the same as a TCI state of the channel resource associated with the CSI-RS resource in the reportConfig 2. In other words, the foregoing constraint may be used in the protocol to avoid a case in which the TCI state configured for the CSI-RS resource is different from the TCI state of the channel resource associated with the CSI-RS resource in the reportConfig 2.

Method 3

When one CSI-RS resource is configured as both a channel resource in the reportConfig 1 and an interference resource (the interference resource is associated with a channel resource) in the reportConfig 2, report quantities corresponding to the reportConfig 1 and the reportConfig 2 may be one or a combination of a plurality of RSRP, an SINR, a CQI, RSRQ, an SIR, an SNR, an RSSI, a PMI, an RI, an LI, and a CRI. If no TCI state is configured for the CSI-RS resource, the CSI-RS resource is measured by using a TCI state of the channel resource associated with the CSI-RS resource in the reportConfig 2, to determine measurement results corresponding to the reportConfig 1 and the reportConfig 2. For example, if a measurement and report quantity of the reportConfig 1 is RSRP, and a measurement and report quantity of the reportConfig 2 is an SINR, the terminal device measures the CSI-RS resource by using the TCI state of the channel resource associated with the CSI-RS resource in the reportConfig 2, to calculate corresponding RSRP.

The foregoing methods can resolve a problem that a QCL relationship is ambiguous when one CSI-RS resource is used as both a channel resource and an interference resource in different report configurations.

In beam management, the network device may configure a piece of reportConfig to configure the terminal device to measure RSRP or an SINR to perform beam training, in other words, determine an optimal downlink transmission beam and reception beam. When a piece of reportConfig is used for reception beam training, a measurement result usually does not need to be reported. In this case, a report quantity of the reportConfig may be configured as "None". When the report quantity is configured as "None", whether the terminal device performs reception beam training by measuring RSRP or an SINR may be determined by using the following method.

Specifically, when a report quantity reportQuantity of a piece of reportConfig is configured as "None", the terminal device measures RSRP by default; or the terminal device measures an SINR by default.

Alternatively, when a report quantity reportQuantity of a piece of reportConfig is configured as "None", and the reportConfig is associated with more than one resource setting, the terminal device needs to measure an SINR. When a report quantity reportQuantity of a piece of reportConfig is configured as "None", and the reportConfig is associated with only one resource setting, the terminal device needs to measure RSRP.

Alternatively, when a report quantity reportQuantity of a piece of reportConfig is configured as "None", and the reportConfig is associated with more than one resource setting, the terminal device needs to measure an SINR. When a report quantity reportQuantity of a piece of reportConfig is configured as "None", and the reportConfig is associated with only one resource setting, if all frequency domain density of resources in the resource setting is 3 or all quantities of ports of resources in the resource setting are 1, the terminal device needs to measure an SINR; otherwise, the terminal device needs to measure RSRP.

The foregoing method can resolve a problem that when a report quantity is configured as "none", the terminal device cannot determine whether to measure an SINR or RSRP, to avoid technical ambiguity.

Embodiment 1 to Embodiment 23 may also be applied to uplink, in other words, applied to resolving a conflict between an SRS and a PUCCH. Specifically, the channel resource and the interference resource in the foregoing solution may be replaced with the SRS, and the CORESET may be replaced with the PUCCH or a PUSCH.

Specifically, in a possible method for resolving an uplink conflict, the SRS and the PUCCH are staggered in terms of configuration. To be specific, the SRS cannot be configured on an OFDM symbol on which the PUCCH is located, in other words, the SRS can be configured only on a symbol other than the OFDM symbol on which the PUCCH is located; or the PUCCH cannot be configured on an OFDM symbol on which the SRS is located, in other words, the PUCCH can be configured only on a symbol other than the OFDM symbol on which the SRS is located.

In another possible method, if an SRS and a PUCCH have a same transmission beam or spatial relationship, the SRS and the PUCCH can be configured on a same OFDM symbol. If an SRS and a PUCCH have different transmission beams or spatial relations, the SRS and the PUCCH need to be staggered in terms of configuration. To be specific, the SRS cannot be configured on an OFDM symbol on which the PUCCH is located, in other words, the SRS can be configured only on a symbol other than the OFDM symbol on which the PUCCH is located; or the PUCCH cannot be configured on an OFDM symbol on which the SRS is located, in other words, the PUCCH can be configured only on a symbol other than the OFDM symbol on which the SRS is located.

In another possible method, if an SRS and a PUCCH are configured on a same OFDM symbol, and transmission beams or spatial relations of the SRS and the PUCCH are different, the terminal device sends only the SRS or only the PUCCH.

In another possible method, if an SRS and a PUCCH are configured on a same OFDM symbol, and transmission beams or spatial relations of the SRS and the PUCCH are different, the terminal device considers that the SRS and the PUCCH are transmitted by using a same transmission beam or spatial relation. In other words, the SRS and the PUCCH are sent by using a transmission beam or a spatial relation of the SRS, or the SRS and the PUCCH are sent by using a transmission beam or a spatial relation of the PUCCH.

In the foregoing method, the PUCCH may also be replaced with a PUSCH, in other words, the foregoing method can resolve a conflict between the SRS and the PUSCH.

In the foregoing method, the SRS may also be replaced with a PUSCH, in other words, the foregoing method can resolve a conflict between the PUCCH and the PUSCH.

When L1-SINR measurement is performed, one report configuration CSI-ReportConfig and three resource configurations (or resource settings) may be configured. The first resource setting includes one or more channel resource sets, and each channel resource set includes one or more channel resources. The second resource setting includes an interference resource of a type CSI-IM. The third resource setting includes an interference resource of a type NZP CSI-RS.

A quantity of resources in the first resource setting and a quantity of resources in the third resource setting may be equal, and the resources in the first resource setting may be in a one-to-one association with the resources in the third resource setting.

The second resource setting may include only one interference resource of CSI-IM, and the interference resource is associated with all channel resources in the first resource setting.

Alternatively, the second resource setting may include only K interference resources of CSI-IM, K is the quantity of resource sets included in the first resource setting, and each CSI-IM resource is associated with resources in one resource set. K may be limited to 1, and this case is equivalent to the previous case.

When the first CSI-IM is associated with a plurality of channels, a specific channel resource whose reception beam is used to receive the CSI-IM resource or a channel resource that is QCL with the CSI-IM resource and that is considered by the terminal device needs to be clarified. There may be the following solutions.

Method 1: It is specified in the protocol that one CSI-IM is QCL with a specific channel resource. The specific channel resource may be the first resource, the last resource, a resource with a smallest index, a resource with a largest index, a resource for which a TCI state is configured, the first resource in resources for which TCI states are configured, the last resource in resources for which TCI states are configured, a resource with a smallest index in resources for which TCI states are configured, a resource with a largest index in resources for which TCI states are configured, a resource for which QCL-info of a type D is configured, the first resource in resources for which QCL-info of a type D is configured, the last resource in resources for which QCL-info of a type D is configured, a resource with a smallest index in resources for which QCL-info of a type D is configured, or a resource with a largest index in resources for which QCL-info of a type D is configured in channel resources associated with the CSI-IM.

Method 2: A periodicity of the CSI-IM is configured as 1/N of a periodicity of the channel resource associated with the CSI-IM, where N is a quantity of channel resources associated with the CSI-IM. In this way, the CSI-IM resource can be measured N times by using reception beams of the channel resources. The terminal device may sequentially receive the CSI-IM by using the reception beams of the associated channel resources. For example, the CSI-IM is associated with four channel resources, which are channel resources 1 to 4, and a measurement periodicity of the channel resource is 16 ms. Therefore, a measurement periodicity of the interference resource may be configured as 16/4=4 ms. Therefore, at a first moment, the terminal device receives and measures the interference resource by using a reception beam of the channel resource 1, to obtain a measurement result 1. After an interval 4 ms, the terminal device receives and measures the interference resource by using a reception beam of the channel resource 2, to obtain a measurement result 2. Then, after an interval 4 ms, the terminal device receives and measures the interference resource by using a reception beam of the channel resource 3, to obtain a measurement result 3. Then, after an interval 4 ms, the terminal device receives and measures the interference resource by using a reception beam of the channel resource 4, to obtain a measurement result 4. After 16 ms following the first moment, the terminal device receives and measures the channel resources 1 to 4, determines and reports result data 1 based on the channel resource 1 and the measurement result 1, determines and reports result data 2 based on the channel resource 2 and the measurement result 2, determines and reports result data 3 based on the channel resource 3 and the measurement result 3, and determines and reports result data 4 based on the channel resource 4 and the measurement result 4.

Method 3: A limitation that reception beams of the channel resources associated with the CSI-IM are the same is imposed.

When a report configuration used for L1-SINR measurement is associated with three resource settings, one or a combination of the following configuration constraints needs to be met.

1. Only one TCI state can be configured for all channel resources associated with one interference resource of CSI-IM. For example, one interference resource of CSI-IM is associated with one channel resource set or is associated with all channel resources in the resource set, and in the resource set, a TCI state is configured for only one resource, or TCI states are configured for a plurality of resources and the TCI states of the plurality of resources are the same, or TCI states are configured for all the resources and the TCI states of all the resources are the same. For another example, one interference resource of CSI-IM is associated with one resource setting of channel resources or is associated with all channel resources in the resource setting, and in the resource setting, a TCI state is configured for only one resource, or TCI states are configured for a plurality of resources and the TCI states of the plurality of resources are the same, or TCI states are configured for all the resources and the TCI states of all the resources are the same.

2. Repetition parameters of resource sets corresponding to all channel resources associated with one interference resource of CSI-IM are configured as "off". For example, one interference resource of CSI-IM is associated with one channel resource set or is associated with all channel resources in the resource set, and a repetition parameter of the resource set is configured as "off". For another example, one interference resource of CSI-IM is associated with one resource setting of channel resources or is associated with all channel resources in the resource setting, and a repetition parameter of a resource set included in the resource setting is configured as "off".

The foregoing method can clarify QCL information of CSI-IM, to avoid technical ambiguity.

The methods in the foregoing embodiments may be configured by using RRC signaling. In other words, a specific method to be used by the terminal device or a specific method used for performing reporting by the terminal device may be configured by using RRC signaling.

The SINR in the foregoing embodiments may be replaced with another measured parameter such as RSRP, RSRQ, an SNR, an SIR, an RSSI, a CQI, a PMI, an RI of a channel, or an LI. In other words, the method in this application is also applicable to measurement and reporting of the foregoing indicators.

Based on a same invention concept as that of the method embodiments, an embodiment of this application provides a communications apparatus. A structure of the communications apparatus may be shown in FIG. 20, and the communications apparatus includes a processing module 2001 and a transceiver module 2002. The transceiver module 2002 may communicate with the outside, and the processing module 2001 is configured to perform processing, for example, perform measurement. The transceiver module 2002 may also be referred to as a communications interface, a transceiver unit, or a communications unit. The transceiver module 2002 may be configured to perform actions performed by the terminal device in the foregoing method embodiments, or the transceiver module 2002 may be configured to perform actions performed by the network device in the foregoing method embodiments.

For example, the transceiver module 2002 includes a sending module and/or a receiving module. The sending module and the receiving module are respectively configured to perform sending and receiving steps of the network device or the terminal device in the foregoing method embodiments.

In an implementation, the communications apparatus may be specifically configured to implement the method performed by the terminal device in Embodiment 1. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. If a repetition parameter of a resource set corresponding to the channel resource is configured as "on", the channel resource and an interference resource associated with the channel resource are configured on OFDM symbols other than an OFDM symbol occupied by a CORESET (or search space associated with the CORE-SET). The processing module 2001 is configured to perform measurement based on the configured channel resource and interference resource.

In another implementation, the communications apparatus may be specifically configured to implement the method performed by the network device in Embodiment 1. The apparatus may be the network device, or may be a chip, a chipset, or a part of the chip, where the chip and the chipset are in the network device, and the part of the chip is configured to perform a function of a related method. The transceiver module 2002 is configured to perform receiving/sending related operations on a network device side in the foregoing method embodiments, and the processing module 2001 is configured to perform processing related operations of the network device in the foregoing method embodiments. For example, the transceiver module 2002 is configured to send measurement configuration information to a terminal device, where the measurement configuration information is used to configure a channel resource and an interference resource. If a repetition parameter of a resource set corresponding to the channel resource is configured as "on", the channel resource and an interference resource associated with the channel resource are configured on OFDM symbols other than an OFDM symbol occupied by a CORESET (or search space associated with the CORE-SET). The transceiver module 2002 is further configured to send the configured channel resource and interference resource.

In an implementation, the communications apparatus may be specifically configured to implement the method performed by the terminal device in Embodiment 2. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. If a repetition parameter of a resource set corresponding to the interference resource is configured as "on", a channel resource and an interference resource associated with the channel resource are configured on OFDM symbols other than an OFDM symbol occupied by a CORESET. The processing module 2001 is configured to perform measurement based on the configured channel resource and interference resource.

In another implementation, the communications apparatus may be specifically configured to implement the method performed by the network device in Embodiment 2. The apparatus may be the network device, or may be a chip, a chipset, or a part of the chip, where the chip and the chipset are in the network device, and the part of the chip is configured to perform a function of a related method. The transceiver module 2002 is configured to perform receiving/sending related operations on a network device side in the foregoing method embodiments, and the processing module 2001 is configured to perform processing related operations of the network device in the foregoing method embodiments. For example, the transceiver module 2002 is configured to send measurement configuration information to a terminal device, where the measurement configuration information is used to configure a channel resource and an interference resource. If a repetition parameter of a resource set corresponding to the interference resource is configured as "on", a channel resource and an interference resource associated with the channel resource are configured on OFDM symbols other than an OFDM symbol occupied by a CORESET. The transceiver module 2002 is further configured to send the configured channel resource and interference resource.

In an implementation, the communications apparatus may be specifically configured to implement the method performed by the terminal device in Embodiment 3. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. If a repetition parameter of either of a resource set corresponding to the channel resource and a resource set corresponding to the interference resource is configured as "on", the channel resource and an interference resource associated with the channel resource are configured on OFDM symbols other than an OFDM symbol occupied by a CORESET. The processing module 2001 is configured to perform measurement based on the configured channel resource and interference resource.

In another implementation, the communications apparatus may be specifically configured to implement the method performed by the network device in Embodiment 3. The apparatus may be the network device, or may be a chip, a chipset, or a part of the chip, where the chip and the chipset are in the network device, and the part of the chip is configured to perform a function of a related method. The transceiver module 2002 is configured to perform receiving/ sending related operations on a network device side in the foregoing method embodiments, and the processing module 2001 is configured to perform processing related operations of the network device in the foregoing method embodiments. For example, the transceiver module 2002 is configured to send measurement configuration information to a terminal device, where the measurement configuration information is used to configure a channel resource and an interference resource. If a repetition parameter of either of a resource set corresponding to the channel resource and a resource set corresponding to the interference resource is configured as "on", the channel resource and an interference resource associated with the channel resource are configured on OFDM symbols other than an OFDM symbol occupied by a CORESET. The transceiver module 2002 is further configured to send the configured channel resource and interference resource.

In an implementation, the communications apparatus may be specifically configured to implement the method performed by the terminal device in Embodiment 4. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. If both a repetition parameter of a resource set corresponding to the channel resource and a repetition parameter of a resource set corresponding to the interference resource are configured as "on", the channel resource and an interference resource associated with the channel resource are configured on OFDM symbols other than an OFDM symbol occupied by a CORESET. The processing module 2001 is configured to perform measurement based on the configured channel resource and interference resource.

In another implementation, the communications apparatus may be specifically configured to implement the method performed by the network device in Embodiment 4. The apparatus may be the network device, or may be a chip, a chipset, or a part of the chip, where the chip and the chipset are in the network device, and the part of the chip is configured to perform a function of a related method. The transceiver module 2002 is configured to perform receiving/ sending related operations on a network device side in the foregoing method embodiments, and the processing module 2001 is configured to perform processing related operations of the network device in the foregoing method embodiments. For example, the transceiver module 2002 is configured to send measurement configuration information to a terminal device, where the measurement configuration information is used to configure a channel resource and an interference resource. If both a repetition parameter of a resource set corresponding to the channel resource and a repetition parameter of a resource set corresponding to the interference resource are configured as "on", the channel resource and an interference resource associated with the channel resource are configured on OFDM symbols other than an OFDM symbol occupied by a CORESET. The transceiver module 2002 is further configured to send the configured channel resource and interference resource.

In an implementation, the communications apparatus may be specifically configured to implement the method performed by the terminal device in Embodiment 5. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. If a repetition parameter of a resource set corresponding to the channel resource is configured as "on", the channel resource is configured on an OFDM symbol other than an OFDM symbol occupied by a CORESET. The processing module 2001 is configured to perform measurement based on the configured channel resource and interference resource.

In another implementation, the communications apparatus may be specifically configured to implement the method performed by the network device in Embodiment 5. The apparatus may be the network device, or may be a chip, a chipset, or a part of the chip, where the chip and the chipset are in the network device, and the part of the chip is configured to perform a function of a related method. The transceiver module 2002 is configured to perform receiving/ sending related operations on a network device side in the foregoing method embodiments, and the processing module 2001 is configured to perform processing related operations of the network device in the foregoing method embodiments. For example, the transceiver module 2002 is configured to send measurement configuration information to a terminal device, where the measurement configuration information is used to configure a channel resource and an interference resource. If a repetition parameter of a resource set corresponding to the channel resource is configured as "on", the channel resource is configured on an OFDM symbol other than an OFDM symbol occupied by a CORE-SET. The transceiver module 2002 is further configured to send the configured channel resource and interference resource.

In an implementation, the communications apparatus may be specifically configured to implement the method performed by the terminal device in Embodiment 6. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. If a repetition parameter of a resource set corresponding to the interference resource is configured as "on", the interference resource is configured on an OFDM symbol other than an OFDM symbol occupied by a CORE-SET. The processing module 2001 is configured to perform measurement based on the configured channel resource and interference resource.

In another implementation, the communications apparatus may be specifically configured to implement the method performed by the network device in Embodiment 6. The apparatus may be the network device, or may be a chip, a chipset, or a part of the chip, where the chip and the chipset are in the network device, and the part of the chip is configured to perform a function of a related method. The transceiver module 2002 is configured to perform receiving/sending related operations on a network device side in the foregoing method embodiments, and the processing module 2001 is configured to perform processing related operations of the network device in the foregoing method embodiments. For example, the transceiver module 2002 is configured to send measurement configuration information to a terminal device, where the measurement configuration information is used to configure a channel resource and an interference resource. If a repetition parameter of a resource set corresponding to the interference resource is configured as "on", the interference resource is configured on an OFDM symbol other than an OFDM symbol occupied by a CORE-SET. The transceiver module 2002 is further configured to send the configured channel resource and interference resource.

In an implementation, the communications apparatus may be specifically configured to implement the method performed by the terminal device in Embodiment 7. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The interference resource and the channel resource meet Condition 7. The processing module 2001 is configured to perform measurement based on the configured channel resource and interference resource.

Condition 7 may be as follows: When SINR measurement or CQI measurement is performed, the channel resource and an interference resource associated with the channel resource are configured on OFDM symbols other than an OFDM symbol occupied by a CORESET.

Alternatively, Condition 7 may be as follows: When SINR measurement or CQI measurement is performed, the channel resource is configured on an OFDM symbol other than an OFDM symbol occupied by a CORESET.

Alternatively, Condition 7 may be as follows: When SINR measurement or CQI measurement is performed, the interference resource is configured on an OFDM symbol other than an OFDM symbol occupied by a CORESET.

In another implementation, the communications apparatus may be specifically configured to implement the method performed by the network device in Embodiment 7. The apparatus may be the network device, or may be a chip, a chipset, or a part of the chip, where the chip and the chipset are in the network device, and the part of the chip is configured to perform a function of a related method. The transceiver module 2002 is configured to perform receiving/sending related operations on a network device side in the foregoing method embodiments, and the processing module 2001 is configured to perform processing related operations of the network device in the foregoing method embodiments. For example, the transceiver module 2002 is configured to send measurement configuration information to a terminal device, where the measurement configuration information is used to configure a channel resource and an interference resource. The interference resource and the channel resource meet Condition 7. The transceiver module 2002 is further configured to send the configured channel resource and interference resource.

Condition 7 may be as follows: When SINR measurement or CQI measurement is performed, the channel resource and an interference resource associated with the channel resource are configured on OFDM symbols other than an OFDM symbol occupied by a CORESET.

Alternatively, Condition 7 may be as follows: When SINR measurement or CQI measurement is performed, the channel resource is configured on an OFDM symbol other than an OFDM symbol occupied by a CORESET.

Alternatively, Condition 7 may be as follows: When SINR measurement or CQI measurement is performed, the interference resource is configured on an OFDM symbol other than an OFDM symbol occupied by a CORESET.

In an implementation, the communications apparatus may be specifically configured to implement the method performed by the terminal device in Embodiment 8. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The interference resource and the channel resource meet Condition 8. The processing module 2001 is configured to perform measurement based on the configured channel resource and interference resource.

Condition 8 may be as follows: When a repetition parameter of a resource set corresponding to the channel resource is configured as "off", if the channel resource and a CORE-SET use a same reception beam, the channel resource and the CORESET can use a same OFDM symbol. On the contrary, the channel resource and the CORESET cannot use a same OFDM symbol.

Alternatively, Condition 8 may be as follows: When a repetition parameter of a resource set corresponding to the interference resource is configured as "off", if the interference resource and a CORESET use a same reception beam, the interference resource and the CORESET can use a same OFDM symbol. On the contrary, the interference resource and the CORESET cannot use a same OFDM symbol.

Alternatively, Condition 8 may be as follows: When a repetition parameter of a resource set corresponding to the channel resource is configured as "off", if the channel resource and a CORESET use a same reception beam, an interference resource corresponding to the channel resource and the CORESET can use a same OFDM symbol. On the contrary, the interference resource corresponding to the channel resource and the CORESET cannot use a same OFDM symbol.

Alternatively, Condition 8 may be as follows: When both a repetition parameter of a resource set corresponding to the channel resource and a repetition parameter of a resource set corresponding to the interference resource are configured as "off", if two CORESETs have a same reception beam or TCI state, the channel resource and an interference resource corresponding to the channel resource can respectively use same symbols as the two CORESETs. On the contrary, the channel resource and the interference resource corresponding to the channel resource cannot respectively use same symbols as the two CORESETs.

In another implementation, the communications apparatus may be specifically configured to implement the method performed by the network device in Embodiment 8. The apparatus may be the network device, or may be a chip, a chipset, or a part of the chip, where the chip and the chipset are in the network device, and the part of the chip is configured to perform a function of a related method. The transceiver module 2002 is configured to perform receiving/ sending related operations on a network device side in the foregoing method embodiments, and the processing module 2001 is configured to perform processing related operations of the network device in the foregoing method embodiments. For example, the transceiver module 2002 is configured to send measurement configuration information to a terminal device, where the measurement configuration information is used to configure a channel resource and an interference resource. The interference resource and the channel resource meet Condition 8. The transceiver module 2002 is further configured to send the configured channel resource and interference resource.

Condition 8 may be as follows: When a repetition parameter of a resource set corresponding to the channel resource is configured as "off", if the channel resource and a CORE-SET use a same reception beam, the channel resource and the CORESET can use a same OFDM symbol. On the contrary, the channel resource and the CORESET cannot use a same OFDM symbol.

Alternatively, Condition 8 may be as follows: When a repetition parameter of a resource set corresponding to the interference resource is configured as "off", if the interference resource and a CORESET use a same reception beam, the interference resource and the CORESET can use a same OFDM symbol. On the contrary, the interference resource and the CORESET cannot use a same OFDM symbol.

Alternatively, Condition 8 may be as follows: When a repetition parameter of a resource set corresponding to the channel resource is configured as "off", if the channel resource and a CORESET use a same reception beam, an interference resource corresponding to the channel resource and the CORESET can use a same OFDM symbol. On the contrary, the interference resource corresponding to the channel resource and the CORESET cannot use a same OFDM symbol.

Alternatively, Condition 8 may be as follows: When both a repetition parameter of a resource set corresponding to the channel resource and a repetition parameter of a resource set corresponding to the interference resource are configured as "off", if two CORESETs have a same reception beam or TCI state, the channel resource and an interference resource corresponding to the channel resource can respectively use same symbols as the two CORESETs. On the contrary, the channel resource and the interference resource corresponding to the channel resource cannot respectively use same symbols as the two CORESETs.

In an implementation, the communications apparatus may be specifically configured to implement the method performed by the terminal device in Embodiment 9. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The transceiver module 2002 is further configured to: when the channel resource and one CORESET use a same OFDM symbol, and an interference resource corresponding to the channel resource does not use a same OFDM symbol as any CORESET, receive the channel resource, the interference resource corresponding to the channel resource, and the CORESET by using a same reception beam.

In an implementation, the communications apparatus may be specifically configured to implement the method performed by the terminal device in Embodiment 10. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the channel resource and one CORESET use a same OFDM symbol, and an interference resource corresponding to the channel resource does not use a same OFDM symbol as any CORESET, measure only the channel resource but not measure the interference resource.

In an implementation, the communications apparatus may be specifically configured to implement the method performed by the terminal device in Embodiment 11. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the channel resource and one CORESET use a same OFDM symbol, and an interference resource corresponding to the channel resource does not use a same OFDM symbol as any CORESET, abandon current measurement.

In an implementation, the communications apparatus may be specifically configured to implement the method performed by the terminal device in Embodiment 12. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The transceiver module 2002 is further configured to: when the interference resource and one CORESET use a same OFDM symbol, and the channel resource does not use a same OFDM symbol as any CORESET, receive the channel resource, an interference resource corresponding to the channel resource, and the CORESET by using a same reception beam.

In an implementation, the communications apparatus may be specifically configured to implement the method performed by the terminal device in Embodiment 13. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the interference resource and one CORESET use a same OFDM symbol, and the channel resource does not use a same OFDM symbol as any CORESET, measure only the channel resource but not measure the interference resource.

In an implementation, the communications apparatus may be specifically configured to implement the method performed by the terminal device in Embodiment 14. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the interference resource and one CORESET use a same OFDM symbol, and the channel resource does not use a same OFDM symbol as any CORESET, abandon current measurement.

In an implementation, the communications apparatus may be specifically configured to implement the method performed by the terminal device in Embodiment 15. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The transceiver module 2002 is further configured to: when the channel resource and the interference resource use a same OFDM symbol as one CORESET, receive the channel resource, an interference resource corresponding to the channel resource, and the CORESET by using a same reception beam.

In an implementation, the communications apparatus may be specifically configured to implement the method performed by the terminal device in Embodiment 16. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the channel resource and the interference resource use a same OFDM symbol as one CORESET, measure only the channel resource but not measure the interference resource.

In an implementation, the communications apparatus may be specifically configured to implement the method performed by the terminal device in Embodiment 17. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the channel resource and the interference resource use a same OFDM symbol as one CORESET, abandon current measurement.

In an implementation, the communications apparatus may be specifically configured to implement the method performed by the terminal device in Embodiment 18. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The transceiver module 2002 is further configured to: when the channel resource and a first CORESET use a same OFDM symbol, the interference resource and a second CORESET use a same OFDM symbol, and the first CORESET and the second CORESET use a same reception beam, receive the channel resource, an interference resource corresponding to the channel resource, and the first CORESET, and the second CORESET by using a same reception beam.

In an implementation, the communications apparatus may be specifically configured to implement the method performed by the terminal device in Embodiment 19. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the channel resource and a first CORESET use a same OFDM symbol, the interference resource and a second CORESET use a same OFDM symbol, and the first CORESET and the second CORESET use a same reception beam, measure the channel resource but not measure the interference resource.

In an implementation, the communications apparatus may be specifically configured to implement the method performed by the terminal device in Embodiment 20. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the channel resource and a first CORESET use a same OFDM symbol, the interference resource and a second CORESET use a same OFDM symbol, and the first CORESET and the second CORESET use a same reception beam, abandon current measurement.

In an implementation, the communications apparatus may be specifically configured to implement the method performed by the terminal device in Embodiment 21. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The transceiver module 2002 is further configured to: when the channel resource and a first CORESET use a same OFDM symbol, the interference resource and a second CORESET use a same OFDM symbol, and the first CORESET and the second CORESET use different reception beams, receive the channel resource, an interference resource corresponding to the channel resource, and the CORESET by using a same reception beam.

In an implementation, the communications apparatus may be specifically configured to implement the method performed by the terminal device in Embodiment 22. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the channel resource and a first CORESET use a same OFDM symbol, the interference resource and a second CORESET use a same OFDM symbol, and the first CORESET and the second CORESET use different reception beams, measure the channel resource but not measure the interference resource.

In an implementation, the communications apparatus may be specifically configured to implement the method performed by the terminal device in Embodiment 23. The apparatus may be the terminal device, or may be a chip, a chipset, or a part of the chip, where the chip and the chipset are in the terminal device, and the part of the chip is configured to perform a function of a related method. The transceiver module 2002 is configured to perform receiving/ sending related operations on a terminal device side in the foregoing method embodiments, and the processing module 2001 is configured to perform processing related operations of the terminal device in the foregoing method embodiments. For example, the transceiver module 2002 is configured to receive measurement configuration information from a network device, where the measurement configuration information is used to configure a channel resource and an interference resource. The processing module 2001 is further configured to: when the channel resource and a first CORESET use a same OFDM symbol, the interference resource and a second CORESET use a same OFDM symbol, and the first CORESET and the second CORESET use different reception beams, abandon current measurement.

In embodiments of this application, module division is an example, and is merely logical function division. During actual implementation, another division manner may be used. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this application, further refer to related descriptions in the method embodiments.

Figure 21:
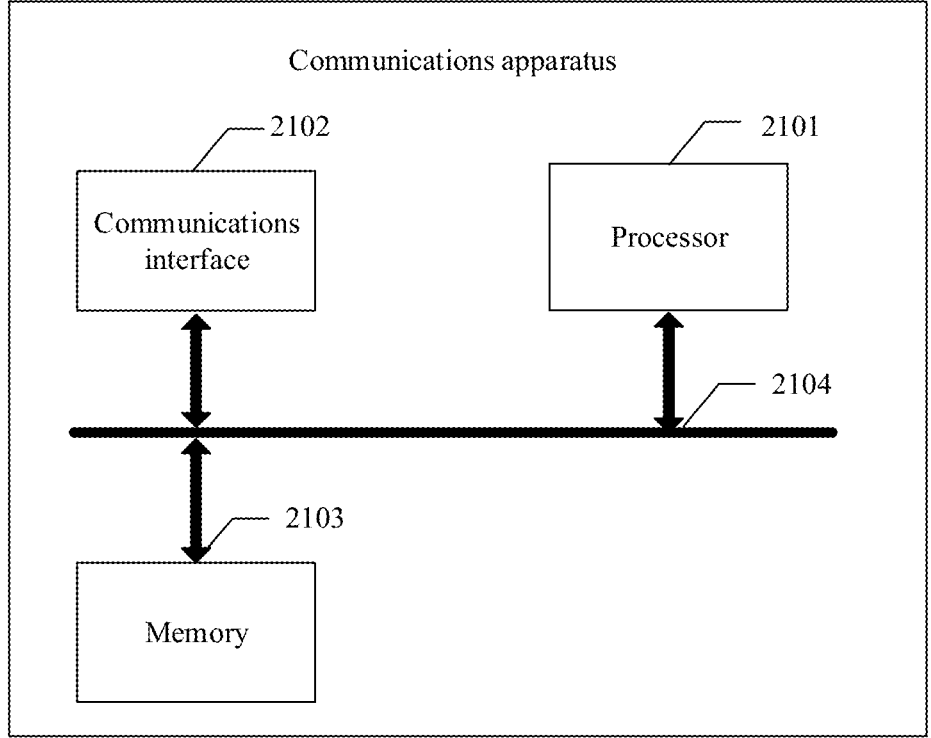
FIG. 21 is a schematic diagram of a structure of another communications apparatus according to an embodiment of this application.

In a possible manner, the communications apparatus may be shown in FIG. 21. The communications apparatus may be a communications device or a chip in the communications device. The communications device may be a terminal device, or may be a network device. The apparatus may include a processor 2101, a communications interface 2102, and a memory 2103. The processing module 2001 may be the processor 2101. The transceiver module 2002 may be the communications interface 2102. It should be further understood that the transceiver module 2002 may be alternatively an input/output interface. In addition, a function of the transceiver module 2002 may be implemented by a transceiver. The transceiver may include a transmitter and/or a receiver, and the transmitter and the receiver respectively implement functions of a sending unit and a receiving unit.

The processor 2101 may be a central processing unit (CPU), a digital processing module, or the like. The communications interface 2102 may be a transceiver, an interface circuit such as a transceiver circuit, a transceiver chip, or the like. The apparatus further includes the memory 2103, configured to store a program to be executed by the processor 2101. The memory 2103 may be a nonvolatile memory such as a hard disk drive (HDD) or a solid-state drive (SSD), or may be a volatile memory, for example, a random access memory (RAM). The memory 2103 is any other medium that can be configured to carry or store expected program code in a form of instructions or a data structure and that can be accessed by a computer, but is not limited thereto.

The processor 2101 is configured to execute program code stored in the memory 2103, and is specifically configured to perform actions of the processing module 2001, and details are not described herein again in this application. The communications interface 2102 is specifically configured to perform actions of the transceiver module 2002, and details are not described herein again in this application.

The communications interface 2102, the processor 2101, and the memory 2103 may communicate with each other and transmit a control signal and/or a data signal to each other by using an internal connection path. The memory 2103 is configured to store a computer program. The processor 2101 is configured to invoke the computer program from the memory 2103 and run the computer program, to control the communications interface 2102 to receive/send a signal. Optionally, the communications apparatus may further include an antenna, configured to send, by using a wireless signal, data, control signaling, information, or a message output by the communications interface 2102.

The processor 2101 and the memory 2103 may be integrated into a processing apparatus. The processor 2101 is configured to execute the program code stored in the memory 2103, to implement the foregoing function. In specific implementation, the memory 2103 may be integrated into the processor 2101 or independent of the processor 2101. The processor 2101 may correspond to the processing module in FIG. 20.

Figure 20:
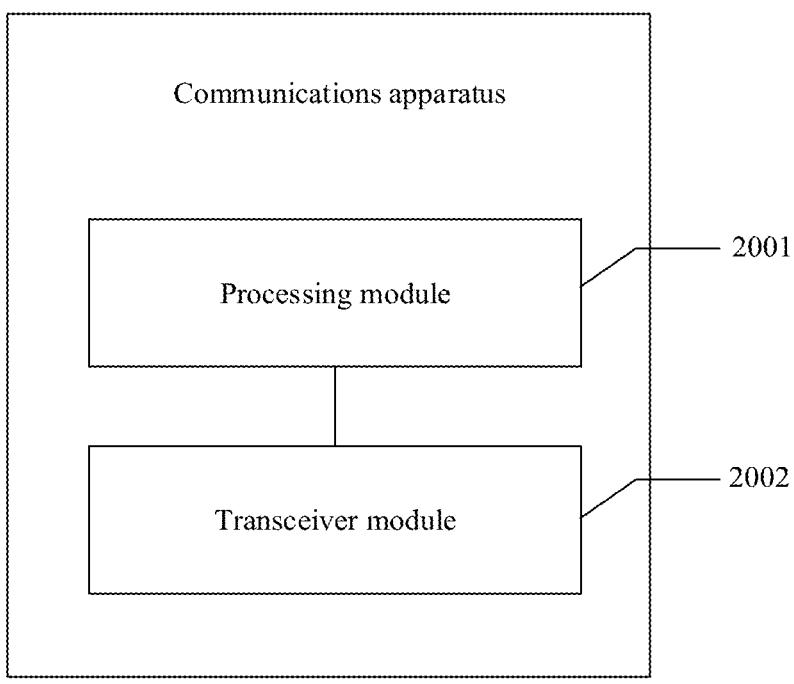
FIG. 20 is a schematic diagram of a structure of a communications apparatus according to an embodiment of this application.

The communications interface 2102 may correspond to the transceiver module in FIG. 20, and may also be referred to as a transceiver unit or a transceiver. The communications interface 2102 may include a receiver (also referred to a receiver circuit) and a transmitter (also referred to as a transmitter circuit). The receiver is configured to receive a signal, and the transmitter is configured to transmit a signal.

In this embodiment of this application, a specific connection medium between the communications interface 2102, the processor 2101, and the memory 2103 is not limited. In this embodiment of this application, the memory 2103, the processor 2101, and the communications interface 2102 are connected by using a bus 2104 in FIG. 21. The bus is represented by using a bold line in FIG. 21. A manner of connection between other components is merely an example for description, and imposes no limitation. The bus may be classified into an address bus, a data bus, a control bus, and the like. For ease of representation, only one thick line is used to represent the bus in FIG. 21, but this does not mean that there is only one bus or only one type of bus.

An embodiment of this application further provides a processing apparatus, including a processor and an interface. The processor may be configured to perform the method in the foregoing method embodiments.

It should be understood that, the processing apparatus may be a chip. For example, the processing apparatus may be a field programmable gate array (FPGA), an application-specific integrated circuit (ASIC), a system on chip (SoC), a CPU, a network processor (NP), a digital signal processor (DSP), a micro controller unit (MCU), a programmable logic device (PLD), or another integrated chip.

An embodiment of the present invention further provides a computer-readable storage medium, configured to store computer software instructions that need to be executed for execution of the foregoing processor, and the computer-readable storage medium includes a program that needs to be executed for execution of the foregoing processor.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the protection scope of this application. In this way, this application is intended to cover these modifications and variations of this application provided that they fall within the scope of protection defined by the following claims and their equivalent technologies.

What is claimed is:

1. A measurement and reporting method, applied to a terminal device, the method comprising:

receiving measurement configuration information from a network device, wherein the measurement configuration information is used to configure a channel resource and an interference resource; and in response to the channel resource and the interference resource meeting a preset condition, the channel resource and the interference resource are configured on orthogonal frequency division multiplexing (OFDM) symbols other than an OFDM symbol occupied by a control-resource set (CORESET), including the OFDM symbol occupied by the CORESET is shunned during configuration of the channel resource and the interference resources;

performing measurement based on the configured channel resource and interference resource; and wherein the preset condition is that a time-frequency resource occupied by the channel resource and a time-frequency resource occupied by a first CORESET comprise a same OFDM symbol, a time-frequency resource occupied by the interference resource and a time-frequency resource occupied by a second CORESET comprise a same OFDM symbol, and the first CORESET and the second CORESET correspond to a same reception beam; and the CORESET comprises the first CORESET and the second CORESET.

2. The method according to claim 1, wherein the channel resource is a channel state information reference signal (CSI-RS) resource or a synchronization signal/physical broadcast channel block (SSB).

3. The method according to claim 2, wherein the interference resource is the CSI-RS resource, the SSB, or a channel state information interference measurement (CSI-IM) resource.

4. The method according to claim 2, wherein channel resources are in a one-to-one correspondence with interference resources.

5. The method according to claim 1, wherein channel resources are in a one-to-one correspondence with interference resources.

6. The method according to claim 1, wherein the preset condition comprises one or more of the following:

a repetition parameter of a resource set corresponding to the channel resource is configured as "on"; and a repetition parameter of a resource set corresponding to the interference resource is configured as "on".

7. The method according to claim 6, wherein channel resources are in a one-to-one correspondence with interference resources.

8. A measurement and reporting method, applied to a network device, the method comprising:

sending measurement configuration information to a terminal device, wherein the measurement configuration information is used to configure a channel resource and an interference resource; and in response to the channel resource and the interference resource meeting a preset condition, the channel resource and the interference resource are configured on orthogonal frequency division multiplexing (OFDM) symbols other than an OFDM symbol occupied by a control-resource set (CORESET), including the OFDM symbol occupied by the CORESET is shunned during configuration of the channel resource and the interference resources;

sending the configured channel resource and interference resource; and wherein the preset condition is that a time-frequency resource occupied by the channel resource and a time-frequency resource occupied by a first CORESET comprise a same OFDM symbol, a time-frequency resource occupied by the interference resource and a time-frequency resource occupied by a second CORESET comprise a same OFDM symbol, and the first CORESET and the second CORESET correspond to a same reception beam; and the CORESET comprises the first CORESET and the second CORESET.

9. The method according to claim 8, wherein the channel resource is a channel state information reference signal (CSI-RS) resource or a synchronization signal/physical broadcast channel block (SSB).

10. The method according to claim 9, wherein the interference resource is the CSI-RS resource, the SSB, or a channel state information interference measurement (CSI-IM) resource.

11. The method according to claim 8, wherein channel resources are in a one-to-one correspondence with interference resources.

12. The method according to claim 8, wherein the preset condition comprises one or more of the following:

a repetition parameter of a resource set corresponding to the channel resource is configured as "on"; and a repetition parameter of a resource set corresponding to the interference resource is configured as "on".

13. The method according to claim 12, wherein channel resources are in a one-to-one correspondence with interference resources.

14. A measurement and reporting method, applied to a terminal device, the method comprising:

receiving measurement configuration information from a network device, wherein the measurement configuration information is used to configure a channel resource and an interference resource, wherein the measurement configuration information includes first measurement configuration information and second measurement configuration information;

in response to the channel resource and the interference resource meeting a preset condition, receiving the channel resource, the interference resource, and a control-resource set (CORESET) by using a same reception beam according to a same transmission configuration indicator (TCI) state used for the channel resource, the interference resource, and the CORESET; and the preset condition is that a time-frequency resource occupied by the channel resource and a time-frequency resource occupied by a first CORESET comprise a same OFDM symbol, a time-frequency resource occupied by the interference resource and a time-frequency resource occupied by a second CORESET comprise a same OFDM symbol, and the first CORESET and the second CORESET correspond to a same reception beam; and the CORESET comprises the first CORESET and the second CORESET.

15. The method according to claim 14, wherein the preset condition comprises one or more of the following:

a time-frequency resource occupied by the channel resource and a time-frequency resource occupied by the CORESET comprise a same orthogonal frequency division multiplexing (OFDM) symbol; and a time-frequency resource occupied by the interference resource and the time-frequency resource occupied by the CORESET comprise a same OFDM symbol.

16. The method according to claim 14, wherein the channel resource is a channel state information reference signal (CSI-RS) resource or a synchronization signal/physical broadcast channel block (SSB).

17. The method according to claim 16, wherein the interference resource is the CSI-RS resource, the SSB, or a channel state information interference measurement (CSI-IM) resource.

18. The method according to claim 14, wherein channel resources are in a one-to-one correspondence with interference resources.

19. The method according to claim 14, wherein channel resources are in a one-to-one correspondence with interference resources.

20. The method according to claim 14, wherein based on a TCI state configured for a first resource being different from a TCI state of a channel resource configured by using the second measurement configuration information, measurement configuration information with a higher priority in the first measurement configuration information and the second measurement configuration information is selected for measurement and reporting according to a preset priority rule, and measurement configuration information with a lower priority is abandoned, wherein the first resource includes a channel resource configured by using the first measurement configuration information and an interference resource by using the second measurement configuration information.

* * * * *